(12) United States Patent
Uemura

(10) Patent No.: US 8,810,916 B2
(45) Date of Patent: Aug. 19, 2014

(54) IMAGE PICKUP APPARATUS

(75) Inventor: Ryosuke Uemura, Hachioji (JP)

(73) Assignee: Olympus Corporation, Tokyo (JP)

( * ) Notice: Subject to any disclaimer, the term of this patent is extended or adjusted under 35 U.S.C. 154(b) by 154 days.

(21) Appl. No.: 13/605,327

(22) Filed: Sep. 6, 2012

(65) Prior Publication Data

US 2013/0057732 A1    Mar. 7, 2013

(30) Foreign Application Priority Data

Sep. 7, 2011    (JP) .................................. 2011-194979

(51) Int. Cl.
- *G02B 15/14*    (2006.01)
- *H04N 5/262*    (2006.01)
- *G02B 15/173*    (2006.01)

(52) U.S. Cl.
CPC .................................... *G02B 15/173* (2013.01)
USPC ........................................ 359/676; 348/240.3

(58) Field of Classification Search
USPC ........................ 359/676; 348/240.3, E5.051
See application file for complete search history.

(56) References Cited

U.S. PATENT DOCUMENTS

| | | | |
|---|---|---|---|
| 5,602,584 A * | 2/1997 | Mitsutake et al. | 348/47 |
| 7,388,719 B2 * | 6/2008 | Yamazaki | 359/694 |

FOREIGN PATENT DOCUMENTS

JP    2011-048276    3/2011

OTHER PUBLICATIONS

S. Yamaguchi, et al., "Development of an Interchangeable 3D Lens for Digital System Cameras," Technical Data published on Feb. 10, 2011 at conference "Current Optical Technique of Digital Camera," p. 22-27.

* cited by examiner

*Primary Examiner* — Jack Dinh

(74) *Attorney, Agent, or Firm* — Kenyon & Kenyon LLP

(57) ABSTRACT

An image pickup apparatus includes a taking optical system and an image pickup element. The taking optical system includes at least two zoom optical systems having the same focal length range. The distance between the optical axes of any two zoom optical systems among the plurality of zoom optical systems is substantially constant over a range from an incidence surface to an image pickup surface of the image pickup element. The plurality of zoom optical systems are arranged in such a way as to form images of an object respectively in different regions on the image pickup surface of the same image pickup element.

12 Claims, 31 Drawing Sheets

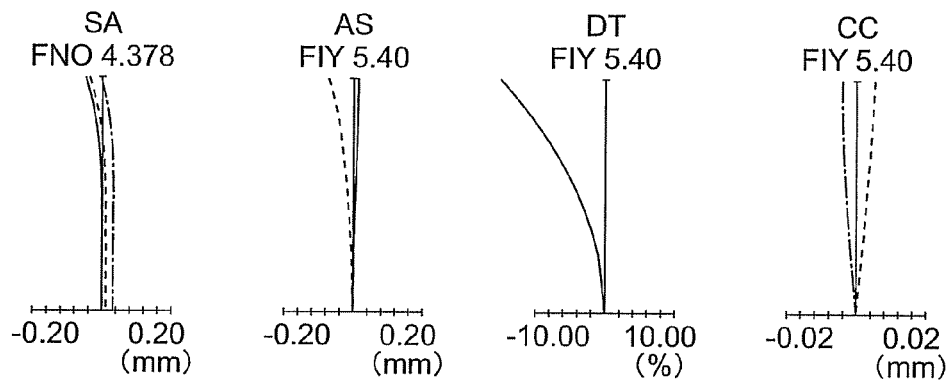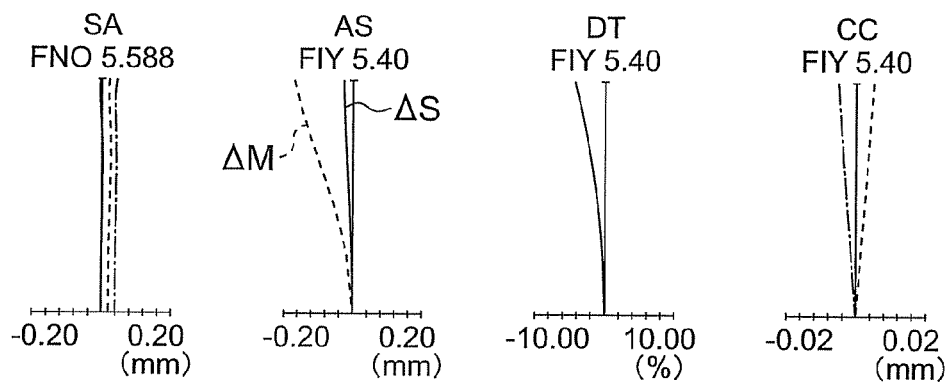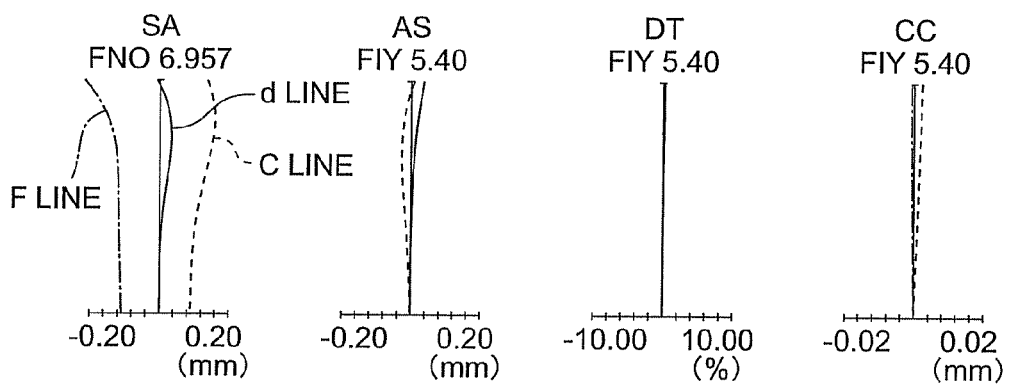

SA
FNO 2.709
-0.20  0.20
(mm)

AS
FIY 5.40
-0.20  0.20
(mm)

DT
FIY 5.40
-10.00  10.00
(%)

CC
FIY 5.40
-0.02  0.02
(mm)

SA
FNO 3.396
-0.20  0.20
(mm)

AS
FIY 5.40
-0.20  0.20
(mm)

DT
FIY 5.40
-10.00  10.00
(%)

CC
FIY 5.40
-0.02  0.02
(mm)

SA
FNO 4.601
-0.20  0.20
(mm)

AS
FIY 5.40
-0.20  0.20
(mm)

DT
FIY 5.40
-10.00  10.00
(%)

CC
FIY 5.40
-0.02  0.02
(mm)

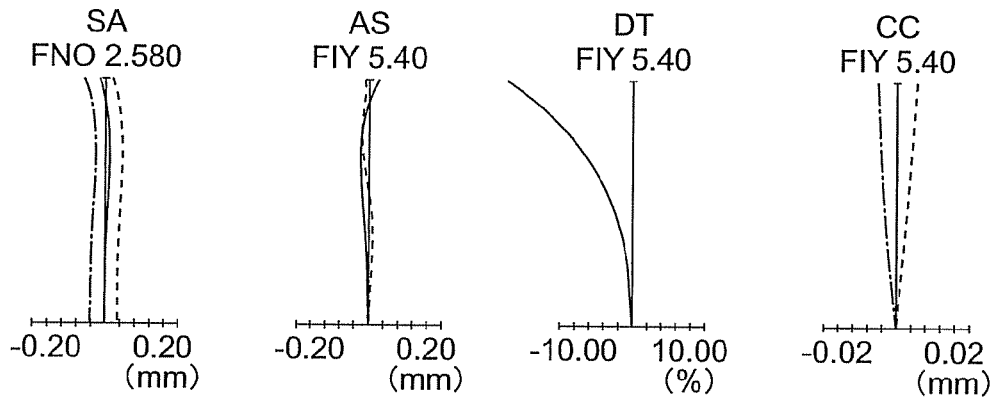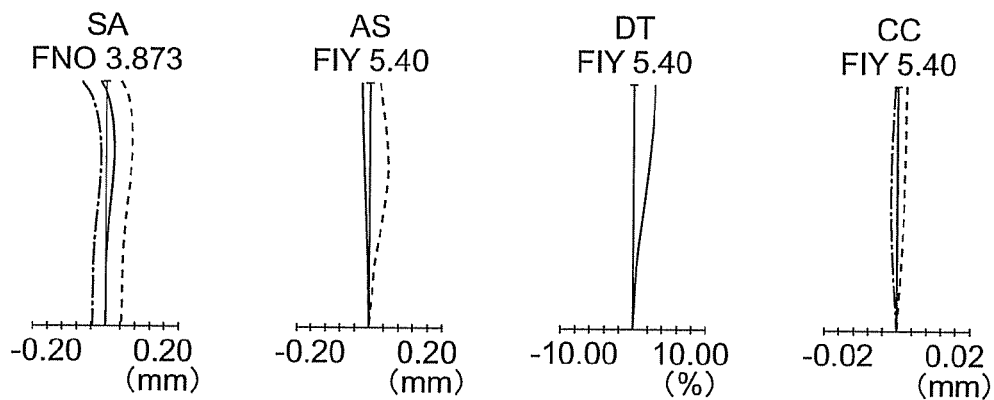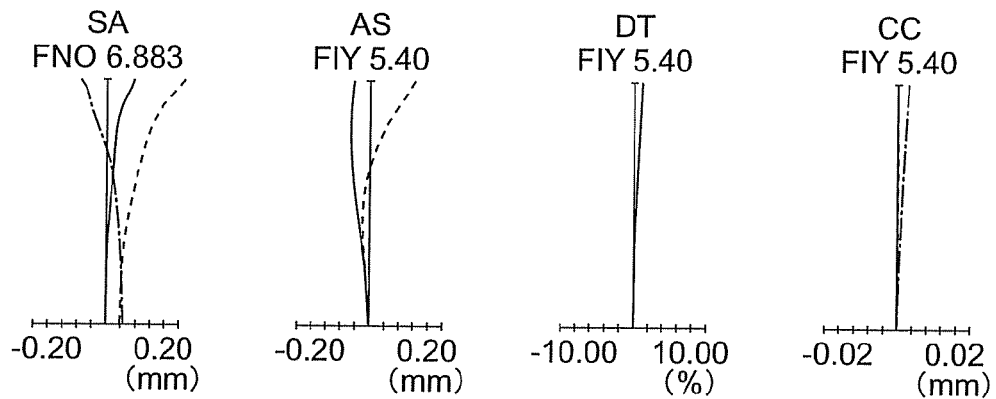

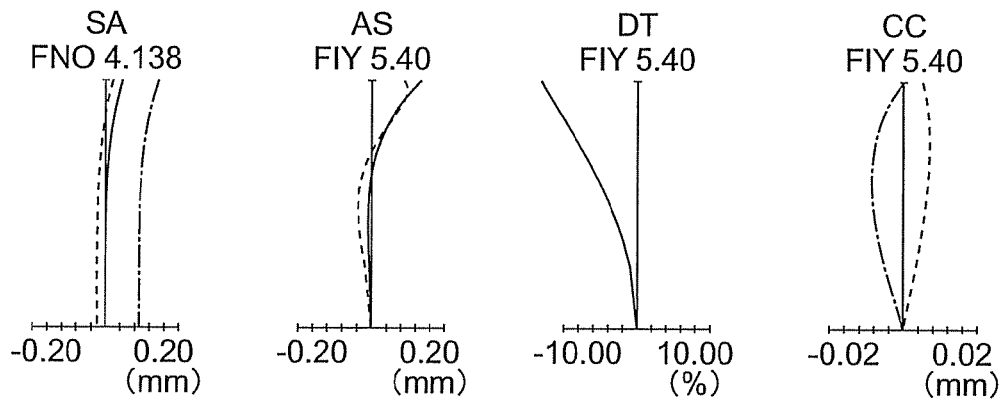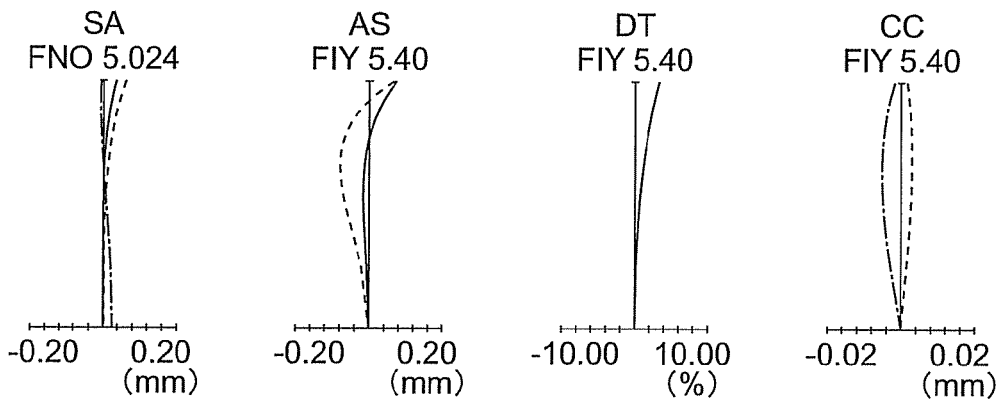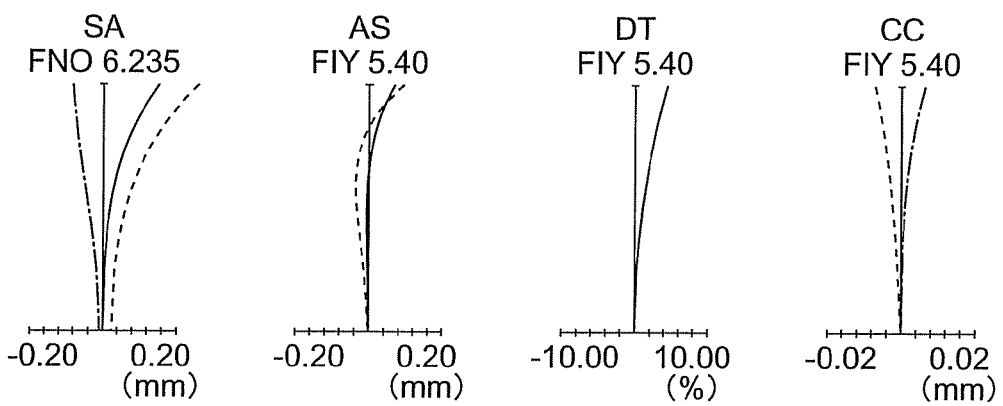

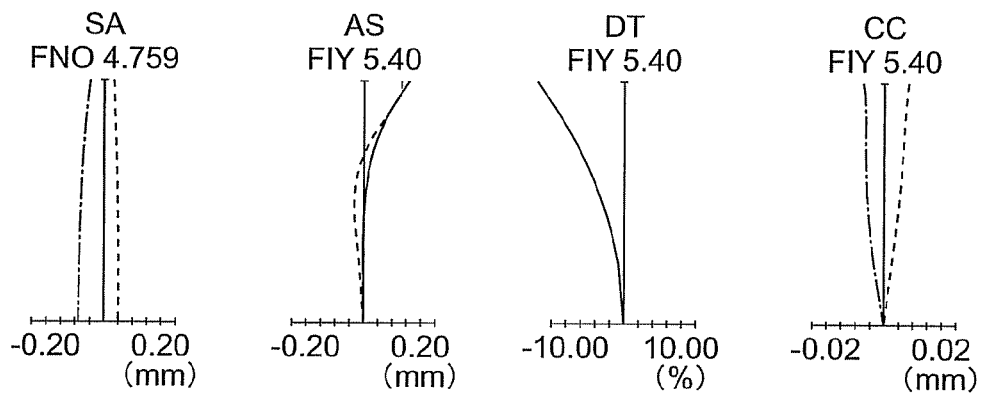
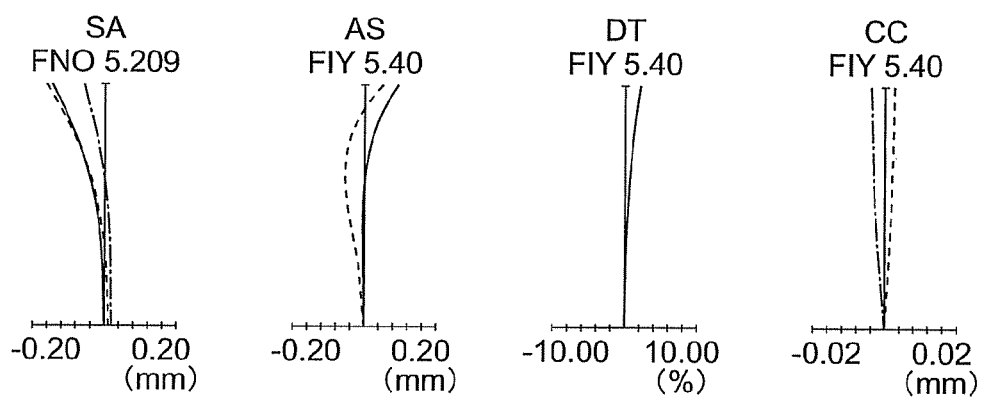
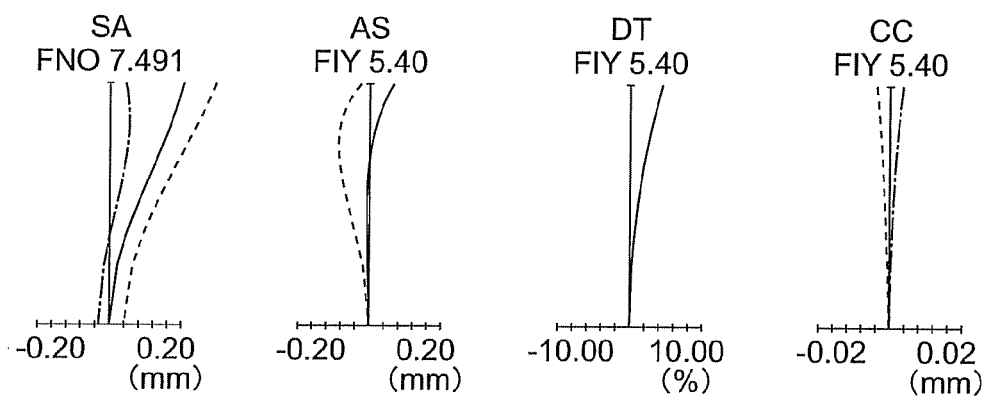

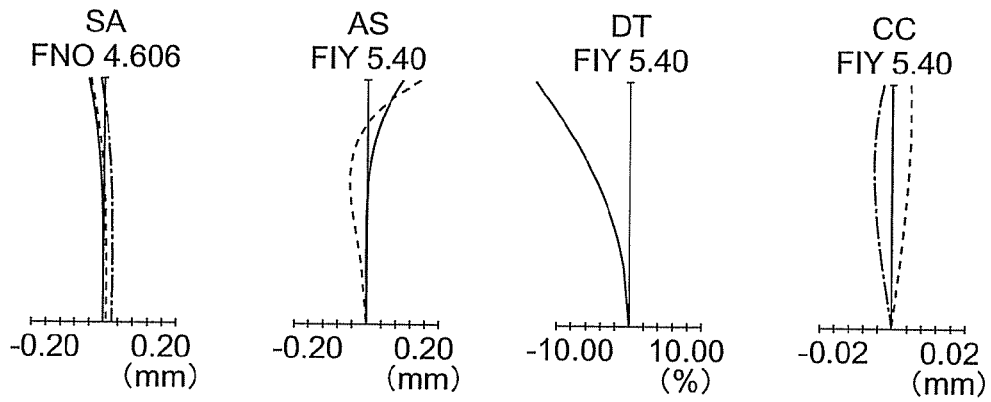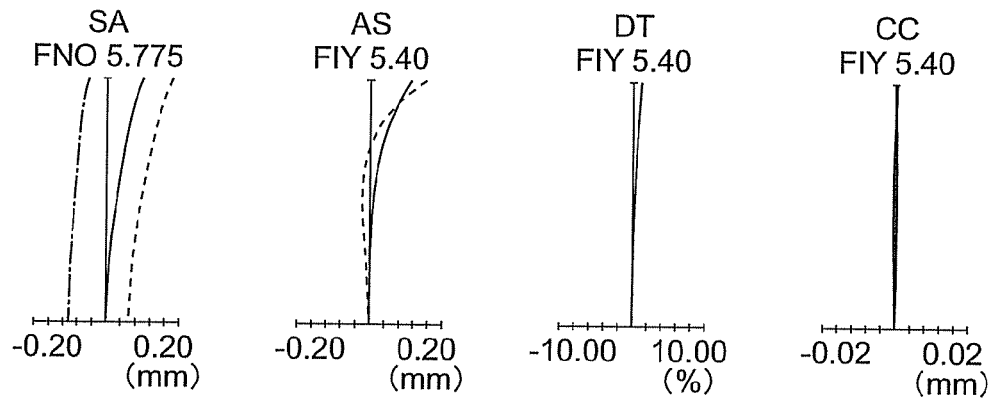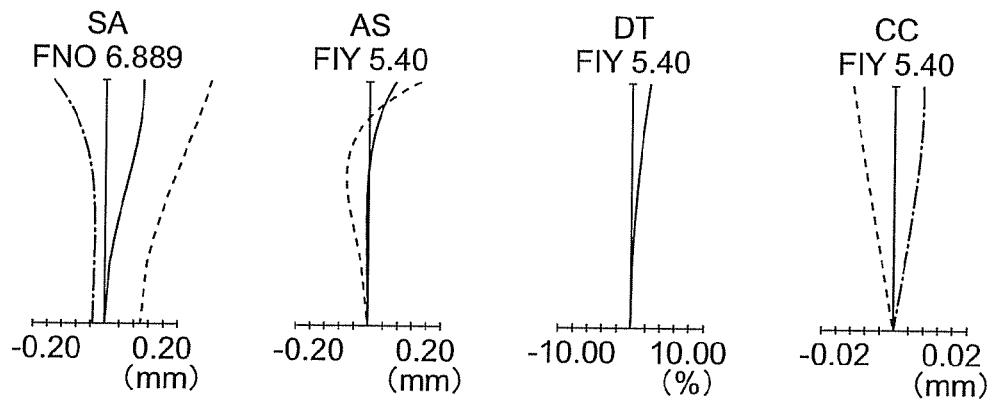

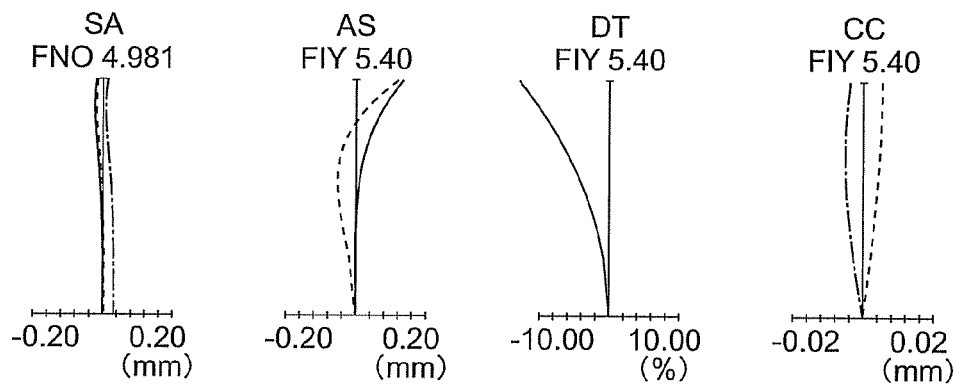
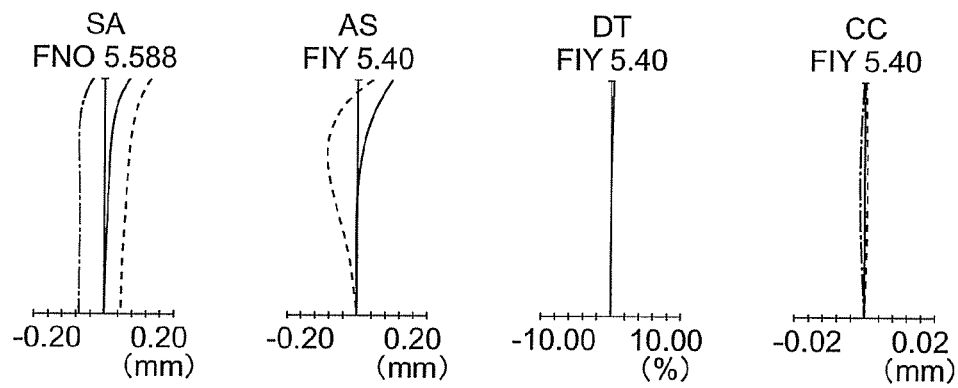
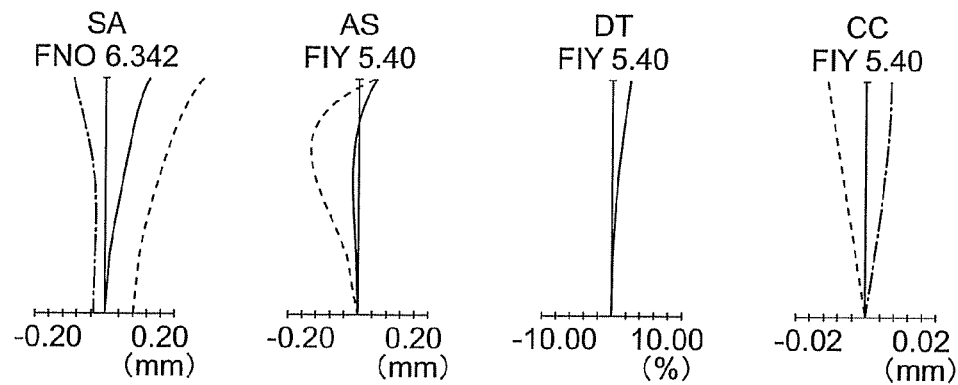

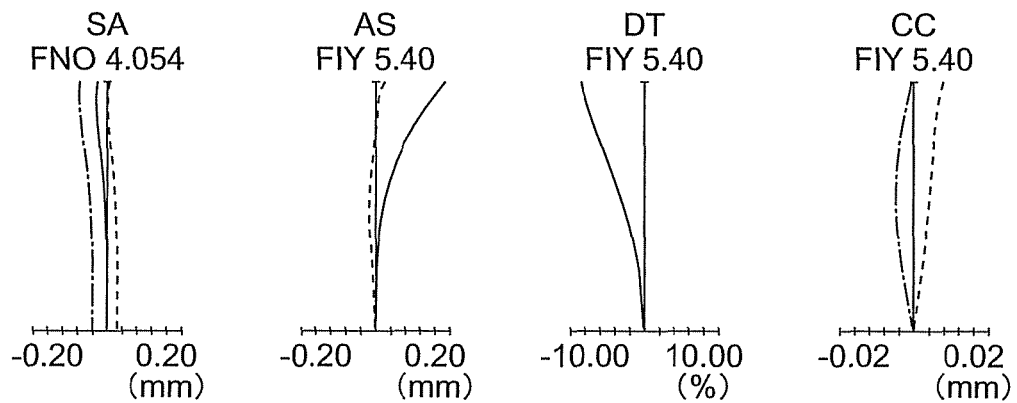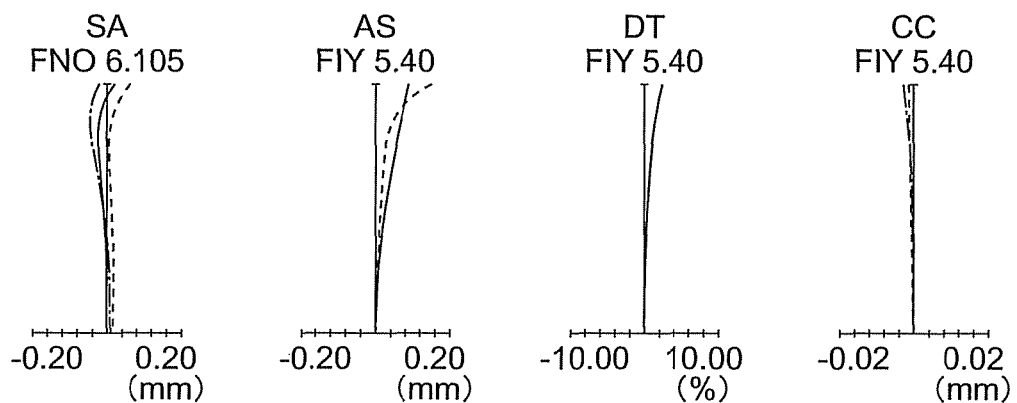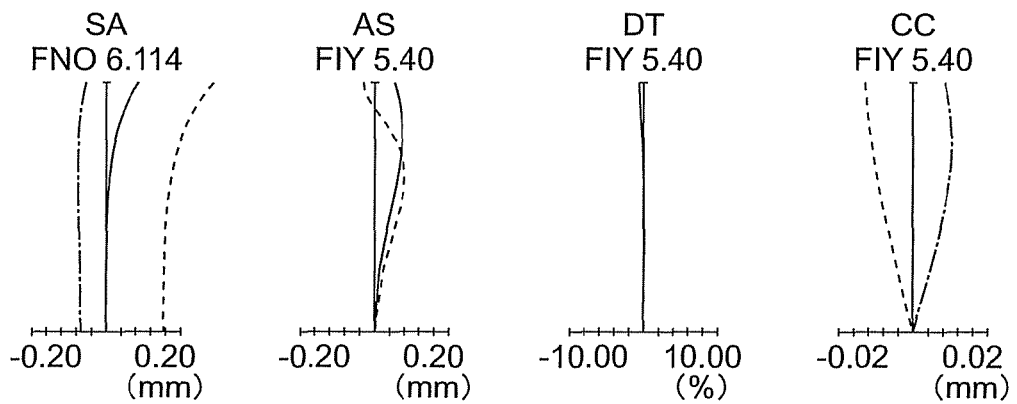

IMAGE PICKUP APPARATUS

CROSS-REFERENCE TO RELATED APPLICATION

The present application is based upon and claims the benefit of priority from the prior Japanese Patent Application No. 2011-194979 filed on Sep. 7, 2011; the entire contents of which are incorporated herein by reference.

BACKGROUND OF THE INVENTION

1. Field of the Invention

The present invention relates to an image pickup apparatus, in particular to an image pickup apparatus using a 3D zoom taking optical system for use mainly in a digital single lens reflex camera, a compact camera, or the like.

2. Description of the Related Art

With the spread of stereoscopic (three-dimensional or 3D) displays, three-dimensional taking optical systems used for electronic image shooting have been attracting attention. Three-dimensional taking optical systems in which two taking optical systems having optical axes offset from each other are arranged to create left and right parallax images are known.

As prior art three-dimensional taking optical systems, a pan-focus, single-focal-length taking system in which one common image pickup element is used in conjunction with two taking optical systems and a zoom image pickup system using two separate optical systems and image pickup elements have been developed and described, for example, in "Digital Camera no saishin kougaku gijutu (Newest Optical Technologies in Digital cameras)" (46th Conference of Optics Design Group, Journal of Optics Design "OPTICS DESIGN" No. 46, Feb. 10, 2011) and Japanese Patent Application Laid-Open No. 2011-48276.

SUMMARY OF THE INVENTION

According to the present invention, an image pickup apparatus comprising a taking optical system and an image pickup element, wherein the taking optical system comprises at least two zoom optical systems having the same focal length range, the distance between the optical axes of any two zoom optical systems among the plurality of zoom optical systems is substantially constant over a range from an incidence surface to an image pickup surface of the image pickup element, and the plurality of zoom optical systems are arranged in such a way as to form images of an object respectively in different regions on the image pickup surface of the same image pickup element.

In the following description, zoom optical systems will sometimes be referred to as "zoom lenses".

BRIEF DESCRIPTION OF THE DRAWINGS

FIGS. 6A, 6B, 6C, and 6D are diagrams showing spherical aberration, astigmatism, distortion, and chromatic aberration of magnification of the zoom lens according to the first embodiment in the state in which the zoom lens is focused on an object point at infinity at the wide angle end;

FIGS. 6E, 6F, 6G, and 6H are diagrams showing spherical aberration, astigmatism, distortion, and chromatic aberration of magnification of the zoom lens according to the first embodiment in the state in which the zoom lens is focused on an object point at infinity in the intermediate focal length state;

FIGS. 6I, 6J, 6K, and 6L are diagrams showing spherical aberration, astigmatism, distortion, and chromatic aberration of magnification of the zoom lens according to the first embodiment in the state in which the zoom lens is focused on an object point at infinity at the telephoto end;

FIGS. 10A, 10B, 10C, and 10D are diagrams showing spherical aberration, astigmatism, distortion, and chromatic aberration of magnification of the zoom lens according to the third embodiment in the state in which the zoom lens is focused on an object point at infinity at the wide angle end;

FIGS. 10E, 10F, 10G, and 10H are diagrams showing spherical aberration, astigmatism, distortion, and chromatic aberration of magnification of the zoom lens according to the third embodiment in the state in which the zoom lens is focused on an object point at infinity in the intermediate focal length state;

FIGS. 10I, 10J, 10K, and 10L are diagrams showing spherical aberration, astigmatism, distortion, and chromatic aberration of magnification of the zoom lens according to the third embodiment in the state in which the zoom lens is focused on an object point at infinity at the telephoto end;

FIGS. 12A, 12B, 12C, and 12D are diagrams showing spherical aberration, astigmatism, distortion, and chromatic aberration of magnification of the zoom lens according to the fourth embodiment in the state in which the zoom lens is focused on an object point at infinity at the wide angle end;

FIGS. 12E, 12F, 12G, and 12H are diagrams showing spherical aberration, astigmatism, distortion, and chromatic aberration of magnification of the zoom lens according to the fourth embodiment in the state in which the zoom lens is focused on an object point at infinity in the intermediate focal length state;

FIGS. 12I, 12J, 12K, and 12L are diagrams showing spherical aberration, astigmatism, distortion, and chromatic aberration of magnification of the zoom lens according to the fourth embodiment in the state in which the zoom lens is focused on an object point at infinity at the telephoto end;

FIGS. 14A, 14B, 14C, and 14D are diagrams showing spherical aberration, astigmatism, distortion, and chromatic aberration of magnification of the zoom lens according to the fifth embodiment in the state in which the zoom lens is focused on an object point at infinity at the wide angle end;

FIGS. 14E, 14F, 14G, and 14H are diagrams showing spherical aberration, astigmatism, distortion, and chromatic aberration of magnification of the zoom lens according to the fifth embodiment in the state in which the zoom lens is focused on an object point at infinity in the intermediate focal length state;

FIGS. 14I, 14J, 14K, and 14L are diagrams showing spherical aberration, astigmatism, distortion, and chromatic aberration of magnification of the zoom lens according to the fifth embodiment in the state in which the zoom lens is focused on an object point at infinity at the telephoto end;

FIGS. 16A, 16B, 16C, and 16D are diagrams showing spherical aberration, astigmatism, distortion, and chromatic aberration of magnification of the zoom lens according to the sixth embodiment in the state in which the zoom lens is focused on an object point at infinity at the wide angle end;

FIGS. 16E, 16F, 16G, and 16H are diagrams showing spherical aberration, astigmatism, distortion, and chromatic aberration of magnification of the zoom lens according to the sixth embodiment in the state in which the zoom lens is focused on an object point at infinity in the intermediate focal length state;

FIGS. 16I, 16J, 16K, and 16L are diagrams showing spherical aberration, astigmatism, distortion, and chromatic aberration of magnification of the zoom lens according to the sixth embodiment in the state in which the zoom lens is focused on an object point at infinity at the telephoto end;

FIGS. 18A, 18B, 18C, and 18D are diagrams showing spherical aberration, astigmatism, distortion, and chromatic aberration of magnification of the zoom lens according to the seventh embodiment in the state in which the zoom lens is focused on an object point at infinity at the wide angle end;

FIGS. 18E, 18F, 18G, and 18H are diagrams showing spherical aberration, astigmatism, distortion, and chromatic aberration of magnification of the zoom lens according to the seventh embodiment in the state in which the zoom lens is focused on an object point at infinity in the intermediate focal length state;

FIGS. 18I, 18J, 18K, and 18L are diagrams showing spherical aberration, astigmatism, distortion, and chromatic aberration of magnification of the zoom lens according to the seventh embodiment in the state in which the zoom lens is focused on an object point at infinity at the telephoto end;

FIGS. 20A, 20B, 20C, and 20D are diagrams showing spherical aberration, astigmatism, distortion, and chromatic aberration of magnification of the zoom lens according to the eighth embodiment in the state in which the zoom lens is focused on an object point at infinity at the wide angle end;

FIGS. 20E, 20F, 20G, and 20H are diagrams showing spherical aberration, astigmatism, distortion, and chromatic aberration of magnification of the zoom lens according to the eighth embodiment in the state in which the zoom lens is focused on an object point at infinity in the intermediate focal length state;

FIGS. 20I, 20J, 20K, and 20L are diagrams showing spherical aberration, astigmatism, distortion, and chromatic aberration of magnification of the zoom lens according to the eighth embodiment in the state in which the zoom lens is focused on an object point at infinity at the telephoto end;

FIG. 31A is a front view of the cellular phone 400, FIG. 31B is a side view of the cellular phone 400, and FIG. 31C is a cross sectional view of the taking optical system 405.

DETAILED DESCRIPTION OF THE INVENTION

The construction, operations, and advantages of image pickup apparatuses according to some embodiments of the present invention will be described. It should be understood that the present invention is not limited by the embodiments. Although a lot of specific details will be described in the following description of the embodiments for the purpose of illustration, various modifications and changes can be made to the details without departing from the scope of the invention. The illustrative embodiments of the invention will be described in the following without any intension of invalidating the generality of or imposing any limitations on the claimed invention.

Firstly, the general construction of a digital camera 100 as an example of the image pickup apparatus according to an embodiment of the present invention will be described.

Recently, interchangeable lens cameras not having a quick-return mirror have become popular as well as single lens reflex cameras having a quick-return mirror in the camera body. The zoom lenses according to embodiments that will be described later can be used as interchangeable lenses for use with such cameras not having a quick return mirror.

Figure 1A:
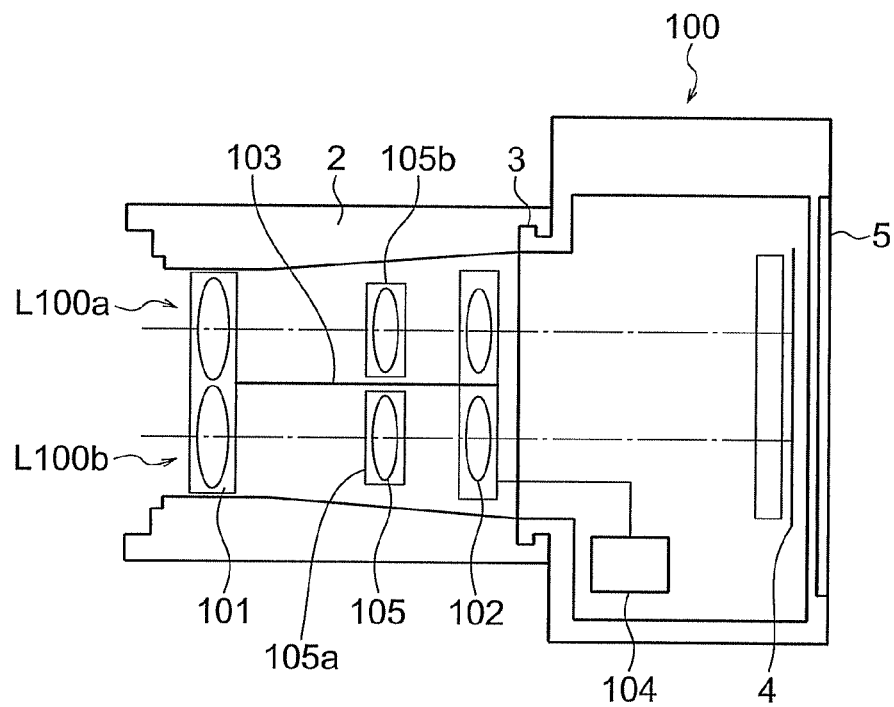
FIGS. 1A and 1B are cross sectional views each showing the general construction of a taking optical system of an image pickup apparatus according to the present invention.

FIG. 1A is a cross sectional view showing the general construction of a single lens reflex camera as an image pickup apparatus having two zoom lenses and using a CCD or CMOS sensor as an image pickup apparatus. In the single lens reflex camera 100 (which will be hereinafter referred to as "digital camera") shown in FIG. 1A, the zoom lenses L100a, L100b being housed in a lens barrel 2 are detachably attached on the digital camera 100 by a mount portion 3. The mount portion 3 may be a screw mount, a bayonet mount or the like. In this illustrative case, a bayonet mount is used.

The digital camera 100 is also equipped with an image pickup element 4, a monitor display 5 on the back, a viewfinder image display element, and a viewfinder optical system in addition to the above-described components.

The digital camera 100 (image pickup apparatus) has a taking optical system and the image pickup element 4. The taking optical system includes at least two zoom lenses (variable focal length optical systems) L100a, L100b having the same focal length range. The distance between the optical axes of any two zoom lenses L100a, L100b among the plurality of zoom lenses L100a, L100b is substantially constant over the range from the incidence surface to the image pickup surface of the image pickup element 4.

The plurality of zoom lenses L100a, L100b are arranged in such a way as to form images of an object in different regions of the image pickup surface of the same image pickup element 4 respectively. This will be specifically described later with reference to FIGS. 2A, 2B, 2C, and 2D.

The plurality of zoom lenses L100a, L100b have the same lens configuration.

It is preferred that the focusing lens groups (which is, in the illustrative case shown in FIG. 1A, the center lens groups 105) in the respective of zoom lenses L100a, L100b be held by separate members 105a, 105b. Details are shown in FIG. 1A.

A partition structure 103 is provided in at least a part of the space between the plurality of zoom lenses L100a, L100b. The partition structure 103 is arranged in such a way as not to interfere with driving of the lenses.

The digital camera 100 further has a common drive unit 104 that drives one or more zoom lenses among the plurality of zoom lenses L100a, L100b.

As the zoom lenses of the digital camera 100 having the above-described construction, zoom lenses according to first to eighth embodiments that will be described later may be used.

Figure 1B:
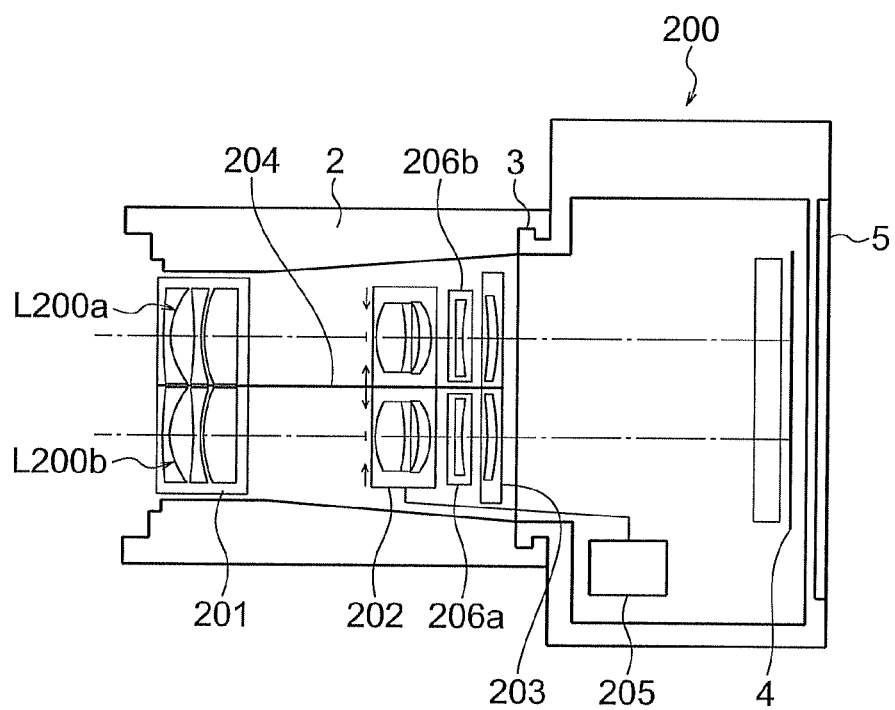

FIG. 1B is a cross sectional view of a digital camera 200 equipped with zoom lenses L200a, L200b having constructions different from the above described zoom lenses. The portions same as those in the digital camera 100 are designated by the same reference numerals to eliminate redundant descriptions. The digital camera 200 has two zoom lenses L200a, L200b.

It is preferred that focusing lens groups in the plurality of zoom lenses L200a, L200b be held by separate members, which may be members 206a, 206b.

It is preferred that a partition structure 204 be provided in at least a part of the space between the plurality of zoom lenses L200a, L200b. The partition structure 204 is arranged in such a way as not to interfere with driving of the lenses.

It is preferred that the digital camera 200 further have a common drive unit 205 that drives one or more zoom lenses among the plurality of zoom lenses L200a, L200b.

Now, a description will be made of the arrangement of the plurality of zoom lenses that causes the zoom lenses to form images of an object in different regions of the image pickup surface of the same image pickup element 4 respectively.

FIGS. 2A, 2B, 2C, and 2D show the image pickup surface of the image surface of the image pickup element 4 seen from the front. In FIGS. 2A, 2B, 2C, and 2D, N represents the number of zoom lenses or the number of modules.

Figure 2A:
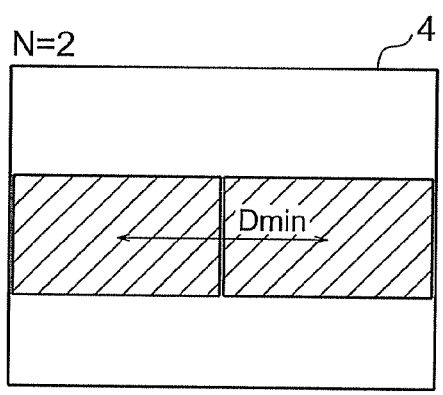
FIGS. 2A, 2B, 2C, and 2D diagrams showing division of the image pickup surface of an image pickup element.

For example, the two rectangular areas (hatched areas) on the image pickup element 4 shown in FIG. 2A are the areas in which images of an object are respectively formed by the zoom lenses in a case where two zoom lenses are arranged horizontally side by side. The shortest distance between the centers is indicated in FIG. 2A as distance Dmin. In this illustrative case, the image pickup element 4 has an aspect ratio of 4:3, and the image pickup area for each zoom lens has an aspect ratio of 16:9.

Figure 2B:
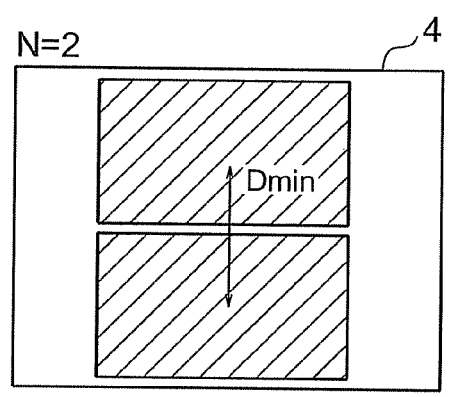

FIG. 2B shows image areas on the image pickup element 4 in a case where two zoom lenses (N=2) are arranged along the vertical direction.

Figure 2C:
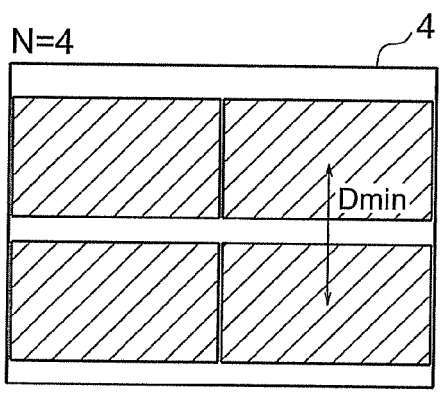

FIG. 2C shows image areas on the image pickup element 4 in a case where four zoom lenses (N=4) are arranged two by two along the horizontal and vertical directions.

Figure 2D:
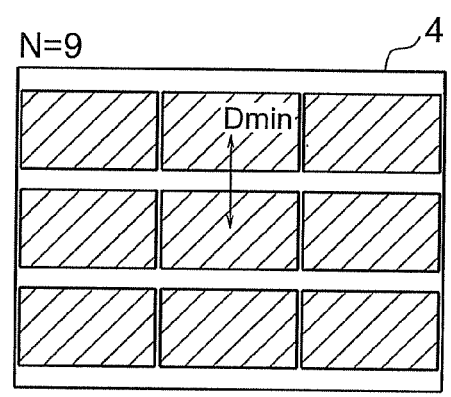

FIG. 2D shows image areas on the image pickup element 4 in a case where nine (N=9) zoom lenses are arranged three by three along the horizontal and vertical directions.

Advantages of providing three or more zoom lenses are as follows.

Using three or more zoom lenses enables 3D image shooting irrespective of the orientation of the taking system. For example, in the case where only two zoom lenses are arranged horizontally side by side, if the digital camera is used in the vertical orientation, the zoom lenses are arranged one above the other (along the vertical direction). Shooting in this orientation will not produce images having parallax with respect to the horizontal direction.

In contrast, in the case where there are four or more zoom lenses arranged along the horizontal and vertical directions, images having parallax in the horizontal direction can be obtained both in the vertical orientation and in the horizontal orientation of the taking system. Even in an intermediate orientation between the vertical and horizontal orientations, natural stereoscopic effect can be obtained by interpolation from images having parallax with respect to the vertical and horizontal directions.

In the case where three zoom lenses are arranged along the horizontal direction, images having parallax seen from a plurality of viewpoints can be obtained. Then, the degree of flexibility in viewing stereoscopic images is improved. For example, a change of the viewing position of the viewer and viewing of a 3D image by a plurality of viewers are improved.

If the number of zoom lenses are increased to achieve the above advantages, variation caused by manufacturing errors or other reasons will become large accordingly. Therefore, reduction of variation in holding lenses achieved by using a common member, which is a characterizing feature of this construction, becomes more important.

It is preferred that at least one lens group in each of the plurality of zoom lenses L100a, L100b be integrally held by a common member 101, 102 among the zoom lenses L100a, L100b. Namely, it is preferred that the lens groups mentioned above be held integrally by the common member 101, 102.

It is preferred that at least one lens group in each of the plurality of zoom lenses L200a, L200b be integrally held by a common member 201, 202, 203 among the zoom lenses L200a, L200b. Namely, it is preferred that the lens groups mentioned above be held together by the common member 201, 202, 203.

The structure that integrally holds some lens groups in the two zoom lenses will be described with reference to FIGS. 3 and 4.

Figure 3:
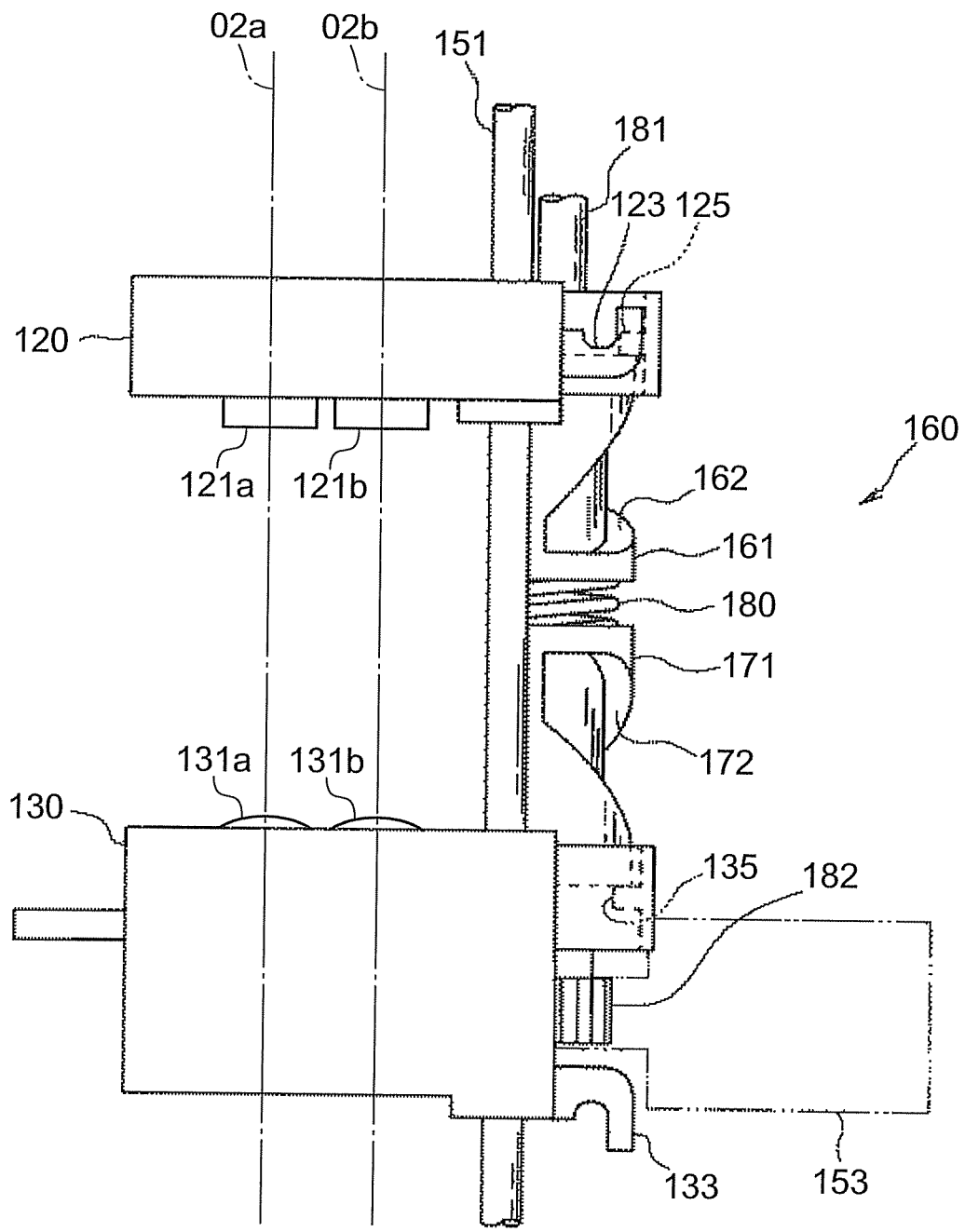
FIG. 3 illustrates a way in which some parts in two zoom lenses as taking optical system of the image pickup apparatus according to an embodiment are integrally held by a common member.
Figure 4:
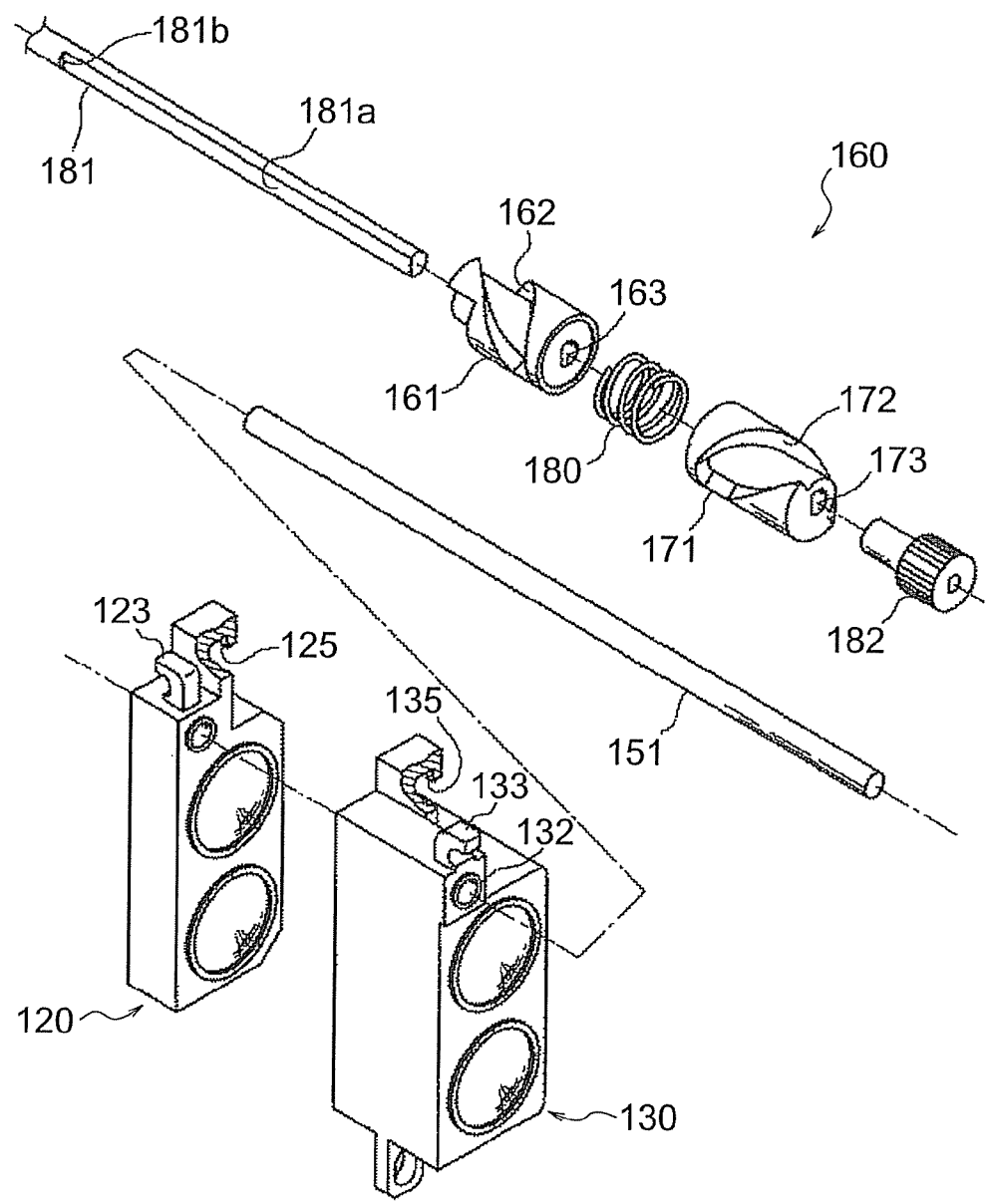
FIG. 4 is an exploded view showing the structure shown in FIG. 3 in another perspective.

As shown in FIGS. 3 and 4, a zoom cam unit 160 in this embodiment includes first and second cams or a pair of spiral cams 161 and 171, which are supported by a second shaft or a zoom cam shaft 181, and an elastic member or coil spring 180 provided between the spiral cams 161 and 171.

The zoom cam shaft 181 is a shaft-like member that is provided in such a way as to be able to rotate about an axis parallel to the optical axes O2a, O2b. The zoom cam shaft 181 is linked with the rotary shaft of a zooming motor 153 via a gear box provided underneath. With the rotation of the rotary shaft of the zooming motor 153, the zoom cam shaft 181 rotates amount the axis parallel to the optical axes O2a, O2b.

The spiral cams 161 and 171 respectively have D-shaped through holes 163 and 173 having the same shape. The portion of the zoom cam shaft 181 having a D-surface 181a is loosely fitted into the through holes 163 and 173. Thus, the pair of spiral cams 161 and 171 rotate with the rotation of the zoom camshaft 181 while being able to slide along the axial direction of the zoom cam shaft 181.

The spiral cams 161 and 171 are provided with spiral cam surfaces 162 and 172 having respective cam profiles. The cam surfaces 162 and 172 face outward when the spiral cams 161 and 171 are set in position in the lens barrel 2.

The coil spring 180 made of a metal is held between the spiral cams 161 and 171. The coil spring 180 is an elastic member that can elastically deform in the axial direction of the zoom cam shaft 181.

The spiral cams 161, 171 are held between an abutment portion 181b near one end of the zoom camshaft 181 and a pinion gear 182 fixedly attached to the other end of the zoom camshaft 181 with the coil spring 180 intervening therebetween being compressed by a predetermined length. Thus, the positioning of the spiral cams 161 and 171 with respect to the axial direction is achieved. In other words, the abutment portion 181b and the pinion gear 182 constitute a positioning part, which biases the spiral cams 161 and 171 toward each other.

Since the spiral cams 161 and 171 can slide along the axial direction of the zoom cam shaft 181 as described above, the relative distance between the spiral cams 161 and 171 along the axial direction changes with a compressive deformation of the coil spring 180.

When the coil spring 180 is held between the spiral cams 161 and 171, both ends of the coil spring 180 are fitted into recesses provided on the opposed surfaces of the spiral cams 161 and 171. Thus, the coil spring 180 is positioned with respect to the radial direction.

A guide shaft 151 is provided in parallel with the zoom cam shaft 181. Lens frames 120 and 130 are supported by the guide shaft 151 in such a way as to be capable of sliding along the axial direction, as described above.

The lens frames 120 and 130 have cam follower portions 125 and 135 that extend in such a way as to be in contact respectively with the cam surfaces 162 and 172 of the spiral cams 161 an 171.

The lens frame 120 for the second lens groups and the lens frame 130 for the third lens groups are biased toward each other by an extension spring held between the respective spring hooks 123 and 133. Thus, the cam follower portions 125 and 135 are biased in directions toward the cam surfaces 162 and 172, to follow the cam surfaces 162 and 172.

In the zooming operation of the lens barrel 2 of the camera having the above-described construction, the zoom cam shaft 181 is driven by the zooming motor 153 to rotate the spiral cams 161 and 171. The cam follower portions 125 and 135 follow the cam surfaces 162 and 172 of the spiral cams 161 and 171 thus rotated to cause the lens frames 120 and 130 to move forward/rearward along direction of the optical axes O2a, O2b.

Operations and advantages of the lens barrel 2 according to this embodiment having the above-described construction will be described in the following. If the digital camera 100 according to this embodiment falls on the ground with its top or bottom facing downward, or if a certain object collides with or strikes the top or bottom of the camera 1, an impact force (or its component force) acts on the lens barrel 2 in the direction along the optical axes O2a, O2b.

Then, a force proportional to the self-weight acts on the center of mass of each of the lens frames 120 and 130 in the direction along the optical axes O2a, O2b. The forces acting on the lens frames 120 and 130 along the optical axes O2a, O2b are transmitted to the spiral cams 161 and 171 by the cam follower portions 125 and 135. Consequently, the coil spring 180 held between the spiral cams 161 and 171 elastically deforms in the compressive direction in accordance with the magnitude of the forces acting on the lens frame 120 for the second lens groups and the lens frame 130 for the third lens groups in the direction along the optical axes O2a, O2b.

In consequence, in the case where an impact force in the direction along the optical axes O2a, O2b acts on the lens barrel 2, because of the deformation of the coil 180, spiral cams 161 and 171 moves relatively in such a way as to change the distance therebetween. In consequence, the forces acting on the lens frame 120 for the second lens groups and the lens frame 130 are weakened.

Thus, in this embodiment, deformation or break of the lens frames 120 and 130 and the guide shaft 151 can be prevented when an impact force acts in the direction along the optical axes O2a, O2b. Therefore, the impact resistance of the lens barrel 2 can be enhanced.

As described above, the lens frames 120 and 130, which serve as holding units that hold optical components, each have a cantilevered structure that extends away from the guide shaft 151. Specifically, the lens frames 120 and 130 each have a holding frame portion that extends in a direction substantially perpendicular to the guide shaft 151.

In the case of the lens frame 120, the center of mass of the lens frame 120 including the lenses 121a, 121b is located at a position offset from the guide shaft 151 toward the optical axes O2a, O2b. This is because the lenses 121a, 121b made of glass having a specific gravity higher than the lens frame 120 made of synthetic resin are centered on the optical axes O2a, O2b.

If an impact force in the direction along the optical axes O2a, O2b acts on the cantilevered lens frame 120 for the second lens groups having the center of mass located offset from the guide shaft 151 toward the optical axes O2a, O2b as described above, a stress concentrates at the portion near the fixed end (or base) of the lens frame 120 and the portion near the sliding part that is in contact with the guide shaft 151. Consequently, deformation or break is apt to occur in these portions.

As described above, in the lens barrel 2 according to this embodiment, when an impact force in the direction along the optical axes O2a, O2b acts on it, the lens frame 120 for the second lens groups moves with the deformation of the coil spring 180. In consequence, the stress acting on the base portion of the cantilevered lens frame 120 for the second lens groups can be made smaller.

In the lens barrel having a cantilevered lens holding frame according to this embodiment, deformation and break of the lens holding frame by an impact can be prevented, and high impact resistance can be achieved.

The coil spring 180 in the above-described embodiment can be replaced by other elastically deformable members. For example, the coil spring 180 may be replaced by other types of springs such as a leaf spring or a disc spring. The material of the coil spring 180 as an elastic member is not limited to a metal, but it may be made of a resin or a composite material.

The spiral cams 161 and 171 and the coil spring 180 may be an integral member.

In the embodiment, the zoom cam unit is composed of spiral cams. However, the zoom cam unit may be composed of other types of cams such as cylindrical grooved cams or cylindrical ribbed cams. The number of cams in the zoom cam unit is not limited to two, but the zoom cam unit may include three or more cams.

For example, in the case of a lens barrel in which three lens holding frames that hold lens groups are independently moved along the optical axis, three cylindrical grooved cams that drive the three lens holding frames respectively may be provided in such a way as to be rotatable about an axis substantially parallel to the optical axis. In this case, coil springs or elastic members are held between the three cylindrical grooved cams.

Each of the lens frames 120 and 130 is adapted to integrally hold one or more lens groups 121a, 121b, 131a, 131b in the two zoom lenses.

Operations and advantages of the above-described digital camera (image pickup apparatus) will be described in the following.

The image pickup apparatus of this embodiment is equipped with at least two zoom lenses having the same focal length range. Therefore, a plurality of images having parallax can be obtained with easily variable angle of view. This improves the degree of flexibility in 3D image shooting.

The distance between the optical axes of any two zoom lenses among the plurality of zoom lenses is substantially constant over the range from the incidence surface to the image pickup surface of the image pickup element 4. In consequence, parallax information close to that obtained by the human eyes can be obtained by the parallel view method in which the optical axes of the zoom lenses are parallel or the cross-eyed view method in which the optical axes of the zoom optical systems cross at a distant point.

The zoom lenses form images in different regions on one common image pickup element. This can eliminate or reduce variation in the photo sensitivity among the image pickup elements and variation in the image read-out timing, which may exist in the case where a plurality of image pickup elements are used. Consequently, a natural stereoscopic effect with little strangeness that causes little viewers' fatigue can be produced when the images are fused.

Moreover, the single image pickup element configuration allows the share of an image processing circuit, leading to advantages such as reduction in the size and power consumption of the circuit.

Since the digital camera uses only one image pickup element, the zoom lens may also be used as an interchangeable lens for use in existing interchangeable lens cameras.

For the above-described reasons, according to the embodiment, variation in the image quality among modules can be eliminated while using a multi-lens taking optical system, and a natural stereoscopic effect can be achieved when images are fused.

In the case where the image pickup apparatus is equipped with an image stabilization mechanism, the sharing of one image pickup element allows the image stabilization mechanism to operate with a common shift amount among the plurality of zoom lenses. Therefore, strangeness in the fused image caused by variation in the amount and direction of shift can be reduced, in particular in the case of moving images. In the case of the image stabilization mechanism that shifts the imager (i.e. image pickup element), a natural stereoscopic effect in the fused image can be achieved by the sharing of one image pickup element.

It is preferred that each zoom lens have at least one member in at least one lens group that is integral with at least one member in at least one lens group in the other zoom lens(es). With this feature, variation in the accuracy in the shift and tilt position of the lens among the zoom lenses can be made smaller than in the case where the plurality of zoom lenses are composed of separate independent members. In consequence, variation in the angle of view, partial defocus, and resolution among the zoom lenses can be made small, and a natural stereoscopic effect with little strangeness that causes little viewers' fatigue can be produced when the images are fused.

Moreover, if the plurality of zoom lenses respectively form images in different regions on one common image pickup element and at least one member in at least one lens group in one zoom lens is integral with a like member in the other zoom lens(es), positional adjustment of the lenses and the image pickup element with respect to the tilt direction in assembly of the zoom lenses can be made easy, and variation in partial defocus and other characteristics among the zoom lenses can be made smaller.

This is because it is sufficient to ensure the parallelism of only two components or the integral member and the image pickup element. If either the integral member or the image pickup element is divided into two separate members, it is necessary to ensure the parallelism of the three components at the same time. This makes the adjustment complex. Then, variation in partial defocus and other characteristics among the zoom lenses will be prone to occur.

Properties of a taking optical system such as the angle of view, resolution, and sensitivity generally vary depending on the use environment and change with time. Even a small change in a characteristic that is not noticeable in a single-lens taking system, which does not have another zoom lens to be compared with, can appear as a difference in characteristics such as the angle of view, resolution, and/or sensitivity among the modules in the case of multi-lens 3D taking optical systems. This will spoil a natural stereoscopic effect when images are fused. The sharing of the image pickup element and other parts among the plurality of zoom lenses in this embodiment is advantageous in reducing not only variation created at the time of manufacturing but also variation among the modules caused with the lapse of time.

Generally, zoom lenses have more complex in the optical configuration and in the mechanism and include a larger number of parts than single focal length optical systems. Because every part has a tolerance, an increase in the number of parts directly leads to an increase in variation of the taking optical system as a whole. Such variation further increases in 3D taking optical systems having plurality of zoom optical systems than in single lens optical systems. Such an increase in the variation not only makes images unnatural when viewed in the case of variation in the angle of view and resolution among taking optical systems but also leads to an increase in the spoilage, resulting in an increase in the cost of the taking optical system. Therefore, it is preferred that the number of parts be small.

As described before, in the case where the image pickup apparatus is equipped with an image stabilization mechanism, the sharing of a lens holding frame and an image pickup element allows the image stabilization mechanism to operate with a common shift amount among the plurality of zoom lenses. Therefore, strangeness in the fused image caused by variation in the amount and direction of shift can be reduced, in particular in the case of moving images. In the case of the lens-shift type image stabilization mechanism or what is called an optical type image stabilization mechanism, the above-described advantages can be achieved by sharing the frame of the optical unit shifted for image stabilization among the zoom lenses. In the case of the imager-shift type image stabilization mechanism, the above-described advantages can be achieved by sharing the image pickup element among the zoom lenses.

It is preferred that the plurality of zoom optical systems have the same lens configuration. If the zoom optical systems have the same lens configuration, variation in characteristics including not only the angle of view but also the spot shape, which depends on aberrations, among the zoom optical systems can be reduced. Therefore, a natural stereoscopic effect can be produced in the fused image.

In this embodiment, if a plane containing all the points equidistant from the optical axes of any two of the plurality of zoom lenses and the outer contours of the zoom lenses can interfere with each other, it is preferred that the interfering portions of the outer contours of the zoom lenses be cut at positions on their respective optical axis sides of the aforementioned plane.

If the zoom lenses are to be arranged so close to each other that the zoom lenses can interfere with each other as described above, it is preferred that the outer contours of the zoom lenses be partly cut. The interference of the zoom lenses can be prevented by cutting the zoom lenses at positions on their respective optical axis sides of the plane containing all the points equidistant from the optical axes of the two zoom lenses. Namely, a lens portion to be cut of one zoom lens is a portion protrudes from the aforementioned plane toward the optical axis of the other zoom lens.

It is preferred that each of the plurality of zoom lenses have a field stop arranged on the object side or image side of the first lens group and having a shape substantially similar to the shape of the image pickup area of each zoom lens or a field stop having a substantially similar to the shape of the image pickup area of each zoom lens arranged in the vicinity of the image pickup surface of the image pickup element. Thus, overlapping of different image pickup areas can be reduced.

As described before, it is preferred that a partition structure be provided in at least a part of the space between the plurality of zoom lenses.

The partition provided in a part of the space between the zoom optical systems can advantageously reduce stray light to eliminate ghost images and lens flare. If uneven ghost images and/or lens flare appears in parallax images in the 3D taking system, viewers of the fused image will feel strange. The partition can eliminate unexpected stray light traveling between the zoom optical systems.

As described before, it is preferred that a common drive unit that drives at least a part of each of the plurality of zoom lenses be provided.

Thus, a drive system for at least apart of each zoom lens is shared among the zoom lenses. Then, variation in the angle of view caused by variation in the positional accuracy of the lens groups can be made small, and a natural stereoscopic effect can be produced in the fused image. Moreover, this feature also advantageous in achieving reduction in the overall size of the taking system and reduction in the cost.

In the following, some preferable conditions for the zoom lens will be described.

It is preferred that each of the plurality of zoom optical systems satisfy the following conditional expression (1):

$$0.75 < ENPw/fw < 1.5 \qquad (1),$$

where ENPw is the distance from the first surface of the zoom optical system to the entrance pupil thereof at the wide angle end, and fw is the focal length of the zoom optical system at the wide angle end.

In the above-described optical arrangement, it is necessary that the size of each lens in the diametrical direction be small in order to prevent the interference of the zoom lenses with each other. In particular the frontmost lens tends to be necessitated to be large in order to achieve a large angle of view at the wide angle side. However, in order to prevent the interference of the lenses with each other, it is necessary to locate the entrance pupil toward the object side in relation to the focal length.

If conditional expression (1) is satisfied, the entrance pupil can be located at the object side compared with the focal length at the wide angle end, whereby the diameter of the lens can be prevented from becoming large.

If the upper limit of conditional expression (1) is exceeded, the position of the entrance pupil at the wide angle side will be retracted too much toward the image side, necessitating a large front lens diameter. Then, an unreasonable lens design with a small front lens diameter will not keep the paraxial relationship, making it impossible to achieve good imaging performance while keeping a wide angle of view.

If the lower limit of conditional expression (1) is not reached, the position of the entrance pupil at the wide angle side will be located at the object side, necessitating the lens groups on the front side of the stop to have an unduly high composite negative refractive power at the wide angle side. This leads to large aberrations generated in lens surfaces and is disadvantageous for aberration correction. In particular, the variation of curvature of field and astigmatic difference during zooming will become large, making it impossible to form high quality images.

It is also preferred that the zoom optical systems satisfies the following conditional expression (2):

$$0.1 < N^{(1/2)} \times Dmin/\Phi im < 1.0 \qquad (2),$$

where N is the number of zoom optical systems (the number of modules), Dmin is the distance between the optical axes of the zoom optical systems that have the shortest distance between their optical axes, and $\Phi im$ is the diameter of the image circle of the image pickup element.

Conditional expression (2) limits the distance between the plurality of taking optical systems. It is preferred that the distance between the optical axes be spaced apart from each other by an appropriate distance that is determined taking into account the amount of parallax, the image pickup area, and the lens diameter.

If the upper limit of conditional expression (2) is exceeded, the distance between the optical axes will become excessively large. Then, it will not be possible to efficiently make use of the image pickup area of the image pickup element while making the field of views of the optical systems identical.

If the lower limit of conditional expression (2) is not reached, the distance between the optical axis will become excessively small. Then, it will not be possible to efficiently make use of the image pickup area of the image pickup element while making the field of views of the optical systems identical.

It is also preferred that in each of the plurality of zoom optical systems, the first lens having a negative refractive power located closest to the object side in the first lens group satisfy the following conditional expression (3):

$$-50<(R1r+R1f)/(R1r-R1f)<0.8 \quad (3),$$

where R1f is the radius of curvature of the object side surface of the first lens having a negative refractive power, and R1r is the radius of curvature of the image side surface of the first lens having a negative refractive power.

In order to locate the entrance pupil at the object side and to make the front lens diameter small, it is preferred that the lens located closest to the object side have a negative refractive power and have a biconcave shape or a meniscus shape having a convex surface facing the object side and satisfying conditional expression (3).

If the condition is met, the position of the principal point of the a first lens having a negative refractive power is retracted, and the thickness of the first lens group can be made small accordingly. In consequence, the diameter of the first lens group is not necessitated to be large at the wide angle side.

If the upper limit of conditional expression (3) is exceeded, the principal point is advanced toward the object side, making it difficult to make the thickness of the first lens group small. In consequence, the diameter of the first lens group is necessitated to be large. Then, an unreasonable lens design with a small front lens diameter will not keep the paraxial relationship, making it impossible to achieve good imaging performance.

If the lower limit of conditional expression (3) is not reached, large spherical aberration will be generated in the first lens group in, for example, the telephoto side, leading to deterioration in the imaging performance.

As described before, it is preferred that the focusing lens groups in the respective zoom optical systems be held by separate members.

Separate frames for the focusing groups in the different zoom lenses enable individual correction of image plane variation among the zoom lenses ascribable to manufacturing errors or variations of the lenses. Thus, the quality of images formed by the optical systems can be improved. In consequence, a natural stereoscopic effect can be produced in the fused image.

It is preferred that each of the plurality of zoom optical systems satisfy the following conditional expressions (4) and (5):

$$-6.0<TLw/EXPw<1.0 \quad (4), \text{ and}$$

$$-5.0<TLt/EXPt<1.5 \quad (5),$$

where TLw is the overall length of the zoom optical system at the wide angle end, EXPw is the distance from the image pickup element to the exit pupil of the zoom optical system at the wide angle end, TLt is the overall length of the zoom optical system at the telephoto end, EXPt is the distance from the image pickup element to the exit pupil of the zoom optical system at the telephoto end.

In order to reduce influences of shading and cross talk, it is preferred that conditional expressions (4) and (5) be satisfied so that the telecentricity is maintained.

If the upper limits of conditional expressions (4) and (5) are exceeded, the influence of shading will become large, making brightness fall-off in the peripheral regions conspicuous. In addition, in the lens design in which the upper limits of conditional expressions (4) and (5) are exceeded, principal rays are deflected inward. This necessitates a large rear lens, which is apt to lead to interference of lenses.

If the lower limit of conditional expressions (4) and (5) are not reached, the influence of shading will become large, making brightness fall-off in the peripheral regions conspicuous. In addition, in the lens design in which the lower limits of conditional expressions (4) and (5) are not reached, principal rays are deflected strongly outward. This leads to an increase in the influence of cross talk of the images formed on the image pickup surface by the respective modules.

It is also preferred that each of the plurality of zoom optical systems have a field stop arranged on the object side or image side of the first lens group and having a shape substantially similar to the shape of the image pickup area of the zoom optical system or a field stop having a substantially similar shape arranged in the vicinity of the image pickup surface of the image pickup element.

In order to reduce cross talk of images formed by the respective modules in the adjoining regions of the image pickup areas, it is preferred that a field stop or the like be provided at a position at where the diameter of ray bundle comprising chief-ray and its marginal-rays is small and chief-rays are separated from each other. This will enable reliable separation of left and right images and efficient utilization of the area of the image pickup element.

It is more preferred that the conditional expressions be further limited as follows.

$$0.75<ENPw/fw<1.3 \quad (1)'$$

$$0.2<N^{(1/2)} \times D\text{min}/\Phi im<0.8 \quad (2)'$$

$$-30<(R1r+R1f)/(R1r-R1f)<0.4 \quad (3)'$$

$$-3.5<TLw/EXPw<0.6 \quad (4)'$$

$$-3.0<TLt/EXPt<1.0 \quad (5)'$$

It is still more preferred that the conditional expressions be further limited as follows.

$$0.8<ENPw/fw<1.1 \quad (1)''$$

$$0.3<N^{(1/2)} \times D\text{min}/\Phi im<0.7 \quad (2)''$$

$$-10<(R1r+R1f)/(R1r-R1f)<0.1 \quad (3)''$$

$$-2.5<TLw/EXPw<0.35 \quad (4)''$$

$$-2.0<TLt/EXPt<0.9 \quad (5)''$$

Now, a zoom lens (constituting a taking optical system) of an image pickup apparatus according to a first embodiment will be described. The image pickup apparatus has a plurality of zoom lenses. In the following embodiments, one zoom lens among the plurality of zoom lenses will be described with reference to cross sectional views and aberration diagrams.

Figure 5A:
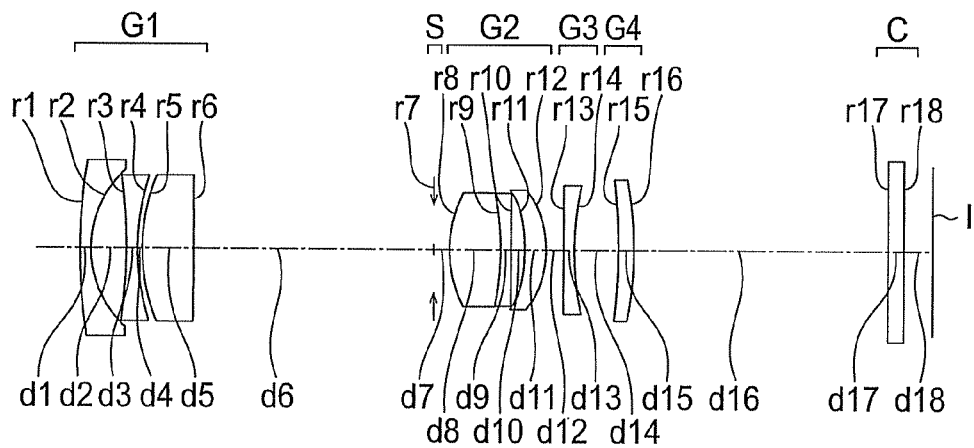
FIGS. 5A, 5B, and 5C are cross sectional views of a zoom lens according to a first embodiment in the state in which the zoom lens is focused on an object point at infinity, respectively at the wide angle end, in an intermediate focal length state, and at the telephoto end.
Figure 5B:
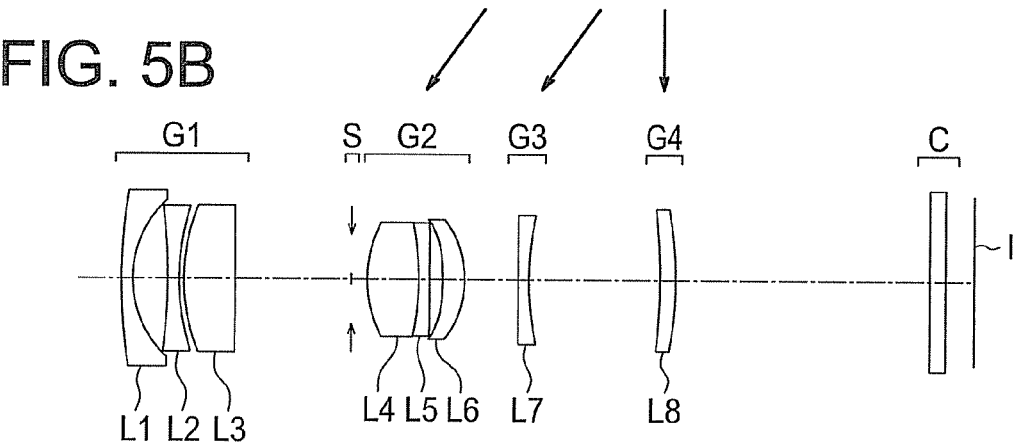
Figure 5C:
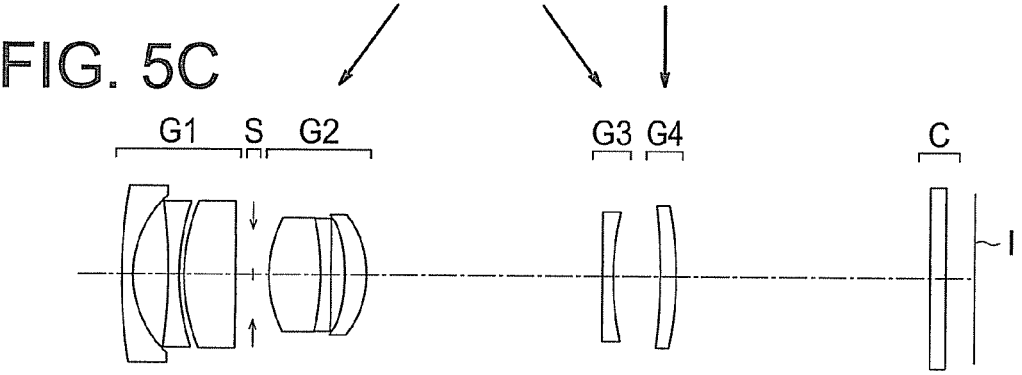

FIGS. 5A, 5B, and 5C are cross sectional views taken along the optical axis of the zoom lens according to the first embodiment in the state in which the zoom lens is focused on an object point at infinity, respectively at the wide angle end, in an intermediate focal length state, and at the telephoto end.

FIGS. 6A, 6B, 6C, and 6D are diagrams showing spherical aberration (SA), astigmatism (AS), distortion (DT), and chromatic aberration of magnification (CC) of the zoom lens according to the first embodiment in the state in which the zoom lens is focused on an object point at infinity at the wide angle end.

FIGS. 6E, 6F, 6G, and 6H are diagrams showing spherical aberration (SA), astigmatism (AS), distortion (DT), and chromatic aberration of magnification (CC) of the zoom lens according to the first embodiment in the state in which the zoom lens is focused on an object point at infinity in the intermediate focal length state.

FIGS. 6I, 6J, 6K, and 6L are diagrams showing spherical aberration (SA), astigmatism (AS), distortion (DT), and chromatic aberration of magnification (CC) of the zoom lens according to the first embodiment in the state in which the zoom lens is focused on an object point at infinity at the telephoto end.

In the aberration diagrams, FIY represents the image height. In the diagrams of spherical aberration and chromatic aberration of magnification, aberrations at wavelengths of 486.1 nm (F-line), 587.6 nm (d-line), and 656.3 nm (C-line) are shown respectively by dot-and-dash lines, solid lines, and broken lines. In the diagram of astigmatism, the solid lines represent astigmatism on the sagittal plane, and the broken lines represent astigmatism on the meridional plane. In the aberration diagrams, FNO represents the f-number. The same symbols in the aberration diagrams are used also in the embodiments described in the following.

As shown in FIGS. 5A, 5B, and 5C, the zoom lens according to the first embodiment includes, in order from its object side, a first lens group G1 having a negative refractive power, an aperture stop S, a second lens group G2 having a positive refractive power, a third lens group G3 having a negative refractive power, and a fourth lens group G4 having a positive refractive power. The third lens group G3 having a negative refractive power serves as the focusing lens group.

During zooming from the wide angle end to the telephoto end, the first lens group G1 is fixed, the second lens group G2 moves toward the object side, the third lens group G3 moves first toward the object side and then reverses its course toward the image side, and the fourth lens group G4 moves toward the object side.

The first lens group G1 is composed of a negative meniscus lens L1 having a convex surface directed toward the object side, a biconcave negative lens L2, and a biconvex positive lens L3. The second lens group G2 is composed of a cemented lens made up of a biconvex positive lens L4 and a negative meniscus lens L5 having a convex surface directed toward the image side, and a positive meniscus lens L6 having a convex surface directed toward the image side. The third lens group G3 is composed of a biconcave negative lens L7. The fourth lens group G4 is composed of a positive meniscus lens L8 having a convex surface directed toward the image side. The lens elements in each lens group are arranged in the mentioned order from the object side.

There are four aspheric surfaces, which include both surfaces of the positive meniscus lens L6 in the second lens group G2, and both surfaces of the biconcave negative lens L7 in the third lens group G3.

Figure 7A:
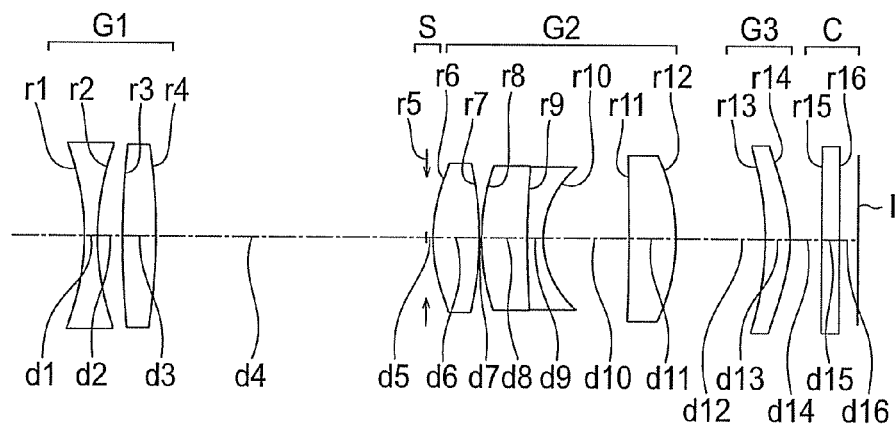
FIGS. 7A, 7B, and 7C are cross sectional views of a zoom lens according to a second embodiment in the state in which the zoom lens is focused on an object point at infinity, respectively at the wide angle end, in an intermediate focal length state, and at the telephoto end.
Figure 7B:
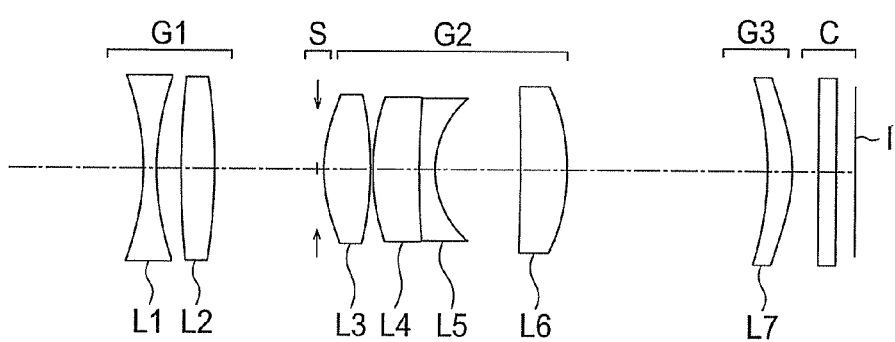
Figure 7C:
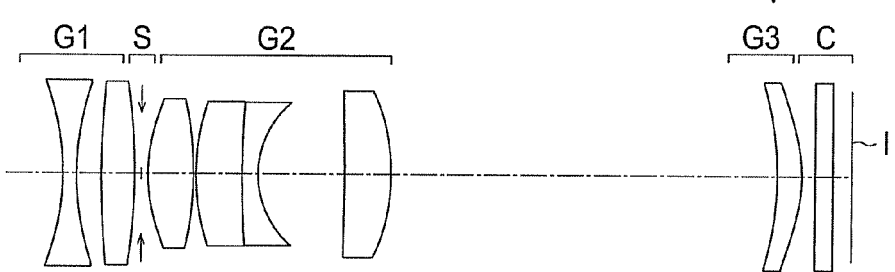
Figure 8A:
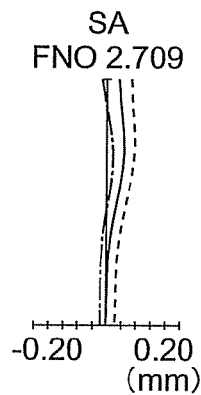
FIGS. 8A, 8B, 8C, and 8D are diagrams showing spherical aberration, astigmatism, distortion, and chromatic aberration of magnification of the zoom lens according to the second embodiment in the state in which the zoom lens is focused on an object point at infinity at the wide angle end.
Figure 8B:
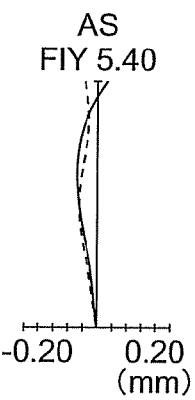
Figure 8C:
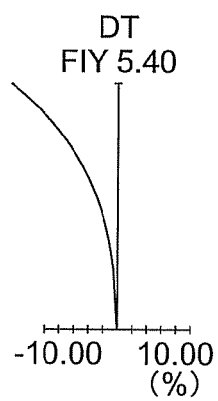
Figure 8D:
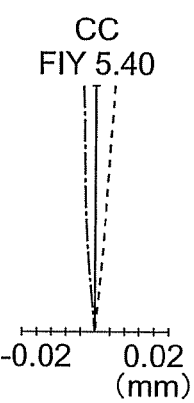
Figure 8E:
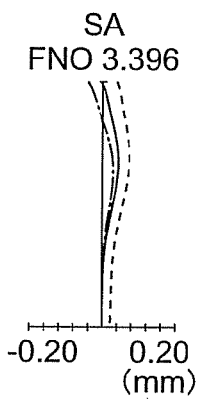
FIGS. 8E, 8F, 8G, and 8H are diagrams showing spherical aberration, astigmatism, distortion, and chromatic aberration of magnification of the zoom lens according to the second embodiment in the state in which the zoom lens is focused on an object point at infinity in the intermediate focal length state.
Figure 8F:
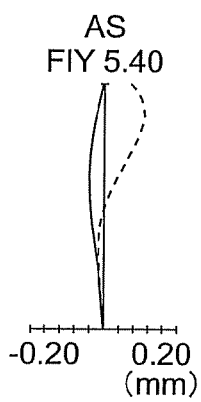
Figure 8G:
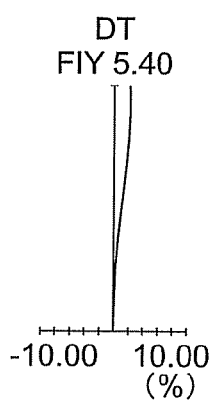
Figure 8H:
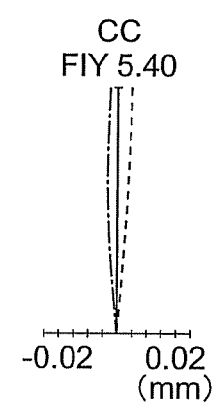
Figure 8I:
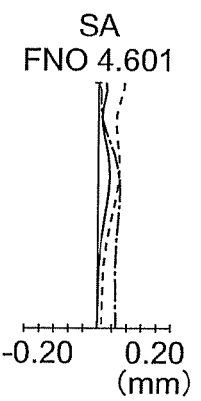
FIGS. 8I, 8J, 8K, and 8L are diagrams showing spherical aberration, astigmatism, distortion, and chromatic aberration of magnification of the zoom lens according to the second embodiment in the state in which the zoom lens is focused on an object point at infinity at the telephoto end.
Figure 8J:
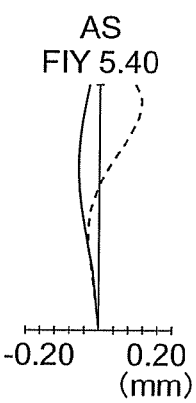
Figure 8K:
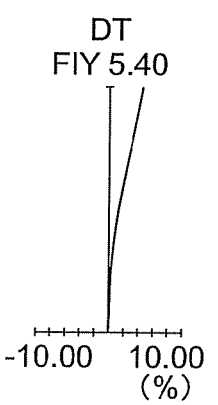
Figure 8L:
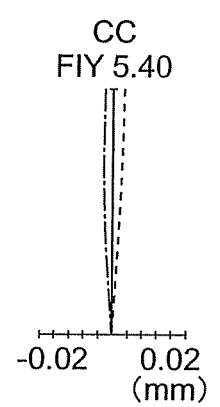

Next, a zoom lens (taking optical system) of an image pickup apparatus according to a second embodiment will be described. FIGS. 7A, 7B, and 7C are cross sectional views taken along the optical axis of the zoom lens according to the second embodiment in the state in which the zoom lens is focused on an object point at infinity, respectively at the wide angle end, in an intermediate focal length state, and at the telephoto end.

FIGS. 8A, 8B, 8C, and 8D are diagrams showing spherical aberration (SA), astigmatism (AS), distortion (DT), and chromatic aberration of magnification (CC) of the zoom lens according to the second embodiment in the state in which the zoom lens is focused on an object point at infinity at the wide angle end.

FIGS. 8E, 8F, 8G, and 8H are diagrams showing spherical aberration (SA), astigmatism (AS), distortion (DT), and chromatic aberration of magnification (CC) of the zoom lens according to the second embodiment in the state in which the zoom lens is focused on an object point at infinity in the intermediate focal length state.

FIGS. 8I, 8J, 8K, and 8L are diagrams showing spherical aberration (SA), astigmatism (AS), distortion (DT), and chromatic aberration of magnification (CC) of the zoom lens according to the second embodiment in the state in which the zoom lens is focused on an object point at infinity at the telephoto end.

As shown in FIGS. 7A, 7B, and 7C, the zoom lens according to the second embodiment includes, in order from its object side, a first lens group G1 having a negative refractive power, an aperture stop S, a second lens group G2 having a positive refractive power, and a third lens group G3 having a positive refractive power. The third lens group G3 having a positive refractive power serves as the focusing lens group.

During zooming from the wide angle end to the telephoto end, the first lens group G1 moves first toward the image side and then reverses its course toward the object side, the second lens group G2 moves toward the object side, and the third lens group G3 moves toward the image side.

The first lens group G1 is composed of a biconcave negative lens L1 and a biconvex positive lens L2. The second lens group G2 is composed of a biconvex positive lens L3, a cemented lens made up of a positive meniscus lens L4 having a convex surface directed toward the object side and a negative meniscus lens L5 having a convex surface directed toward the object side, and a positive meniscus lens L6 having a convex surface directed toward the image side. The third lens group G3 is composed of a positive meniscus lens L7 having a convex surface directed toward the object side. The lens elements in each lens group are arranged in the mentioned order from the object side.

There are six aspheric surfaces, which include both surfaces of the biconcave negative lens L1 in the first lens group G1, both surfaces of the biconvex positive lens L3 in the second lens group G2, the image side surface of the positive meniscus lens L6 in the second lens group G2, and the image side surface of the positive meniscus lens L7 in the third lens group G3.

Figure 9A:
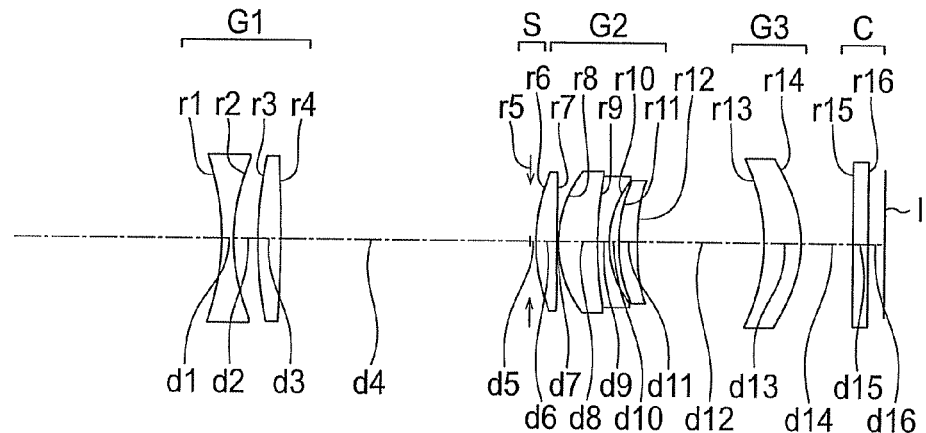
FIGS. 9A, 9B, and 9C are cross sectional views of a zoom lens according to a third embodiment in the state in which the zoom lens is focused on an object point at infinity, respectively at the wide angle end, in an intermediate focal length state, and at the telephoto end.
Figure 9B:
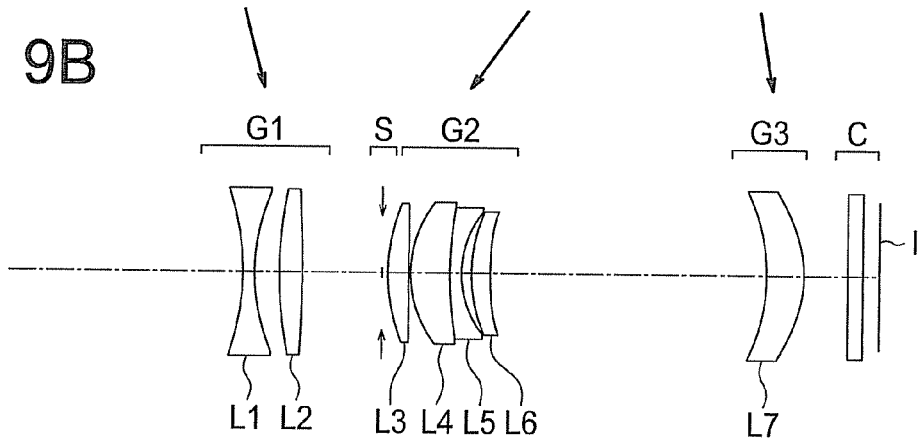
Figure 9C:
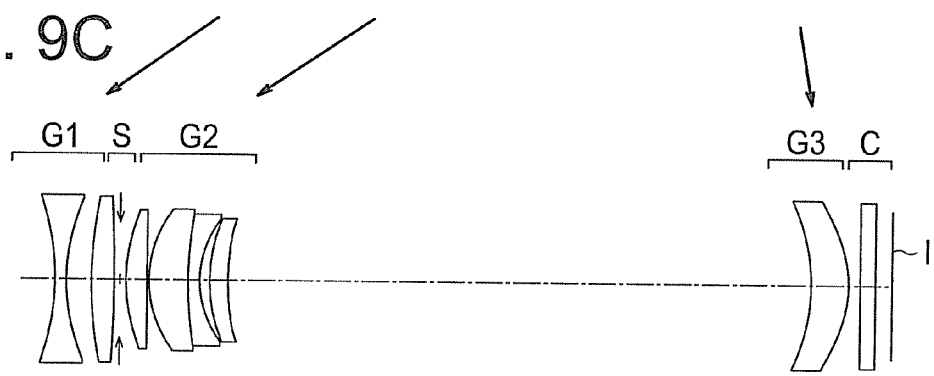

Next, a zoom lens (taking optical system) of an image pickup apparatus according to a third embodiment will be described. FIGS. 9A, 9B, and 9C are cross sectional views taken along the optical axis of the zoom lens according to the third embodiment in the state in which the zoom lens is focused on an object point at infinity, respectively at the wide angle end, in an intermediate focal length state, and at the telephoto end.

FIGS. 10A, 10, 10C, and 10D are diagrams showing spherical aberration (SA), astigmatism (AS), distortion (DT), and chromatic aberration of magnification (CC) of the zoom lens according to the third embodiment in the state in which the zoom lens is focused on an object point at infinity at the wide angle end.

FIGS. 10E, 10F, 10G, and 10H are diagrams showing spherical aberration (SA), astigmatism (AS), distortion (DT), and chromatic aberration of magnification (CC) of the zoom lens according to the third embodiment in the state in which the zoom lens is focused on an object point at infinity in the intermediate focal length state.

FIGS. 10I, 10J, 10K, and 10L are diagrams showing spherical aberration (SA), astigmatism (AS), distortion (DT), and chromatic aberration of magnification (CC) of the zoom lens according to the third embodiment in the state in which the zoom lens is focused on an object point at infinity at the telephoto end.

As shown in FIGS. 9A, 9B, and 9C, the zoom lens according to the third embodiment includes, in order from its object side, a first lens group G1 having a negative refractive power, an aperture stop S, a second lens group G2 having a positive refractive power, and a third lens group G3 having a positive refractive power. The third lens group G3 having a positive refractive power serves as the focusing lens group.

During zooming from the wide angle end to the telephoto end, the first lens group G1 moves first toward the image side and then reverses its course toward the object side, the second lens group G2 moves toward the object side, and the third lens group G3 moves toward the image side.

The first lens group G1 is composed of a biconcave negative lens L1 and a biconvex positive lens L2. The second lens group G2 is composed of a positive meniscus lens L3 having a convex surface directed toward the object side, a cemented lens made up of a positive meniscus lens L4 having a convex surface directed toward the object side and a negative meniscus lens L5 having a convex surface directed toward the object side, and a positive meniscus lens L6 having a convex surface directed toward the object side. The third lens group G3 is composed of a positive meniscus lens L7 having a convex surface directed toward the image side. The lens elements in each lens group are arranged in the mentioned order from the object side.

There are six aspheric surfaces, which include both surfaces of the biconcave negative lens L1 in the first lens group G1, both surfaces of the biconvex positive lens L3 in the second lens group G2, the image side surface of the positive meniscus lens L6 in the second lens group G2, and the image side surface of the positive meniscus lens L7 in the third lens group G3.

Figure 11A:
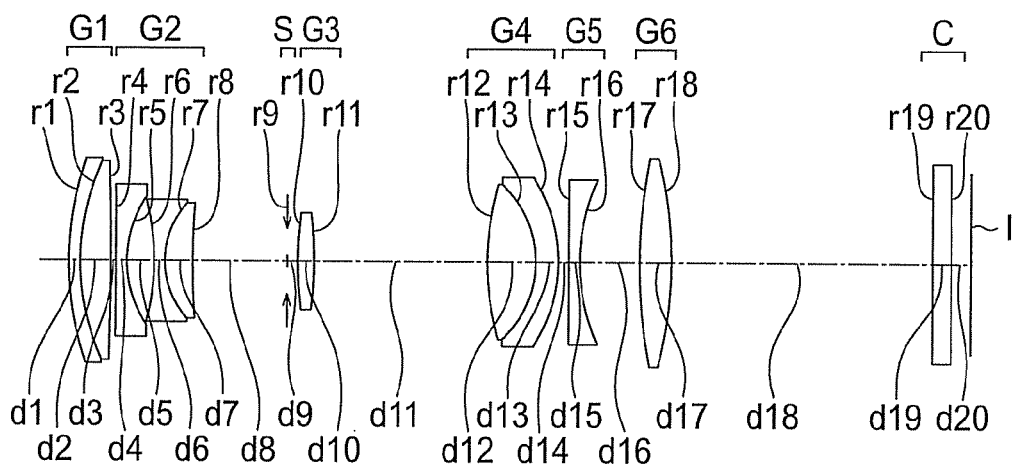
FIGS. 11A, 11B, and 11C are cross sectional views of a zoom lens according to a fourth embodiment in the state in which the zoom lens is focused on an object point at infinity, respectively at the wide angle end, in an intermediate focal length state, and at the telephoto end.
Figure 11B:
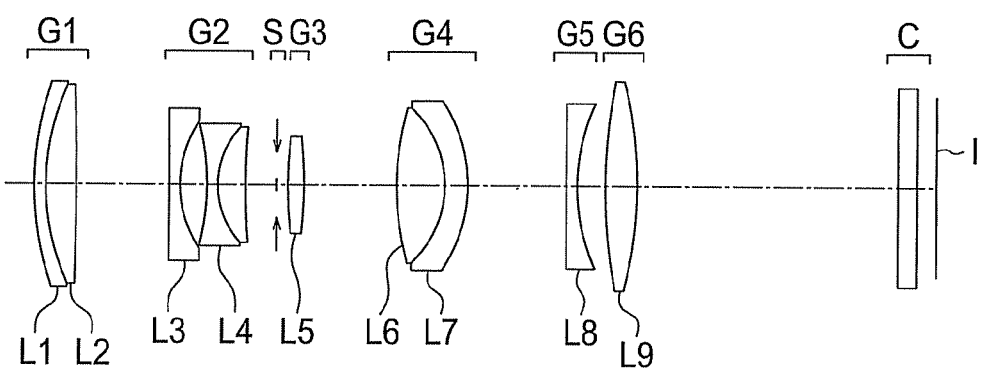
Figure 11C:
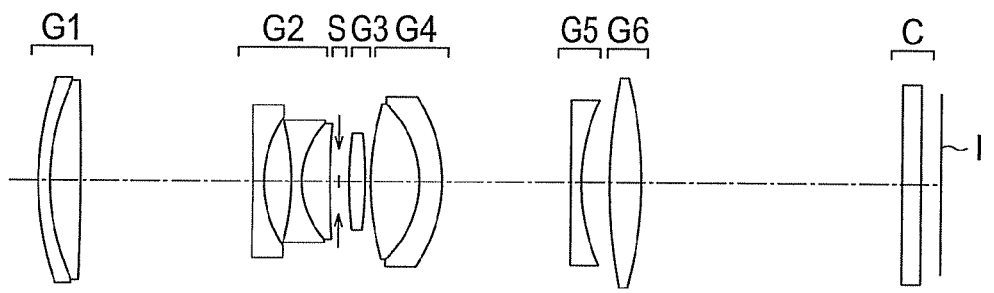

Next, a zoom lens (taking optical system) of an image pickup apparatus according to a fourth embodiment will be described. FIGS. 11A, 11B, and 11C are cross sectional views taken along the optical axis of the zoom lens according to the fourth embodiment in the state in which the zoom lens is focused on an object point at infinity, respectively at the wide angle end, in an intermediate focal length state, and at the telephoto end.

FIGS. 12A, 12B, 12C, and 12D are diagrams showing spherical aberration (SA), astigmatism (AS), distortion (DT), and chromatic aberration of magnification (CC) of the zoom lens according to the fourth embodiment in the state in which the zoom lens is focused on an object point at infinity at the wide angle end.

FIGS. 12E, 12F, 12G, and 12H are diagrams showing spherical aberration (SA), astigmatism (AS), distortion (DT), and chromatic aberration of magnification (CC) of the zoom lens according to the fourth embodiment in the state in which the zoom lens is focused on an object point at infinity in the intermediate focal length state.

FIGS. 12I, 12J, 12K, and 12L are diagrams showing spherical aberration (SA), astigmatism (AS), distortion (DT), and chromatic aberration of magnification (CC) of the zoom lens according to the fourth embodiment in the state in which the zoom lens is focused on an object point at infinity at the telephoto end.

As shown in FIGS. 11A, 11B, and 11C, the zoom lens according to the fourth embodiment includes, in order from its object side, a first lens group G1 having a positive refractive power, a second lens group G2 having a negative refractive power, an aperture stop S, a third lens group G3 having a positive refractive power, a fourth lens group G4 having a positive refractive power, a fifth lens group G5 having a negative refractive power, and a sixth lens group G6 having a positive refractive power. The fifth lens group G5 having a negative refractive power serves as the focusing lens group.

During zooming from the wide angle end to the telephoto end, the first lens group G1 is fixed, the second lens group G2 moves toward the image side, the third lens group G3 moves toward the image side, the fourth lens group G4 moves toward the object side, the fifth lens group G5 moves first toward the image side and then reverses its course toward the object side, and the sixth lens group G6 is fixed. The fifth lens group G5 having a negative refractive power serves as the focusing lens group.

The first lens group G1 is composed of a cemented lens made up of a negative meniscus lens L1 having a convex surface directed toward the object side and a biconvex positive lens L2. The second lens group G2 is composed of a biconcave negative lens L3 and a cemented lens made up of a biconcave negative lens L4 and a positive meniscus lens L4 having a convex surface directed toward the object side. The third lens group G3 is composed of a biconvex positive lens L5. The fourth lens group G4 is composed of a cemented lens made up of a biconvex positive lens L6 and a negative meniscus lens L7 having a convex surface directed toward the image side. The fifth lens group G5 is composed of a biconcave negative lens L8. The sixth lens group G6 is composed of a biconvex positive lens L9. The lens elements in each lens group are arranged in the mentioned order from the object side.

There are three aspheric surfaces, which include the image side surface of the biconvex positive lens L2 in the first lens group G1, the object side surface of the biconvex positive lens L5 in the third lens group G3, and the object side surface of the biconvex positive lens L6 in the fourth lens group G4.

Figure 13A:
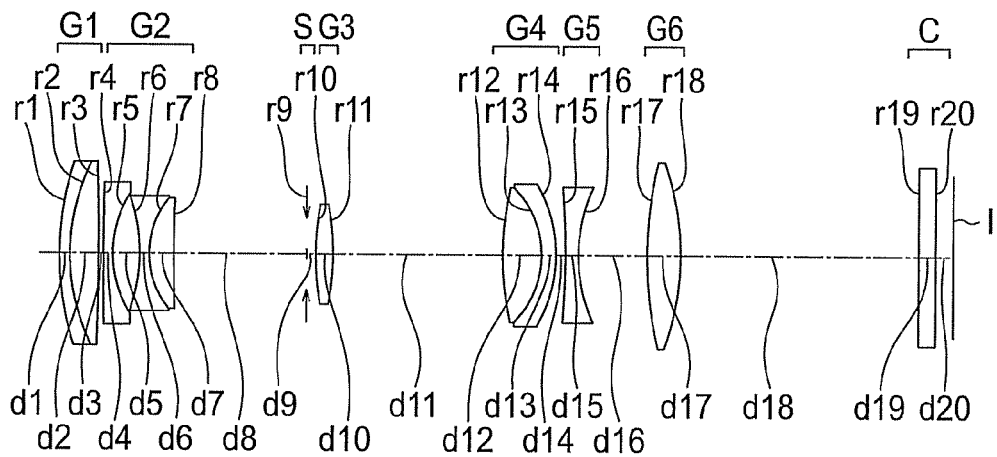
FIGS. 13A, 13B, and 13C are cross sectional views of a zoom lens according to a fifth embodiment in the state in which the zoom lens is focused on an object point at infinity, respectively at the wide angle end, in an intermediate focal length state, and at the telephoto end.
Figure 13B:
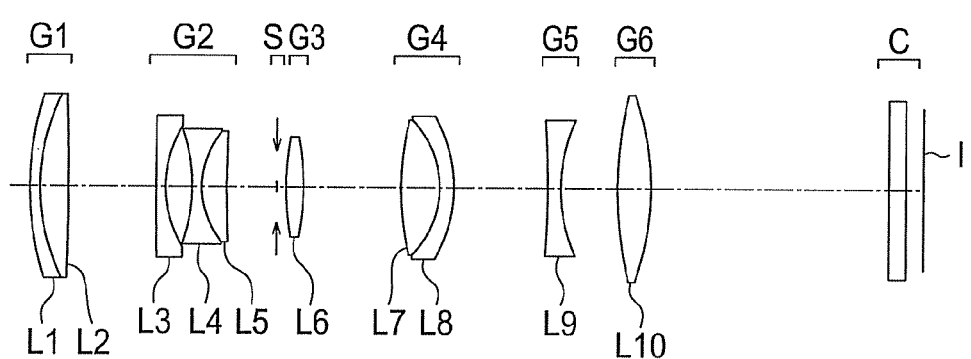
Figure 13C:
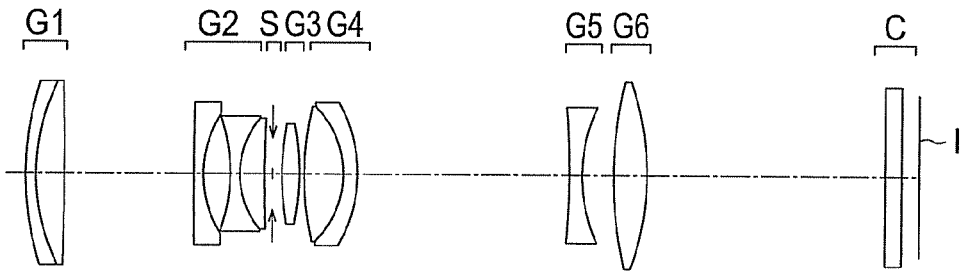

Next, a zoom lens (taking optical system) of an image pickup apparatus according to a fifth embodiment will be described. FIGS. 13A, 13B, and 13C are cross sectional views taken along the optical axis of the zoom lens according to the fifth embodiment in the state in which the zoom lens is focused on an object point at infinity, respectively at the wide angle end, in an intermediate focal length state, and at the telephoto end.

FIGS. 14A, 14B, 14C, and 14D are diagrams showing spherical aberration (SA), astigmatism (AS), distortion (DT), and chromatic aberration of magnification (CC) of the zoom lens according to the fifth embodiment in the state in which the zoom lens is focused on an object point at infinity at the wide angle end.

FIGS. 14E, 14F, 14G, and 14H are diagrams showing spherical aberration (SA), astigmatism (AS), distortion (DT), and chromatic aberration of magnification (CC) of the zoom lens according to the fifth embodiment in the state in which the zoom lens is focused on an object point at infinity in the intermediate focal length state.

FIGS. 14I, 14J, 14K, and 14L are diagrams showing spherical aberration (SA), astigmatism (AS), distortion (DT), and chromatic aberration of magnification (CC) of the zoom lens according to the fifth embodiment in the state in which the zoom lens is focused on an object point at infinity at the telephoto end.

As shown in FIGS. 13A, 13B, and 13C, the zoom lens according to the fifth embodiment includes, in order from its object side, a first lens group G1 having a positive refractive power, a second lens group G2 having a negative refractive power, an aperture stop S, a third lens group G3 having a positive refractive power, a fourth lens group G4 having a positive refractive power, a fifth lens group G5 having a negative refractive power, and a sixth lens group G6 having a positive refractive power. The fifth lens group G5 having a negative refractive power serves as the focusing lens group.

During zooming from the wide angle end to the telephoto end, the first lens group G1 is fixed, the second lens group G2 moves toward the image side, the third lens group G3 moves toward the object side, the fourth lens group G4 moves toward the object side, the fifth lens group G5 moves toward the image side, and the sixth lens group G6 is fixed.

The first lens group G1 is composed of a cemented lens made up of a negative meniscus lens L1 having a convex surface directed toward the object side and a biconvex positive lens L2. The second lens group G2 is composed of a negative meniscus lens L3 having a convex surface directed toward the object side and a cemented lens made up of a biconcave negative lens L4 and a positive meniscus lens L5 having a convex surface directed toward the object side. The third lens group G3 is composed of a biconvex positive lens L6. The fourth lens group G4 is composed of a cemented lens made up of a biconvex positive lens L7 and a negative meniscus lens L8 having a convex surface directed toward the image side. The fifth lens group G5 is composed of a biconcave negative lens L8. The sixth lens group G6 is composed of a biconvex positive lens L9. The lens elements in each lens group are arranged in the mentioned order from the object side.

There are three aspheric surfaces, which include the image side surface of the biconvex positive lens L2 in the first lens group G1, the object side surface of the biconvex positive lens L6 in the third lens group G3, and the object side surface of the biconvex positive lens L7 in the fourth lens group G4.

Figure 15A:
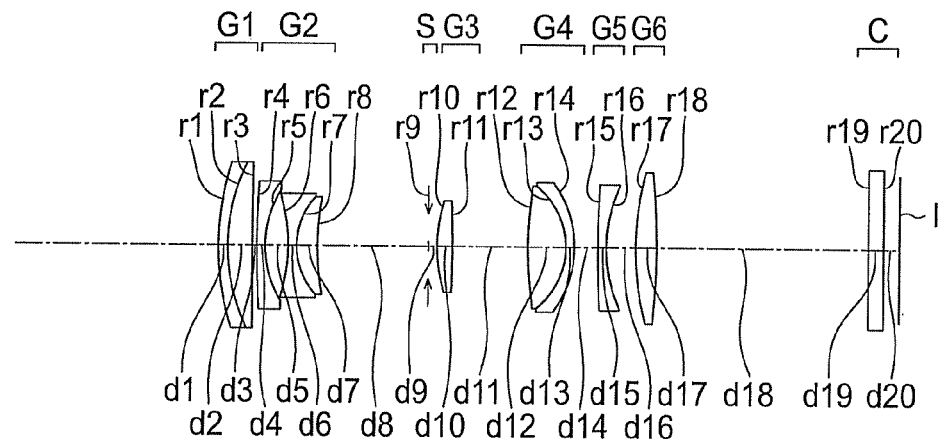
FIGS. 15A, 15B, and 15C are cross sectional views of a zoom lens according to a sixth embodiment in the state in which the zoom lens is focused on an object point at infinity, respectively at the wide angle end, in an intermediate focal length state, and at the telephoto end.
Figure 15B:
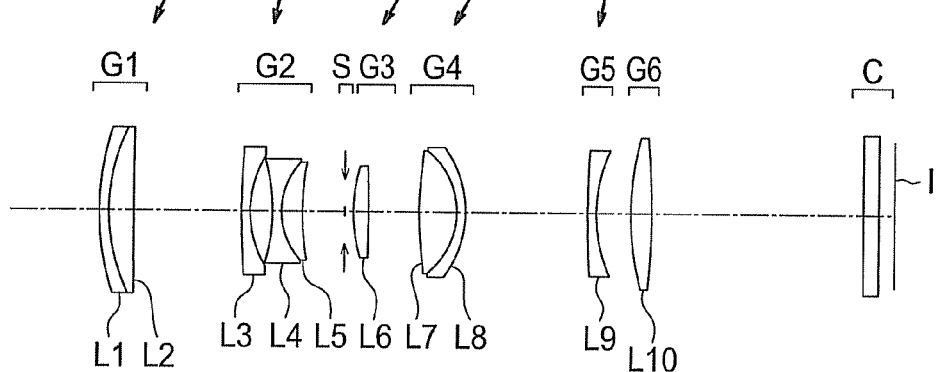
Figure 15C:
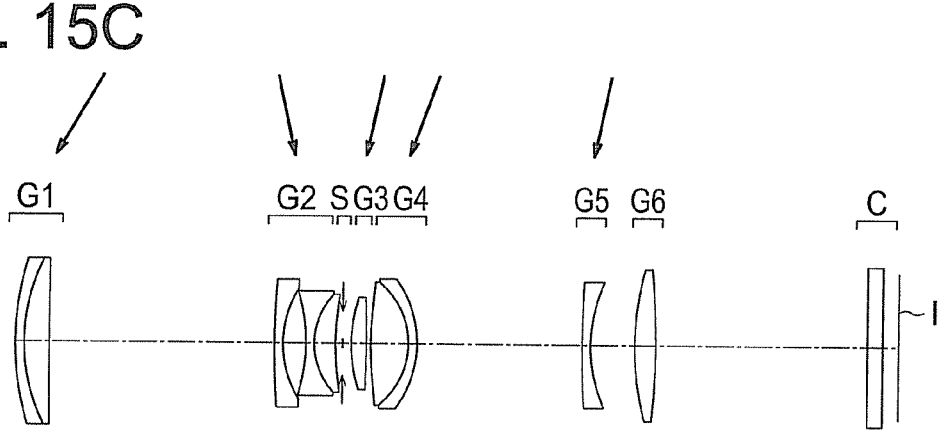

Next, a zoom lens (taking optical system) of an image pickup apparatus according to a sixth embodiment will be described. FIGS. 15A, 15B, and 15C are cross sectional views taken along the optical axis of the zoom lens according to the sixth embodiment in the state in which the zoom lens is focused on an object point at infinity, respectively at the wide angle end, in an intermediate focal length state, and at the telephoto end.

FIGS. 16A, 16B, 16C, and 16D are diagrams showing spherical aberration (SA), astigmatism (AS), distortion (DT), and chromatic aberration of magnification (CC) of the zoom lens according to the sixth embodiment in the state in which the zoom lens is focused on an object point at infinity at the wide angle end.

FIGS. 16E, 16F, 16G, and 16H are diagrams showing spherical aberration (SA), astigmatism (AS), distortion (DT), and chromatic aberration of magnification (CC) of the zoom lens according to the sixth embodiment in the state in which the zoom lens is focused on an object point at infinity in the intermediate focal length state.

FIGS. 16I, 16J, 16K, and 16L are diagrams showing spherical aberration (SA), astigmatism (AS), distortion (DT), and chromatic aberration of magnification (CC) of the zoom lens according to the sixth embodiment in the state in which the zoom lens is focused on an object point at infinity at the telephoto end.

As shown in FIGS. 15A, 15B, and 15C, the zoom lens according to the sixth embodiment includes, in order from its object side, a first lens group G1 having a positive refractive power, a second lens group G2 having a negative refractive power, an aperture stop S, a third lens group G3 having a positive refractive power, a fourth lens group G4 having a positive refractive power, a fifth lens group G5 having a negative refractive power, and a sixth lens group G6 having a positive refractive power. The fifth lens group G5 having a negative refractive power serves as the focusing lens group.

During zooming from the wide angle end to the telephoto end, the first lens group G1 moves toward the object side, the second lens group G2 moves first toward the object side and then reverses its course toward the image side, the third lens group G3 moves toward the object side, the fourth lens group G4 moves toward the object side, the fifth lens group G5 moves toward the object side, and the sixth lens group G6 is fixed.

The first lens group G1 is composed of a cemented lens made up of a negative meniscus lens L1 having a convex surface directed toward the object side and a positive meniscus lens L2 having a convex surface directed toward the object side. The second lens group G2 is composed of a negative meniscus lens L3 having a convex surface directed toward the object side and a cemented lens made up of a biconcave negative lens L4 and a positive meniscus lens L5 having a convex surface directed toward the object side. The third lens group G3 is composed of a biconvex positive lens L6. The fourth lens group G4 is composed of a cemented lens made up of a biconvex positive lens L7 and a negative meniscus lens L8 having a convex surface directed toward the image side. The fifth lens group G5 is composed of a negative meniscus lens L9 having a convex surface directed toward the object side. The sixth lens group G6 is composed of a biconvex positive lens L10. The lens elements in each lens group are arranged in the mentioned order from the object side.

There are three aspheric surfaces, which include the image side surface of the positive meniscus lens L2 in the first lens group G1, the object side surface of the biconvex positive lens L6 in the third lens group G3, and the object side surface of the biconvex positive lens L7 in the fourth lens group G4.

Figure 17A:
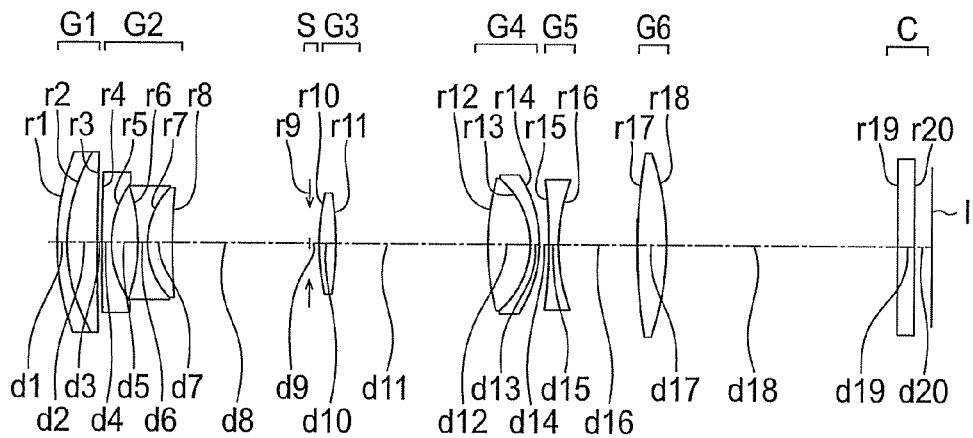
FIGS. 17A, 17B, and 17C are cross sectional views of a zoom lens according to a seventh embodiment in the state in which the zoom lens is focused on an object point at infinity, respectively at the wide angle end, in an intermediate focal length state, and at the telephoto end.
Figure 17B:
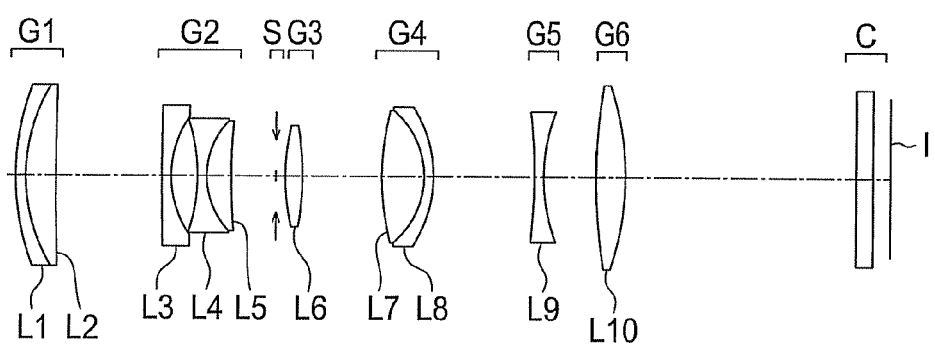
Figure 17C:
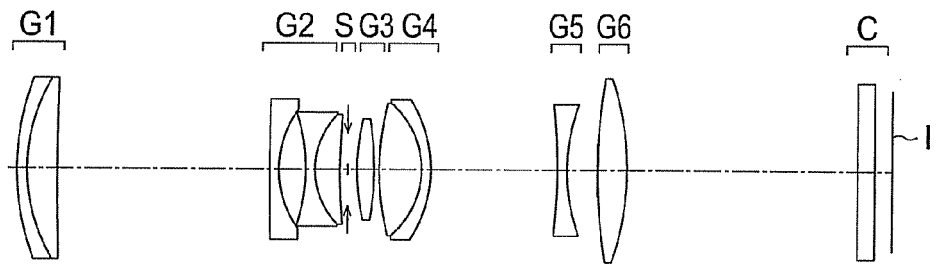

Next, a zoom lens (taking optical system) of an image pickup apparatus according to a seventh embodiment will be described. FIGS. 17A, 17B, and 17C are cross sectional views taken along the optical axis of the zoom lens according to the seventh embodiment in the state in which the zoom lens is focused on an object point at infinity, respectively at the wide angle end, in an intermediate focal length state, and at the telephoto end.

FIGS. 18A, 18B, 18C, and 18D are diagrams showing spherical aberration (SA), astigmatism (AS), distortion (DT), and chromatic aberration of magnification (CC) of the zoom lens according to the seventh embodiment in the state in which the zoom lens is focused on an object point at infinity at the wide angle end.

FIGS. 18E, 18F, 18G, and 18H are diagrams showing spherical aberration (SA), astigmatism (AS), distortion (DT), and chromatic aberration of magnification (CC) of the zoom lens according to the seventh embodiment in the state in which the zoom lens is focused on an object point at infinity in the intermediate focal length state.

FIGS. 18I, 18J, 18K, and 18L are diagrams showing spherical aberration (SA), astigmatism (AS), distortion (DT), and chromatic aberration of magnification (CC) of the zoom lens according to the seventh embodiment in the state in which the zoom lens is focused on an object point at infinity at the telephoto end.

As shown in FIGS. 17A, 17B, and 17C, the zoom lens according to the seventh embodiment includes, in order from its object side, a first lens group G1 having a positive refractive power, a second lens group G2 having a negative refractive power, an aperture stop S, a third lens group G3 having a positive refractive power, a fourth lens group G4 having a positive refractive power, a fifth lens group G5 having a negative refractive power, and a sixth lens group G6 having a positive refractive power. The fifth lens group G5 having a negative refractive power serves as the focusing lens group.

During zooming from the wide angle end to the telephoto end, the first lens group G1 is fixed, the second lens group G2 moves toward the image side, the third lens group G3 moves toward the image side, the fourth lens group G4 moves toward the object side, the fifth lens group G5 moves toward the image side, and the sixth lens group G6 is fixed.

The first lens group G1 is composed of a cemented lens made up of a negative meniscus lens L1 having a convex surface directed toward the object side and a positive meniscus lens L2 having a convex surface directed toward the object side. The second lens group G2 is composed of a negative meniscus lens L3 having a convex surface directed toward the object side and a cemented lens made up of a biconcave negative lens L4 and a positive meniscus lens L5 having a convex surface directed toward the object side. The third lens group G3 is composed of a biconvex positive lens L6. The fourth lens group G4 is composed of a cemented lens made up of a biconvex positive lens L7 and a negative meniscus lens L8 having a convex surface directed toward the image side. The fifth lens group G5 is composed of a biconcave negative lens L9. The sixth lens group G6 is composed of a biconvex positive lens L10. The lens elements in each lens group are arranged in the mentioned order from the object side.

There are three aspheric surfaces, which include the image side surface of the positive meniscus lens L2 in the first lens group G1, the object side surface of the biconvex positive lens L6 in the third lens group G3, and the object side surface of the biconvex positive lens L7 in the fourth lens group G4.

Figure 19A:
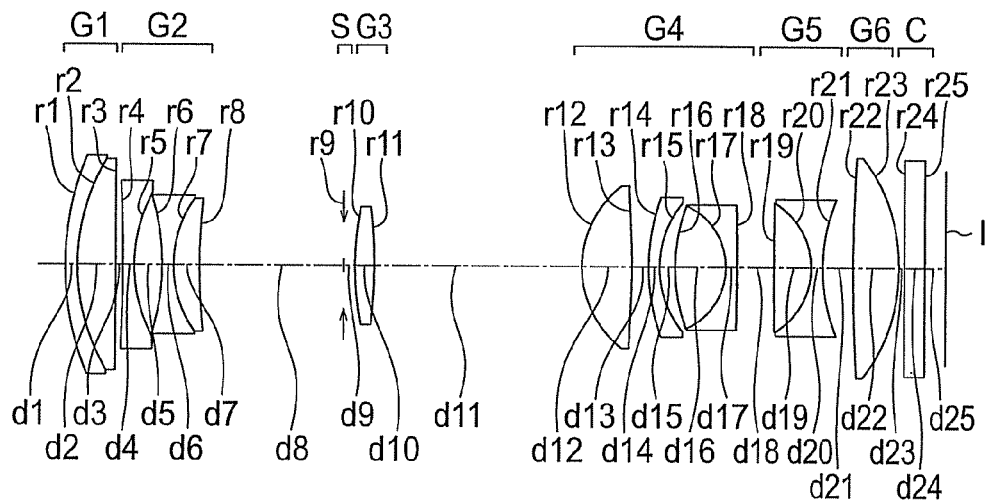
FIGS. 19A, 19B, and 19C are cross sectional views of a zoom lens according to a eighth embodiment in the state in which the zoom lens is focused on an object point at infinity, respectively at the wide angle end, in an intermediate focal length state, and at the telephoto end.
Figure 19B:
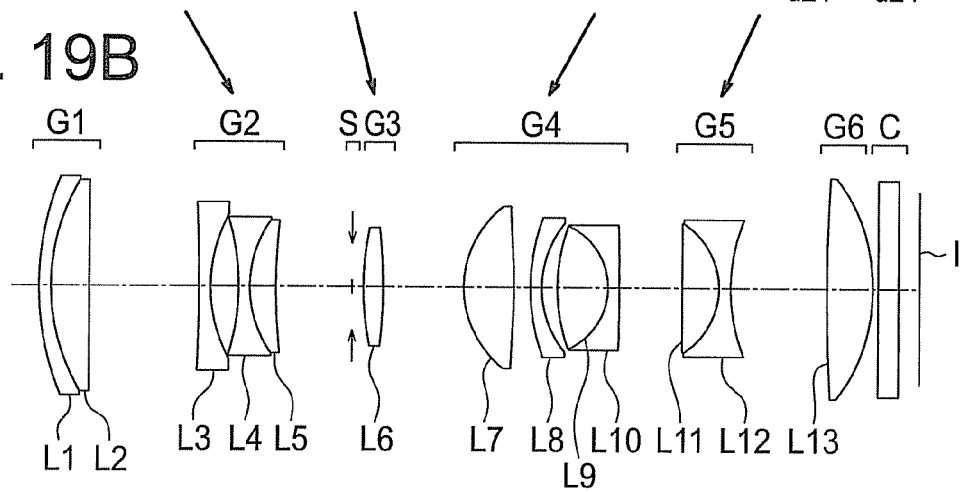
Figure 19C:
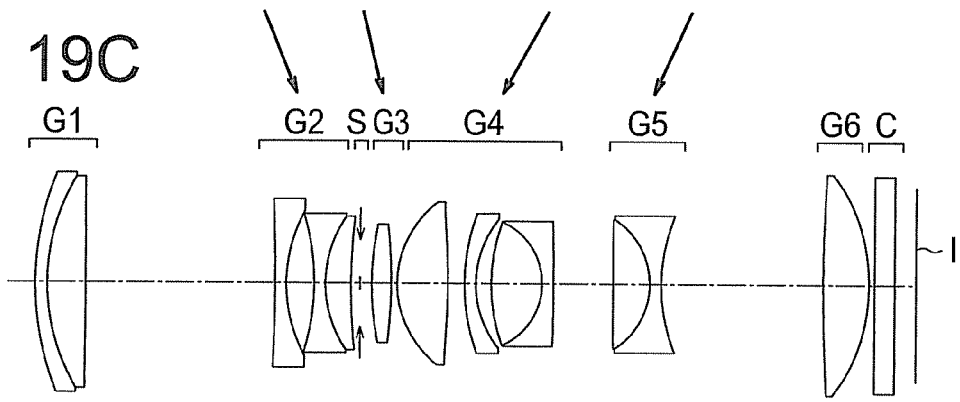

Next, a zoom lens (taking optical system) of an image pickup apparatus according to a eighth embodiment will be described. FIGS. 19A, 19B, and 19C are cross sectional views taken along the optical axis of the zoom lens according to the eighth embodiment in the state in which the zoom lens is focused on an object point at infinity, respectively at the wide angle end, in an intermediate focal length state, and at the telephoto end.

FIGS. 20A, 20B, 20C, and 20D are diagrams showing spherical aberration (SA), astigmatism (AS), distortion (DT), and chromatic aberration of magnification (CC) of the zoom lens according to the eighth embodiment in the state in which the zoom lens is focused on an object point at infinity at the wide angle end.

FIGS. 20E, 20F, 20G, and 20H are diagrams showing spherical aberration (SA), astigmatism (AS), distortion (DT), and chromatic aberration of magnification (CC) of the zoom lens according to the eighth embodiment in the state in which the zoom lens is focused on an object point at infinity in the intermediate focal length state.

FIGS. 20I, 20J, 20K, and 20L are diagrams showing spherical aberration (SA), astigmatism (AS), distortion (DT), and chromatic aberration of magnification (CC) of the zoom lens according to the eighth embodiment in the state in which the zoom lens is focused on an object point at infinity at the telephoto end.

As shown in FIGS. 19A, 19B, and 19C, the zoom lens according to the eighth embodiment includes, in order from its object side, a first lens group G1 having a positive refractive power, a second lens group G2 having a negative refractive power, an aperture stop S, a third lens group G3 having a positive refractive power, a fourth lens group G4 having a positive refractive power, a fifth lens group G5 having a negative refractive power, and a sixth lens group G6 having a positive refractive power. The fifth lens group G5 (composed of a cemented lens) having a negative refractive power serves as the focusing lens group.

During zooming from the wide angle end to the telephoto end, the first lens group G1 is fixed, the second lens group G2 moves toward the image side, the third lens group G3 moves toward the image side, the fourth lens group G4 moves toward the object side, the fifth lens group G5 moves toward the object side, and the sixth lens group G6 is fixed.

The first lens group G1 is composed of cemented lens made up of a negative meniscus lens L1 having a convex surface directed toward the object side and a biconvex positive lens L2. The second lens group G2 is composed of a biconcave negative lens L3 and a cemented lens made up of biconcave negative lens L4 and a positive meniscus lens L5 having a convex surface directed toward the object side. The third lens group G3 is composed of a biconvex positive lens L6. The fourth lens group G4 is composed of a biconvex positive lens L7, a negative meniscus lens L8 having a convex surface directed toward the object side, and a cemented lens made up of a biconvex positive lens L9 and a negative meniscus lens L10 having a convex surface directed toward the image side. The fifth lens group G5 is composed of cemented lens made up of a biconvex positive lens L11 and a biconcave negative lens L12. The sixth lens group G6 is composed of a biconvex positive lens L13. The lens elements in each lens group are arranged in the mentioned order from the object side.

There are five aspheric surfaces, which include the object side surface of the negative meniscus lens L1 in the first lens group G1, the object side surface of the biconvex positive lens L6 in the third lens group G3, both surfaces of the biconvex positive lens L7 in the fourth lens group G4, and the image side surface of the biconvex positive lens L13 in the third lens group G6.

Numerical data of embodiments from a first embodiment to a eighth embodiment described above is shown below. In the embodiments from a first embodiment to a eighth embodiment, r denotes radius of curvature of each lens surface, d denotes a lens thickness or a distance between two lenses, nd denotes a refractive index for a d-line ($\lambda$=587.6 nm), vd denotes a Abbe constant for a d-line, f denotes a focal length of the entire optical system, $F_{no}$ denotes an F number, $\omega$ denotes a half angle of field (°).

In a specification sheet being used for explanation of the embodiment, a surface marked * (asterisk) denotes an aspheric surface. When H is let to be a height in a direction orthogonal to the optical axis, X(H) is let to be an amount of displacement in a direction of an optical axis at height H a vertex, r is let to be a paraxial radius of curvature, K is let to be a conical coefficient, and A4, A6, A8, A10, and A12 is let to be aspherical surface coefficients of a fourth order, a sixth order, an eight order, a tenth order, and a twelfth order respectively, a shape of the aspheric surface is described by the following expression (a).

$$X(H)=(H^2/r)/\{1+[1-(1+K)\cdot(H^2/r^2)]^{1/2}\}+A4H^4+A6H^6+A8H^8+A10H^{10} \tag{a}$$

EXAMPLE 1

Unit mm
Surface data

| Surface no. | r | d | nd | νd |
|---|---|---|---|---|
| Object plane | ∞ | ∞ | | |
| 1 | 35.436 | 0.70 | 1.72916 | 54.68 |
| 2 | 6.764 | 2.29 | | |
| 3 | −34.065 | 0.70 | 1.81600 | 46.62 |
| 4 | 14.728 | 0.30 | | |
| 5 | 12.124 | 3.31 | 1.78472 | 25.68 |
| 6 | −310.742 | Variable | | |
| 7 (stop) | ∞ | 1.00 | | |
| 8 | 7.831 | 3.31 | 1.48749 | 70.23 |
| 9 | −17.364 | 0.70 | 1.84666 | 23.78 |
| 10 | −222.131 | 0.84 | | |
| 11* | −14.635 | 1.38 | 1.58913 | 61.14 |
| 12* | −7.214 | Variable | | |
| 13* | −910.702 | 0.70 | 1.51633 | 64.14 |
| 14* | 20.976 | Variable | | |
| 15 | −39.765 | 0.99 | 1.51823 | 58.90 |
| 16 | −23.239 | 16.21 | | |
| 17 | ∞ | 1.00 | 1.51633 | 64.14 |
| 18 | ∞ | 1.82 | | |
| Image plane (Light receiving surface) | ∞ | | | |

Aspherical surface data
11th surface
K = 0.000
A4 = −1.67789e − 03, A6 = −2.48040e − 05
12th surface
K = 0.000
A4 = −8.02769e − 04, A6 = −1.04031e − 05
13th surface
K = 0.000
A4 = 6.77098e − 05
14th surface
K = 0.000
A4 = 1.64214e − 04

Zoom data
Zoom ratio 2.95

| | Wide angle | Intermediate | Telephoto |
|---|---|---|---|
| Focal length | 8.29 | 14.24 | 24.45 |
| Fno. | 4.38 | 5.59 | 6.96 |
| Angle of field 2ω | 74.93 | 43.22 | 24.85 |
| Image height | 5.40 | 5.40 | 5.40 |
| fb (in air) | 18.69 | 18.69 | 18.69 |
| Lens total length (in air) | 54.15 | 54.15 | 54.15 |
| d6 | 15.33 | 7.40 | 1.10 |
| d12 | 1.10 | 3.43 | 15.13 |
| d14 | 2.81 | 8.41 | 3.01 |

Unit focal length

| f1 = −10.41 | f2 = 12.52 | f3 = −39.70 | f4 = 105.73 |
|---|---|---|---|

EXAMPLE 2

Unit mm
Surface data

| Surface no. | r | d | nd | νd |
|---|---|---|---|---|
| Object plane | ∞ | ∞ | | |
| 1* | −15.222 | 0.84 | 1.85135 | 40.10 |
| 2* | 15.602 | 1.60 | | |
| 3 | 57.141 | 2.14 | 1.92286 | 20.88 |
| 4 | −38.844 | Variable | | |
| 5 (stop) | ∞ | 0.42 | | |
| 6* | 10.050 | 2.95 | 1.67790 | 55.34 |
| 7* | −21.329 | 0.14 | | |
| 8 | 14.187 | 2.95 | 1.62041 | 60.29 |
| 9 | 55.760 | 1.00 | 1.80518 | 25.42 |
| 10 | 5.928 | 5.48 | | |
| 11 | −152.754 | 2.95 | 1.58313 | 59.38 |
| 12* | −14.160 | Variable | | |
| 13 | −20.078 | 1.58 | 1.58313 | 59.38 |

-continued

| | Unit mm | | | |
|---|---|---|---|---|
| | Surface data | | | |
| Surface no. | r | d | nd | νd |
| 14* | −9.331 | Variable | | |
| 15 | ∞ | 1.12 | 1.51633 | 64.14 |
| 16 | ∞ | 1.22 | | |

Image plane (Light receiving surface) ∞
Aspherical surface data
1st surface
K = 0.000
A4 = −1.41027e − 05, A6 = 3.65278e − 06,
A8 = −3.59831e − 08
2nd surface
K = −1.090
A4 = −1.42128e − 04, A6 = 3.91563e − 06,
A8 = −4.13785e − 09,
A10 = −5.33872e − 10
6th surface
K = −0.977
A4 = −4.13838e − 05, A6 = −7.76010e − 06,
A8 = 4.17479e − 07,
A10 = −1.40246e − 08
7th surface
K = 0.000
A4 = 1.17035e − 04, A6 = −9.73820e − 06,
A8 = 4.57510e − 07,
A10 = −1.48664e − 08
12th surface
K = 0.000
A4 = −1.23629e − 04, A6 = −1.32056e − 06,
A8 = −2.93566e − 08
14th surface
K = 0.000
A4 = 7.24038e − 04, A6 = −2.94898e − 06
Zoom data

| Zoom ratio | 3.00 | | |
|---|---|---|---|
| | Wide angle | Intermediate | Telephoto |
| Focal length | 8.73 | 15.12 | 26.18 |
| Fno. | 2.71 | 3.40 | 4.60 |
| Angle of field 2ω | 71.87 | 38.56 | 22.31 |
| Image height | 5.40 | 5.40 | 5.40 |
| fb (in air) | 3.98 | 3.64 | 2.80 |
| Lens total length (in air) | 48.94 | 44.97 | 49.89 |
| d4 | 17.22 | 6.52 | 0.42 |
| d12 | 5.67 | 12.75 | 24.60 |
| d14 | 2.03 | 1.69 | 0.84 |

Unit focal length f1 = −16.29    f2 = 15.56   f3 = 28.36

EXAMPLE 3

| | Unit mm | | | |
|---|---|---|---|---|
| | Surface data | | | |
| Surface no. | r | d | nd | νd |
| Object plane | ∞ | ∞ | | |
| 1* | 17.115 | 0.84 | 1.85135 | 40.10 |
| 2* | 13.735 | 1.81 | | |
| 3 | 29.415 | 1.69 | 1.92286 | 20.88 |
| 4 | −96.046 | Variable | | |
| 5 (stop) | ∞ | 0.42 | | |
| 6* | 12.404 | 1.53 | 1.67790 | 55.34 |
| 7* | 135.453 | 0.14 | | |
| 8 | 8.393 | 2.86 | 1.62041 | 60.29 |
| 9 | 27.346 | 0.84 | 1.80518 | 25.42 |
| 10 | 7.167 | 0.72 | | |
| 11 | 11.232 | 1.37 | 1.58313 | 59.38 |
| 12* | 28.101 | Variable | | |
| 13 | −14.135 | 2.74 | 1.58313 | 59.38 |
| 14* | −8.289 | Variable | | |
| 15 | ∞ | 1.12 | 1.51633 | 64.14 |

-continued

| | Unit mm | | | |
|---|---|---|---|---|
| 16 | ∞ | 1.22 | | |
| Image plane (Light receiving surface) | ∞ | | | |

Aspherical surface data

1st surface

K = 0.000
A4 = 2.88774e−05, A6 = 8.26811e−07, A8 = −5.19966e−09
2nd surface

K = 0.016
A4 = −1.00876e−04, A6 = 4.29482e−07, A8 = 3.00225e−08,
A10 = −5.33872e−10
6th surface K = −0.326
A4 = −3.27113e−05, A6 = −2.77757e−06, A8 = 1.63830e−07,
A10 = −5.36592e−09

Unit mm

7th surface

K = 0.000
A4 = −8.71887e−05, A6 = −2.85390e−06, A8 = 1.58360e−07,
A10 = −5.38637e−09

12th surface-

K = 0.000
A4 = 5.20856e−04, A6 = 4.90405e−06, A8 = 7.22867e−08,
A10 = 2.87166e−09

14th surface

K = 0.000
A4 = 5.77432e−04, A6 = −4.76402e−06, A8 = 7.82405e−08

Zoom data
Zoom ratio 4.90

|  | Wide angle | Intermediate | Telephoto |
|---|---|---|---|
| Focal length | 8.73 | 19.32 | 42.76 |
| Fno. | 2.58 | 3.87 | 6.88 |
| Angle of field 2ω | 73.62 | 30.38 | 14.23 |
| Image height | 5.40 | 5.40 | 5.40 |
| fb (in air) | 5.71 | 5.12 | 2.80 |
| Lens total length (in air) | 48.07 | 46.13 | 60.79 |
| d4 | 18.19 | 5.82 | 0.42 |
| d12 | 9.21 | 20.22 | 42.60 |
| d14 | 3.75 | 3.17 | 0.84 |

Unit focal length

| f1 = −16.08 | f2 = 14.24 | f3 = 29.32 |
|---|---|---|

EXAMPLE 4

Unit mm

Surface data

| Surface no. | r | d | nd | vd |
|---|---|---|---|---|
| Object plane | ∞ | ∞ | | |
| 1 | 18.481 | 0.69 | 1.94595 | 17.98 |
| 2 | 13.976 | 1.87 | 1.74320 | 49.34 |
| 3* | −141.589 | Variable | | |
| 4 | −245.957 | 0.63 | 2.00272 | 19.32 |
| 5 | 6.867 | 1.63 | | |
| 6 | −14.601 | 0.63 | 1.79952 | 42.22 |
| 7 | 5.055 | 1.68 | 1.94595 | 17.98 |
| 8 | 43.922 | Variable | | |
| 9 (stop) | ∞ | 0.63 | | |
| 10* | 20.812 | 0.97 | 1.62263 | 58.16 |
| 11 | −24.737 | Variable | | |
| 12* | 14.613 | 2.93 | 1.49700 | 81.54 |
| 13 | −6.336 | 1.38 | 1.88300 | 40.76 |
| 14 | −9.064 | Variable | | |
| 15 | −1468.568 | 0.63 | 1.84666 | 23.78 |
| 16 | 11.751 | Variable | | |
| 17 | 31.674 | 1.92 | 1.88300 | 40.76 |
| 18 | −24.716 | 15.62 | | |
| 19 | ∞ | 1.13 | 1.51633 | 64.14 |
| 20 | ∞ | 1.18 | | |
| Image plane (Light receiving surface) | ∞ | | | |

Aspherical surface data

3rd surface

K = 0.000
A4 = 1.82437e−05, A6 = −3.38346e−08

Unit mm

10th surface

K = −0.984
A4 = −1.29930e−04, A6 = −7.23210e−06

12th surface

K = 0.000
A4 = −2.15959e−04, A6 = 1.97863e−06

Zoom data
Zoom ratio 4.88

|  | Wide angle | Intermediate | Telephoto |
|---|---|---|---|
| Focal length | 7.55 | 17.41 | 36.86 |
| Fno. | 4.14 | 5.02 | 6.24 |
| Angle of field 2ω | 78.81 | 33.40 | 15.96 |
| Image height | 5.40 | 5.40 | 5.40 |
| fb (in air) | 17.55 | 17.55 | 17.54 |
| Lens total length (in air) | 53.76 | 53.76 | 53.76 |
| d3 | 0.32 | 5.58 | 10.34 |
| d8 | 5.67 | 1.85 | 0.53 |
| d11 | 10.40 | 5.55 | 0.32 |
| d14 | 0.63 | 5.95 | 7.75 |
| d16 | 3.60 | 1.69 | 1.69 |

Unit focal length

| f1 = 23.87 | f2 = −4.72 | f3 = 18.30 |
|---|---|---|
| f4 = 14.34 | f5 = −13.77 | f6 = 15.98 |

EXAMPLE 5

Unit mm

Surface data

| Surface no. | r | d | nd | vd |
|---|---|---|---|---|
| Object plane | ∞ | ∞ | | |
| 1 | 20.159 | 0.69 | 1.92286 | 20.88 |
| 2 | 13.693 | 1.93 | 1.74320 | 49.34 |
| 3* | −169.790 | Variable | | |
| 4 | 271.470 | 0.63 | 1.88300 | 40.76 |
| 5 | 7.530 | 1.81 | | |
| 6 | −11.350 | 0.63 | 1.80400 | 46.57 |
| 7 | 5.768 | 1.66 | 1.84666 | 23.78 |
| 8 | 84.709 | Variable | | |
| 9 (stop) | ∞ | 0.63 | | |
| 10* | 17.400 | 1.17 | 1.58913 | 61.14 |
| 11 | −17.212 | Variable | | |
| 12* | 17.989 | 2.62 | 1.49700 | 81.54 |
| 13 | −6.333 | 0.95 | 1.84666 | 23.78 |
| 14 | −9.448 | Variable | | |
| 15 | −55.557 | 0.84 | 1.88300 | 40.76 |
| 16 | 10.536 | Variable | | |
| 17 | 26.514 | 2.25 | 1.74400 | 44.78 |
| 18 | −18.309 | 15.88 | | |
| 19 | ∞ | 1.13 | 1.51633 | 64.14 |
| 20 | ∞ | 1.18 | | |
| Image plane (Light receiving surface) | ∞ | | | |

Aspherical surface data

3rd surface

K = 0.000
A4 = 8.10896e−06

10th surface

K = −1.129
A4 = −1.19491e−04

-continued

Unit mm

12th surface

K = 0.000
A4 = −1.19231e−04, A6 = 1.91009e−06

Zoom data
Zoom ratio 4.90

|  | Wide angle | Intermediate | Telephoto |
|---|---|---|---|
| Focal length | 8.75 | 18.98 | 42.88 |
| Fno. | 4.76 | 5.21 | 7.49 |
| Angle of field 2ω | 70.07 | 31.11 | 13.74 |
| Image height | 5.40 | 5.40 | 5.40 |
| fb (in air) | 17.80 | 17.80 | 17.80 |
| Lens total length (in air) | 59.38 | 59.38 | 59.38 |
| d3 | 0.32 | 5.84 | 8.65 |
| d8 | 8.86 | 3.34 | 0.53 |
| d11 | 11.35 | 6.52 | 0.32 |
| d14 | 0.63 | 6.27 | 14.17 |
| d16 | 4.61 | 3.82 | 2.11 |

Unit focal length

| f1 = 27.01 | f2 = −4.90 | f3 = 14.87 |
|---|---|---|
| f4 = 16.25 | f5 = −9.97 | f6 = 14.87 |

EXAMPLE 6

Unit mm

Surface data

| Surface no. | r | d | nd | νd |
|---|---|---|---|---|
| Object plane | ∞ | ∞ | | |
| 1 | 19.922 | 0.69 | 1.92286 | 20.88 |
| 2 | 13.641 | 1.85 | 1.74320 | 49.34 |
| 3* | 675.228 | Variable | | |
| 4 | 59.183 | 0.63 | 1.88300 | 40.76 |
| 5 | 7.791 | 1.67 | | |
| 6 | −13.284 | 0.63 | 1.78800 | 47.37 |
| 7 | 5.291 | 1.56 | 1.84666 | 23.78 |
| 8 | 20.508 | Variable | | |
| 9 (stop) | ∞ | 0.63 | | |
| 10* | 10.563 | 1.14 | 1.58313 | 59.38 |
| 11 | −88.837 | Variable | | |
| 12* | 22.912 | 2.79 | 1.49700 | 81.54 |
| 13 | −5.799 | 0.63 | 1.88300 | 40.76 |
| 14 | −8.080 | Variable | | |
| 15 | 76.938 | 0.63 | 1.92286 | 20.88 |
| 16 | 10.966 | Variable | | |
| 17 | 21.041 | 1.56 | 1.75211 | 25.05 |
| 18 | −53.913 | 15.64 | | |
| 19 | ∞ | 1.13 | 1.51633 | 64.14 |
| 20 | ∞ | 1.18 | | |
| Image plane (Light receiving surface) | ∞ | | | |

Aspherical surface data

3rd surface

K = 0.000
A4 = 5.18448e−06

10th surface

K = −0.519
A4 = −1.61816e−04

12th surface

K = 0.000
A4 = −3.08602e−04, A6 = 1.32629e−06

-continued

Unit mm

Zoom data
Zoom ratio 8.00

|  | Wide angle | Intermediate | Telephoto |
|---|---|---|---|
| Focal length | 8.75 | 23.47 | 70.01 |
| Fno. | 4.61 | 5.77 | 6.89 |
| Angle of field 2ω | 70.69 | 25.60 | 8.60 |
| Image height | 5.40 | 5.40 | 5.40 |
| fb (in air) | 17.56 | 17.56 | 17.56 |
| Lens total length (in air) | 50.02 | 58.46 | 65.00 |
| d3 | 0.32 | 8.00 | 16.69 |
| d8 | 8.22 | 3.12 | 0.53 |
| d11 | 5.61 | 3.75 | 0.32 |
| d14 | 1.74 | 9.05 | 12.22 |
| d16 | 2.17 | 2.57 | 3.27 |

Unit focal length

| f1 = 30.93 | f2 = −4.79 | f3 = 16.26 |
|---|---|---|
| f4 = 15.57 | f5 = −13.92 | f6 = 20.30 |

EXAMPLE 7

Unit mm

Surface data

| Surface no. | r | d | nd | νd |
|---|---|---|---|---|
| Object plane | ∞ | ∞ | | |
| 1 | 17.092 | 0.69 | 1.92286 | 20.88 |
| 2 | 11.685 | 2.09 | 1.74320 | 49.34 |
| 3* | 207.393 | Variable | | |
| 4 | 164.069 | 0.63 | 1.88300 | 40.76 |
| 5 | 6.908 | 1.81 | | |
| 6 | −12.196 | 0.63 | 1.78800 | 47.37 |
| 7 | 5.313 | 1.67 | 1.84666 | 23.78 |
| 8 | 40.510 | Variable | | |
| 9 (stop) | ∞ | 0.63 | | |
| 10* | 14.023 | 1.17 | 1.58313 | 59.38 |
| 11 | −20.051 | Variable | | |
| 12* | 15.871 | 2.89 | 1.49700 | 81.54 |
| 13 | −5.848 | 0.63 | 1.88300 | 40.76 |
| 14 | −8.692 | Variable | | |
| 15 | −38.291 | 0.63 | 1.92286 | 20.88 |
| 16 | 12.287 | Variable | | |
| 17 | ∞ | 0.00 | | |
| 18 | 37.408 | 2.03 | 1.75211 | 25.05 |
| 19 | −18.946 | 15.62 | | |
| 20 | ∞ | 1.13 | 1.51633 | 64.14 |
| 21 | ∞ | 1.18 | | |
| Image plane (Light receiving surface) | ∞ | | | |

Aspherical surface data

3rd surface

K = 0.000
A4 = 6.71509e−06

10th surface

K = −8.887
A4 = 2.54220e−04, A6 = −5.63250e−06

12th surface

K = 0.000
A4 = −1.78527e−04, A6 = 1.25518e−06, A8 = 7.99258e−08

-continued

Unit mm

Zoom data
Zoom ratio 6.80

|  | Wide angle | Intermediate | Telephoto |
|---|---|---|---|
| Focal length | 8.76 | 22.49 | 59.59 |
| Fno. | 4.98 | 5.59 | 6.34 |
| Angle of field 2ω | 70.52 | 26.89 | 10.09 |
| Image height | 5.40 | 5.40 | 5.40 |
| fb (in air) | 17.55 | 17.55 | 17.55 |
| Lens total length (in air) | 59.01 | 59.01 | 59.01 |
| d3 | 0.32 | 7.17 | 14.43 |
| d8 | 9.37 | 3.03 | 0.53 |
| d11 | 10.26 | 5.35 | 0.32 |
| d14 | 0.63 | 6.82 | 8.57 |
| d16 | 5.37 | 3.58 | 2.11 |

Unit focal length

| f1 = 28.12 | f2 = −4.60 | f3 = 14.33 |
|---|---|---|
| f4 = 15.20 | f5 = −10.02 | f6 = 16.98 |

EXAMPLE 8

Unit mm

Surface data

| Surface no. | r | d | nd | vd |
|---|---|---|---|---|
| Object plane | ∞ | ∞ | | |
| 1* | 15.594 | 0.69 | 1.94595 | 17.98 |
| 2 | 11.540 | 2.15 | 1.77250 | 49.60 |
| 3 | −997.547 | Variable | | |
| 4 | −101.650 | 0.63 | 1.90366 | 31.32 |
| 5 | 8.413 | 1.58 | | |
| 6 | −13.145 | 0.63 | 1.83481 | 42.71 |
| 7 | 6.440 | 1.45 | 1.94595 | 17.98 |
| 8 | 32.040 | Variable | | |
| 9 (stop) | ∞ | 0.63 | | |
| 10* | 15.206 | 1.11 | 1.49700 | 81.54 |
| 11 | −27.452 | Variable | | |
| 12* | 5.473 | 2.83 | 1.49700 | 81.54 |
| 13* | −33.033 | 0.92 | | |
| 14 | 11.128 | 0.63 | 1.84666 | 23.78 |
| 15 | 5.638 | 0.87 | | |
| 16 | 9.831 | 2.86 | 1.74077 | 27.79 |
| 17 | −3.776 | 0.63 | 2.00069 | 25.46 |
| 18 | −128.268 | Variable | | |
| 19 | 287.254 | 2.09 | 1.76182 | 26.52 |
| 20 | −4.276 | 0.63 | 1.88300 | 40.76 |
| 21 | 9.853 | Variable | | |
| 22 | 91.052 | 2.56 | 1.52542 | 55.78 |
| 23* | −12.008 | 0.32 | | |
| 24 | ∞ | 1.12 | 1.51633 | 64.14 |
| 25 | ∞ | 1.18 | | |
| Image plane (Light receiving surface) | ∞ | | | |

Aspherical surface data

1st surface

K = 0.000
A4 = −1.04802e−05, A6 = −4.61797e−08, A8 = 5.36627e−12

10th surface

K = 1.000
A4 = −1.61099e−04, A6 = −2.44514e−06

12th surface

K = 0.000
A4 = −3.10412e−04, A6 = −2.85562e−07, A8 = −1.21562e−07

-continued

Unit mm

13th surface

K = 0.000
A4 = 1.53258e−04, A6 = 9.16443e−06

23rd surface

K = 0.000
A4 = −2.15618e−04, A6 = −2.61252e−06, A8 = 6.02795e−08

Zoom data
Zoom ratio 9.60

|  | Wide angle | Intermediate | Telephoto |
|---|---|---|---|
| Focal length | 8.75 | 27.12 | 84.01 |
| Fno. | 4.05 | 6.10 | 8.11 |
| Angle of field 2ω | 68.01 | 22.00 | 7.40 |
| Image height | 5.40 | 5.40 | 5.40 |
| fb (in air) | 2.24 | 2.24 | 2.24 |
| Lens total length (in air) | 49.01 | 49.01 | 49.01 |
| d3 | 0.40 | 6.15 | 10.62 |
| d8 | 8.11 | 4.33 | 0.53 |
| d11 | 11.62 | 4.48 | 0.32 |
| d18 | 2.04 | 3.52 | 3.34 |
| d21 | 1.70 | 5.38 | 9.06 |

Unit focal length

| f1 = 21.43 | f2 = −4.74 | f3 = 19.86 |
|---|---|---|
| f4 = 13.08 | f5 = −8.64 | f6 = 20.37 |

Next, the values of conditional expressions (1) to (5) in the first to eighth embodiments are shown below.

Here, embodiments A, B, C, and D correspond to image pickup area of arrangement of FIG. 2A, FIG. 2B, FIG. 2C, and FIG. 2D respectively.

| | Conditional expressions | | | | |
|---|---|---|---|---|---|
| | (1) | (2) | (3) | (4) | (5) |
| Example 1 | 0.88 | — | −1.47 | −1.77 | −1.33 |
| Example 2 | 0.92 | — | 0.01 | −0.24 | 0.64 |
| Example 3 | 0.94 | — | −0.11 | −1.05 | 0.89 |
| Example 4 | 0.93 | — | −7.20 | 0.33 | −1.37 |
| Example 5 | 0.92 | — | −5.24 | −0.02 | −1.32 |
| Example 6 | 0.91 | — | −5.34 | −1.19 | −1.50 |
| Example 7 | 0.94 | — | −5.32 | −0.32 | −1.64 |
| Example 8 | 1.00 | — | −6.69 | −2.00 | −0.75 |
| Example A | — | 0.57 | — | — | — |
| Example B | — | 0.42 | — | — | — |
| Example C | — | 0.60 | — | — | — |
| Example D | — | 0.60 | — | — | — |

Embodiments A to D concerning the arrangement of the image pickup areas and the first to eighth embodiments of the taking optical systems may be used in any possible combination.

(Correction of Distortion)

Incidentally, when the zoom lens system of the present invention is used, a digital correction of distortion of an image is carried out electrically. Therefore, by reducing an image height IH at the wide angle end, the effective image pickup area is let to be barrel shaped at the wide angle end.

A basic concept for the digital correction of the distortion of an image will be described below.

Figure 21:
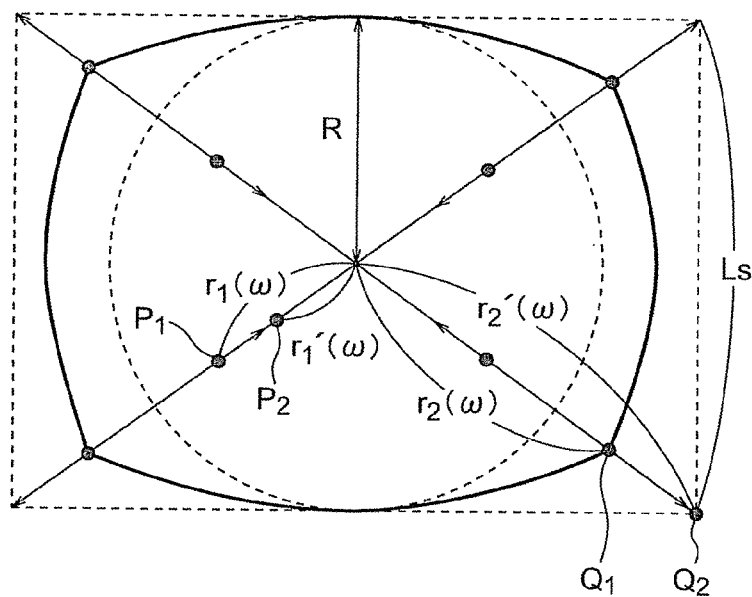
FIG. 21 illustrates correction of distortion.

For example, as shown in FIG. 21, with a point of intersection of an optical axis and an image pickup plane to be a center, a magnification on a circumference (image height) of a circle of radius R making a contact internally with a longer side of an effective image pickup plane is fixed, and this circumference is let to be a base reference for the correction. Next, each point on a circumference (image height) of an arbitrary radius r(ω) other than the radius R is moved in a substantial direction of radiation, and the correction is carried out by moving on a concentric circle such that the radius becomes r'(ω).

For example, in FIG. 21, a point $P_1$ on a circumference of an arbitrary radius $r_1(ω)$ positioned at an inner side of a circle of radius R is moved to a point $P_2$ on a circumference of a radius $r_1'(ω)$ which is to be corrected, directed toward a center of the circle. Moreover, a point $Q_1$ on a circumference of an arbitrary radius $r_2(ω)$ positioned at an outer side of the circle of radius R is moved to a point $Q_2$ on a circumference of a radius $r_2'(ω)$ which is to be corrected, directed toward a direction away from the center of the circle.

Here, r'(ω) can be expressed as follows.

$$r'(ω)=α·f·\tan δ \quad (0≤α≤1)$$

where, ω is a half angle of field of an object, f is a focal length of an imaging optical system (the zoom lens system in the present invention), and α is no fewer than 0, nor more than 1.

Here, when an ideal image height corresponding to a circle (image height) of radius R is let to be Y, then $$α=R/Y=R/(f·\tan ω).$$

The optical system, ideally, is rotationally symmetric with respect to an optical axis. In other words, the distortion also occurs in a rotationally symmetric manner with respect to the optical axis. Consequently, as it has been described above, in a case of correcting electrically the optical distortion, when it is possible to carry out correction by fixing a magnification on a circumference (image height) of the circle of radius R making a contact internally with a longer side of the effective image pickup plane, with a point of intersection of an optical axis on a reproduced image, and an image pickup plane to be a center, and moving each point on the circumference (image height) of radius r(ω) other than the radius R in a substantial direction of radiation, and moving on a concentric circle such that the radius becomes r'(ω), it can be considered to be advantageous from a point of amount of data and amount of calculation.

Incidentally, an optical image ceases to be a continuous amount at a point of time when an image is picked up by an electronic image pickup element (due to sampling). Consequently, the circle of radius R which is drawn exactly on the optical image ceases to be an accurate circle as long as pixels on the electronic image pickup element are not arranged radially.

In other words, regarding a shape correction of image data expressed for each discrete coordinate point, a circle which can fix the magnification does not exist. Therefore, for each pixel (Xi, Yj), a method of determining coordinates of a destination of movement (Xi', Yj') may be used. When two or more points (Xi, Yj) have moved to the coordinates (Xi', Yj'), an average of values of each pixel is taken. Moreover, when there is no point which has moved, interpolation may be performed by using a value of coordinate (Xi', Yj') of some of the surrounding pixels.

Such method is effective for correction when the distortion with respect to the optical axis is remarkable due to a manufacturing error etc. of the optical system or the electronic image pickup element, in the electronic image pickup apparatus having the zoom lens system in particular, and when the circle of the radius R drawn on the optical image is asymmetric. Moreover, it is effective for correction when there occurs to be a geometric distortion at the time of reproducing a signal to an image in an image pickup element or various output devices.

In the electronic image pickup apparatus of the present invention, for calculating a correction amount r'(ω)−r(ω), an arrangement may be made such that a relationship between r(ω), in other words, half angle of field and the image height, or a relationship between a real image height r and an ideal image height r'/α is recorded in a recording medium which is built-in in the electronic image pickup apparatus.

For an image after the distortion correction, not to have an extreme shortage of an amount of light at both ends in a direction of short side, the radius R may satisfy the following conditional expression.

$$0≤R≤0.6Ls$$

where, Ls is a length of a short side of the effective image pickup surface.

It is preferable that the radius R satisfies the following conditional expression.

$$0.3Ls≤R≤0.6Ls$$

Furthermore, it is most advantageous to match the radius R with a radius of a circle making an internal contact in a short side direction of a substantially effective image pickup plane. In a case of correction in which, the magnification is fixed near the radius R=0, in other words, near on the axis, it is somewhat disadvantageous from an aspect of substantial image quality, but it is possible to secure an effect for making the size small even when the angle is widened.

A focal length interval which requires a correction is divided into a number of focal point zones. Moreover, the correction may be carried out with the amount of correction as in a case in which, a correction result which satisfies substantially the following relationship $$r'(ω)=α·f·\tan ω$$

near a telephoto end in the focal point zones which are divided.

However, in this case, at a wide angle end in the focal point zones which are divided, a barrel-shape distortion at the wide angel end of the focal point zones which are divided is remained to some extent. Moreover, when the number of divided zones is increased, there arises a need to hold specific data necessary for correction, additionally in a recording medium. Therefore it is not preferable to increase the number of divided zones. Therefore, one or a plurality of coefficients associated with each focal length in the focal point zones which are divided, are calculated in advance. The coefficients may be determined based on a measurement by simulation or by actual equipment.

An amount of correction in a case in which, the correction result which satisfies substantially the following relationship $$r'(ω)=α·f·\tan ω$$

near the telephoto end in the focal point zones which are divided may be calculated, and may let to be a final amount of correction by multiplying uniformly the coefficient for each focal length with respect to this amount of correction.

Incidentally, when there is no distortion in an image achieved by imaging (forming an image) of an infinite object, the following relationship $$f=y/\tan ω$$

holds.

Here, y denotes a height (image height) of an image point from the optical axis, f denotes a focal length of an imaging system (zoom lens system in the present invention), and ω denotes an angle (object half angle of field) with respect to the optical axis in an object point direction corresponding to image points connecting from a center on an image pickup plane up to a position of y.

When there is a barrel-shape distortion in the imaging system, the relationship becomes $f > y/\tan \omega.$ In other words, when the focal length f of the imaging system, and the image height y are let to be fixed, a value of ω becomes large.

Figure 22:
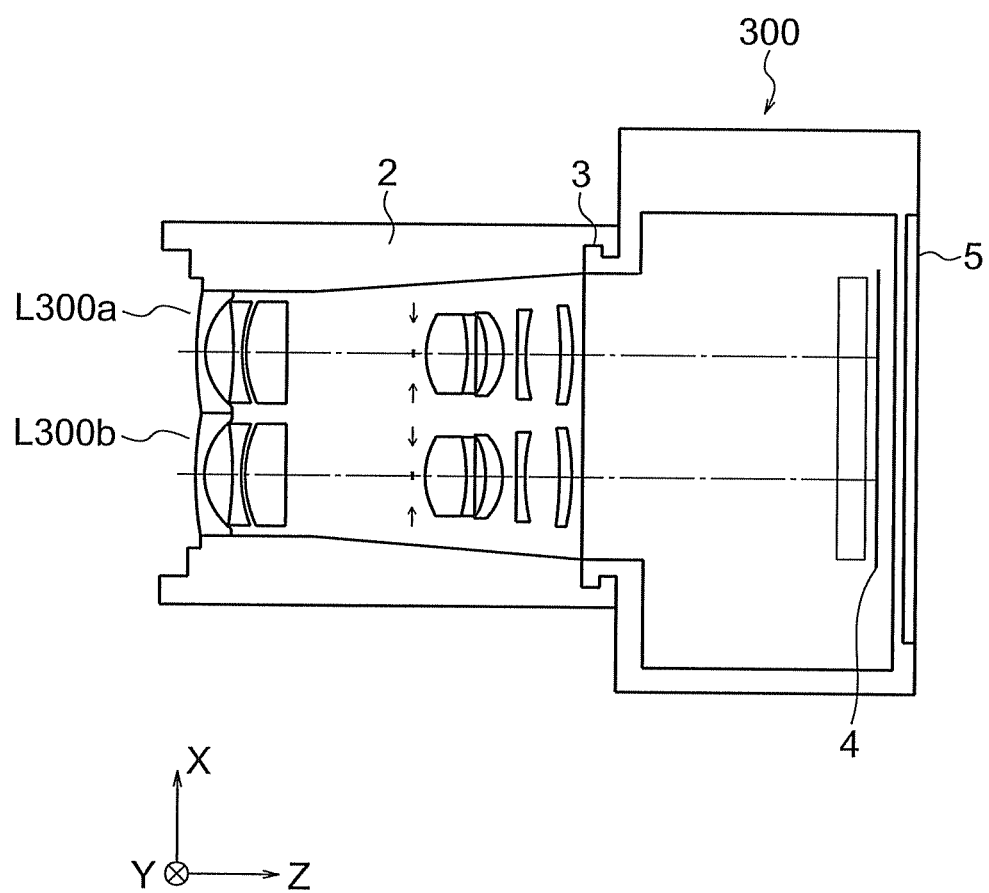
FIG. 22 is a diagram showing the general construction of a zoom lens that an image pickup apparatus according to an embodiment has.

FIG. 22 is a cross sectional view of a single lens reflex camera 300 as an electronic image pickup apparatus equipped with two zoom lenses L300a, L300b according to the first embodiment described above and a CCD or CMOS sensor as an image pickup element 4.

The components corresponding to those shown in FIGS. 1A and 1B are denoted by the same reference numerals to eliminate redundant descriptions.

Figure 23:
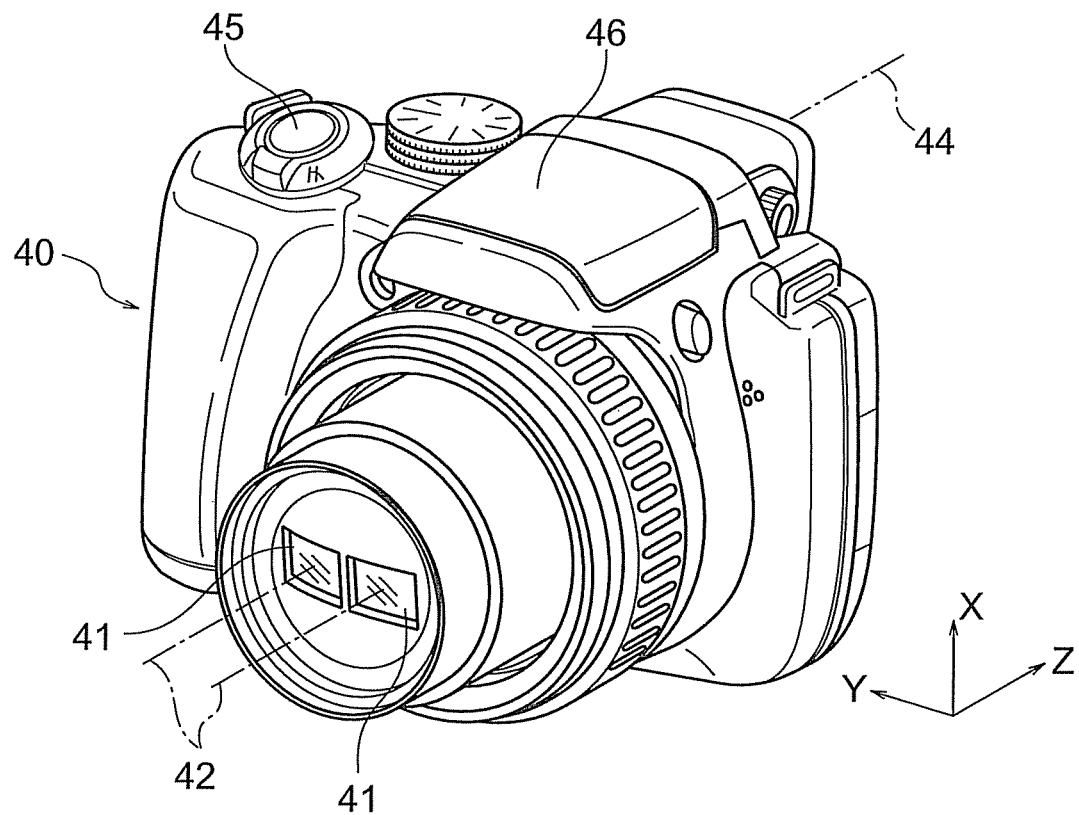
FIG. 23 is a front perspective view showing an outer appearance of a digital camera according to an embodiment.
Figure 24:
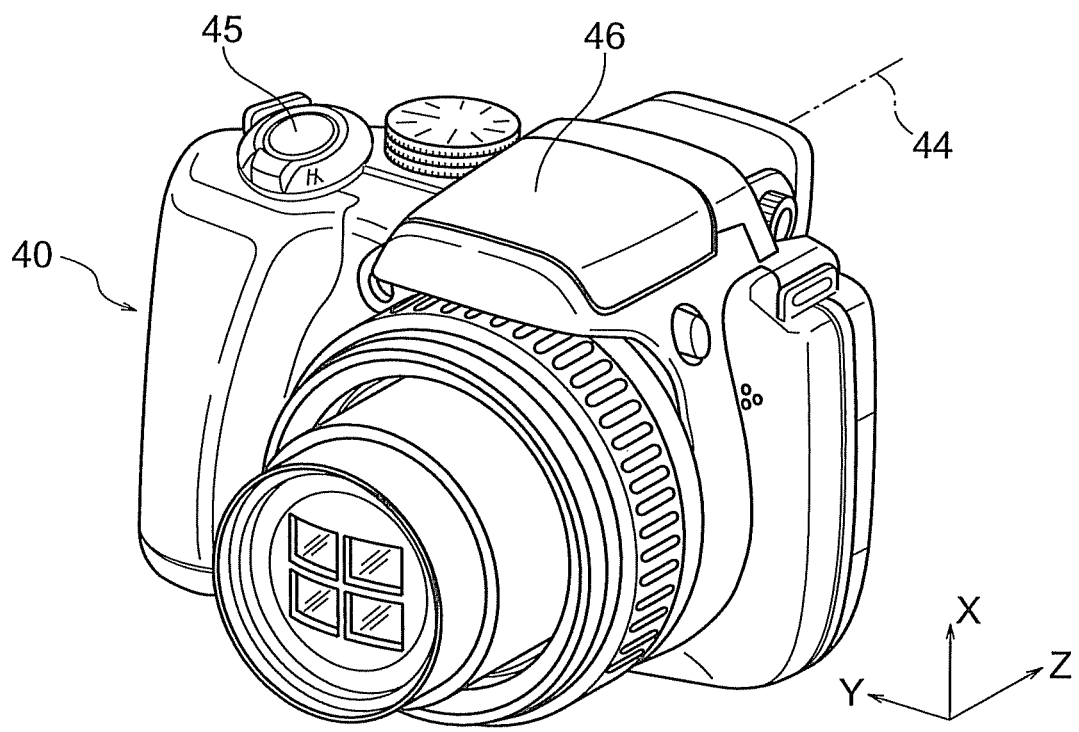
FIG. 24 is a front perspective view showing an outer appearance of a digital camera according to another embodiment.
Figure 25:
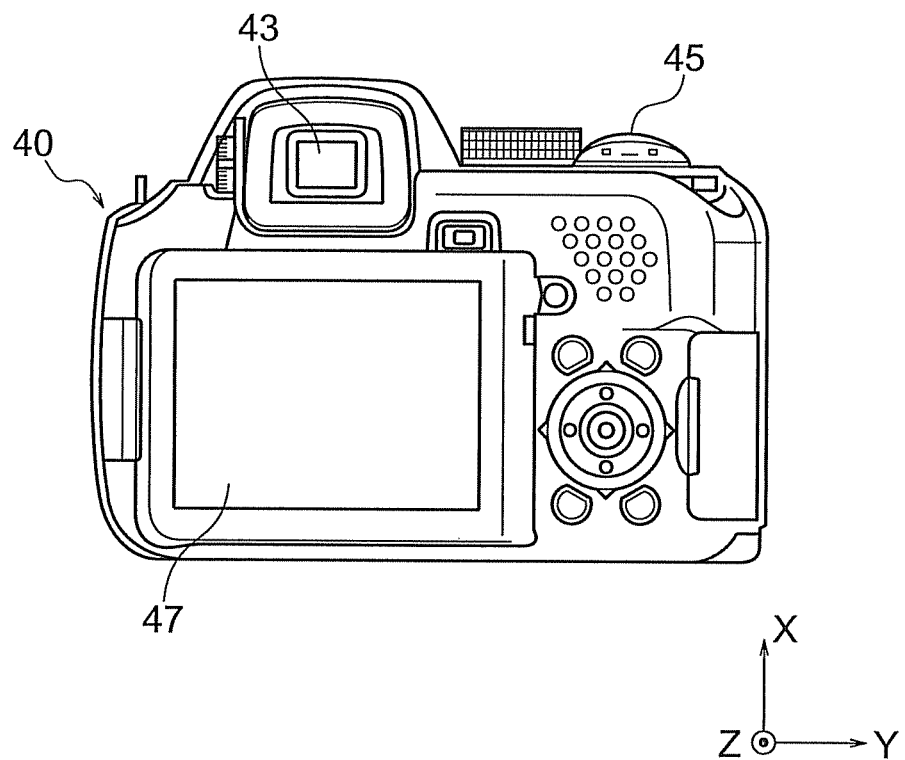
FIG. 25 is a rear view of the digital camera according to the embodiment.
Figure 26:
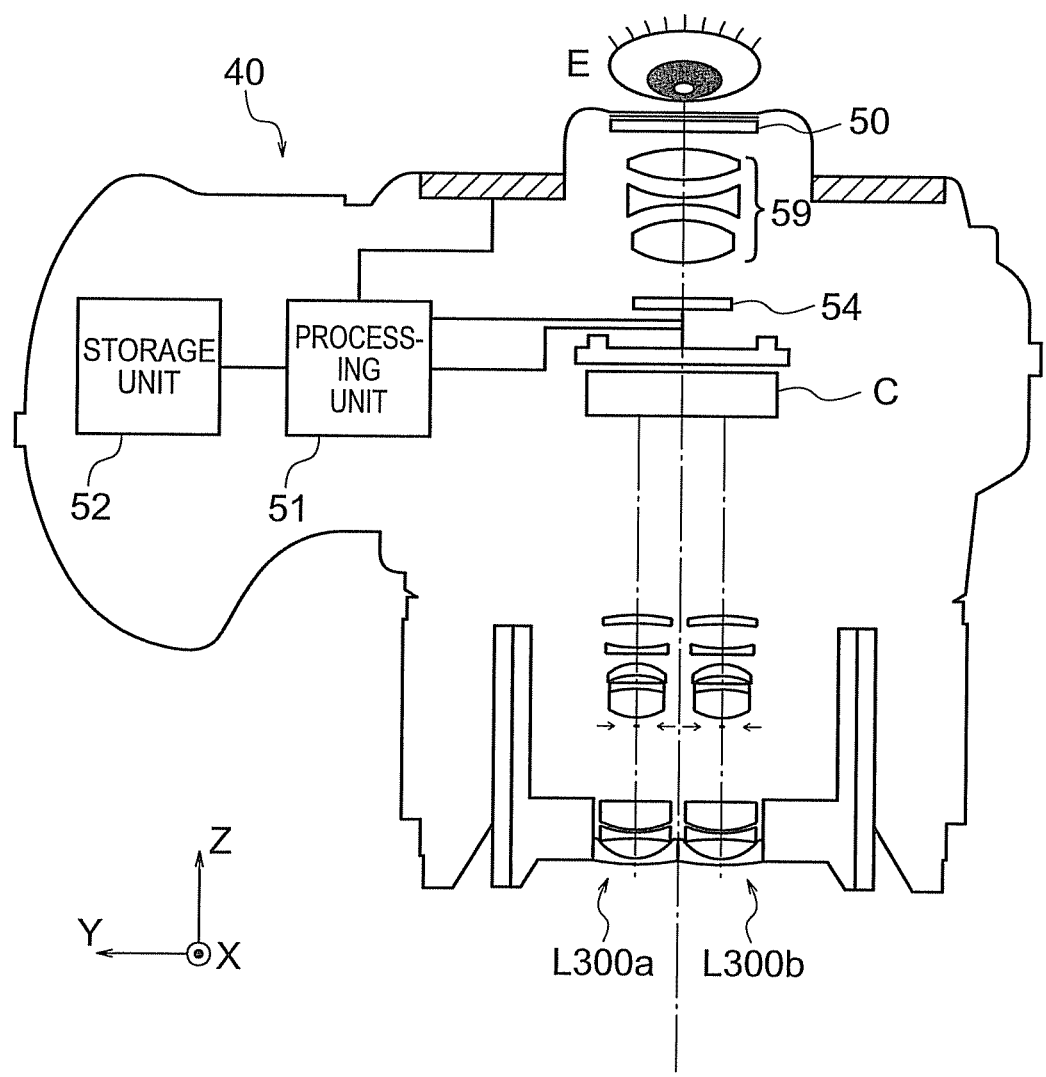
FIG. 26 is a lateral cross sectional view of the digital camera according to the embodiment.

FIGS. 23 to 27 show the construction of image pickup apparatuses equipped with a plurality of zoom lenses according to one of the above-described embodiments. FIGS. 23 and 24 are front perspective views showing the outer appearance of the digital camera 40. FIG. 25 is a rear view of the digital camera 40. FIG. 26 is a schematic cross sectional view showing the construction of the digital camera 40. While FIGS. 23 and 24 show the digital camera 40 in the state in use for shooting (in which the taking optical system 41 is not collapsed), FIG. 26 shows the digital camera 40 in the state not in use for shooting (in which the taking optical system 41 is collapsed).

FIG. 23 is a front perspective view of a digital camera 40 equipped with two zoom lenses (N=2) arranged side by side along the horizontal direction. FIG. 24 is a front perspective view of a digital camera 40 equipped with four zoom lenses (N=4) in total arranged two by two along the horizontal and vertical directions.

The digital camera 40 in this illustrative case includes the taking optical system 41 arranged on a taking optical path 42, a viewfinder optical system 43 arranged on a viewfinder optical path 44, a shutter release button 45, a popup flash 46, and a liquid crystal display monitor 47. In response to depression of the shutter release button 45 provided on the top of the camera 40, shooting through the taking optical system 41, e.g. the lens according to the first embodiment, is effected. Specifically, an image of an object is formed by the taking optical system 41 on the image pickup surface (or photoelectric conversion surface) of the image pickup element or CCD 49 provided in the vicinity of the image plane, through a cover glass C. The image of the object picked up by the CCD 49 is processed by a processing unit 51 and displayed as an electronic image on the liquid crystal display monitor 47 provided on the back of the camera and/or a viewfinder image display element 54. The processing unit 51 is connected with a storage unit 52, in which picked-up electronic images can be stored.

When not in use after completion of shooting, the taking optical system 41 as a whole stays at a position closer to the CCD 49 than the position at which the taking optical system 41 is located when it is focused on an object point at infinity. In order for the taking optical system 41 to be able to shift as a whole, when not in use for shooting, along the optical axis to a position closer to the CCD 49 than the position at which the taking optical system 41 is located when it is focused on an object point at infinity, a space between the second lens group G2 and the third lens group G3 in the taking optical system 41 and a space between the lens in the taking optical system 41 located closest to the image side and the CCD 49 are provided in advance so that a regulation region is left on the CCD 49 side even in the state in which the lens barrel is collapsed in its entirety.

The storage unit 52 may be provided separately from the processing unit 51. The storage unit 52 may be an electrically writable medium such as a flexible disk, memory card, or MO. The camera may be a film camera that uses a film in place of the CCD 49.

A viewfinder eyepiece lens 59 is provided on the viewfinder optical path 44. An image of an object displayed on the viewfinder image display element 54 is magnified by the viewfinder eyepiece lens 59 with adjustment of diopter suitable for the observer's eyesight and delivered to the observer's eye E. A cover member 50 is provided on the exit side of the viewfinder eyepiece lens 59.

Figure 27:
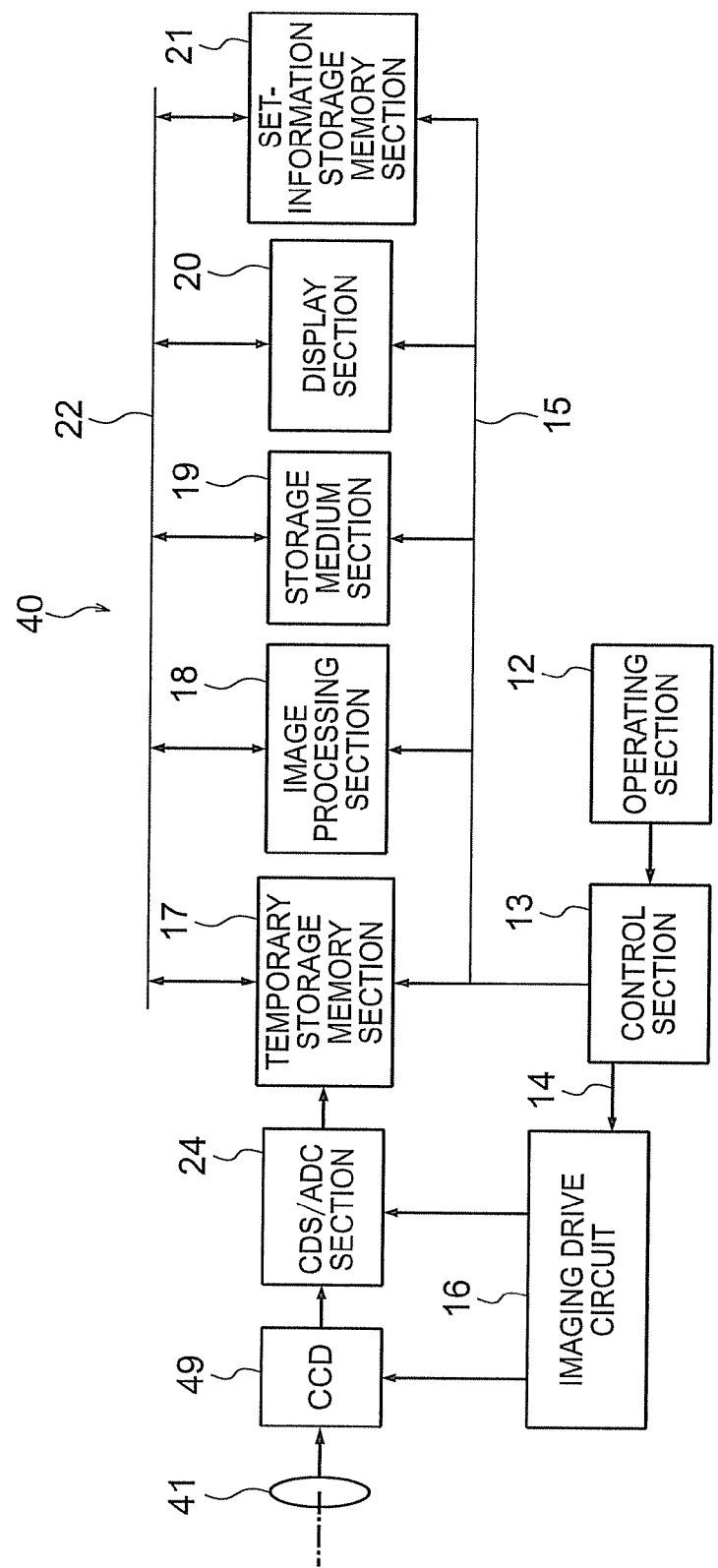
FIG. 27 is a block diagram of the relevant internal circuit of the digital camera.

FIG. 27 is a block diagram of the relevant internal circuit of the digital camera 40. In the case described here, the processing unit 51 described above includes for instance, a CDS/ADC section 24, a temporary storage memory 17, and an image processing section 18, and the storage unit 52 includes a storage medium 19 for example.

As shown in FIG. 27, the digital camera 40 includes an operating section 12, a control section 13 which is connected to the operating section 12, the temporary storage memory 17 and an imaging drive circuit 16 which are connected to a control-signal output port of the control section 13, via a bus 14 and a bus 15, the image processing section 18, the storage medium section 19, a display section 20, and a set-information storage memory section 21.

The temporary storage memory 17, the image processing section 18, the storage medium section 19, the display section 20, and the set-information storage memory section 21 are structured to be capable of mutually inputting and outputting data via a bus 22. Moreover, the CCD 49 and the CDS/ADC section 24 are connected to the imaging drive circuit 16.

The operating section 12 includes various input buttons and switches, and is a circuit which informs the control section, event information which is input from outside (by a user of the digital camera) via these input buttons and switches. The control section 13 is a central processing unit (CPU), and has a built-in computer program memory which is not shown in the diagram. The control section 13 is a circuit which controls the entire digital camera 40 upon receiving instructions and commands input by the user of the camera via the operating section 12, according to a computer program stored in this computer program memory.

The CCD 49 receives as light an object image which is formed via the taking optical system 41 according to the present invention. The CCD 49 is an image pickup element which is driven and controlled by the imaging drive circuit 16, and which converts an amount of light for each pixel of the object image to an electric signal, and outputs to the CDS/ADC section 24.

The CDS/ADC section 24 is a circuit which amplifies the electric signal which is input from the CCD 49, and carries out analog/digital conversion, and outputs to the temporary storage memory 17 image raw data (Bayer data, hereinafter called as 'RAW data') which is only amplified and converted to digital data.

The temporary storage memory 17 is a buffer which includes an SDRAM (Synchronous Dynamic Random Access Memory) for example, and is a memory device which stores temporarily the RAW data which is output from the CDS/ADC section 24. The image processing section 18 is a circuit which reads the RAW data stored in the temporary storage memory 17, or the RAW data stored in the storage medium section 19, and carries out electrically various image-processing including the distortion correction, based on image-quality parameters specified by the control section 13.

The storage medium section 19 is a recording medium in the form of a card or a stick including a flash memory for instance, detachably mounted. The storage medium section 19 is a control circuit of a device in which, the RAW data transferred from the temporary storage memory 17 and image data subjected to image processing in the image processing section 18 are recorded and maintained in the card flash memory and the stick flash memory.

The display section 20 includes the liquid-crystal display monitor 47 and the viewfinder image display element 54, and is a circuit which displays images and operation menu on the liquid-crystal display monitor 47 and the viewfinder image display element 54. The set-information storage memory section 21 includes a ROM section in which various image quality parameters are stored in advance, and a RAM section which stores image quality parameters which are selected by an input operation on the operating section 12, from among the image quality parameters which are read from the ROM section. The set-information storage memory section 21 is a circuit which controls an input to and an output from the memories.

Figure 28:
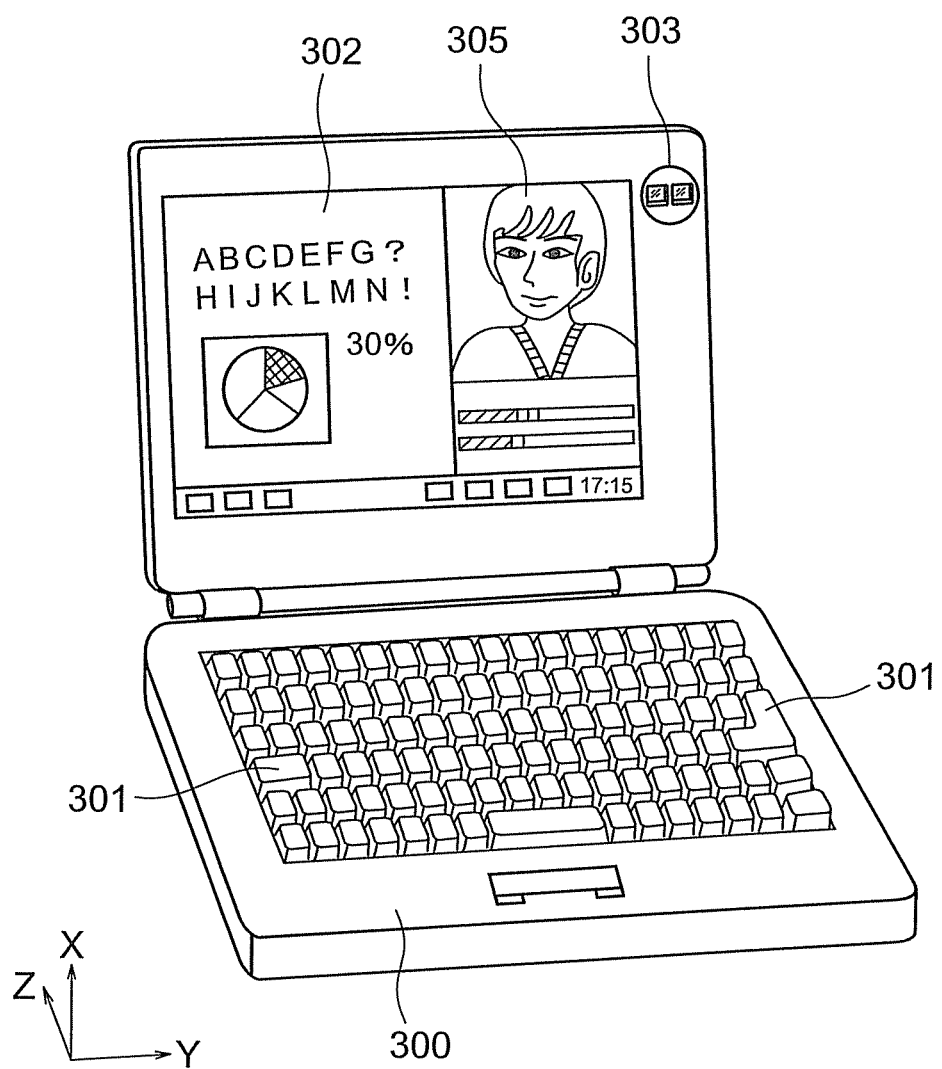
FIG. 28 is a front perspective view showing a personal computer as an example of an information processing apparatus having a built-in zoom lens as an objective optical system, in a state in which the cover is open.
Figure 29:
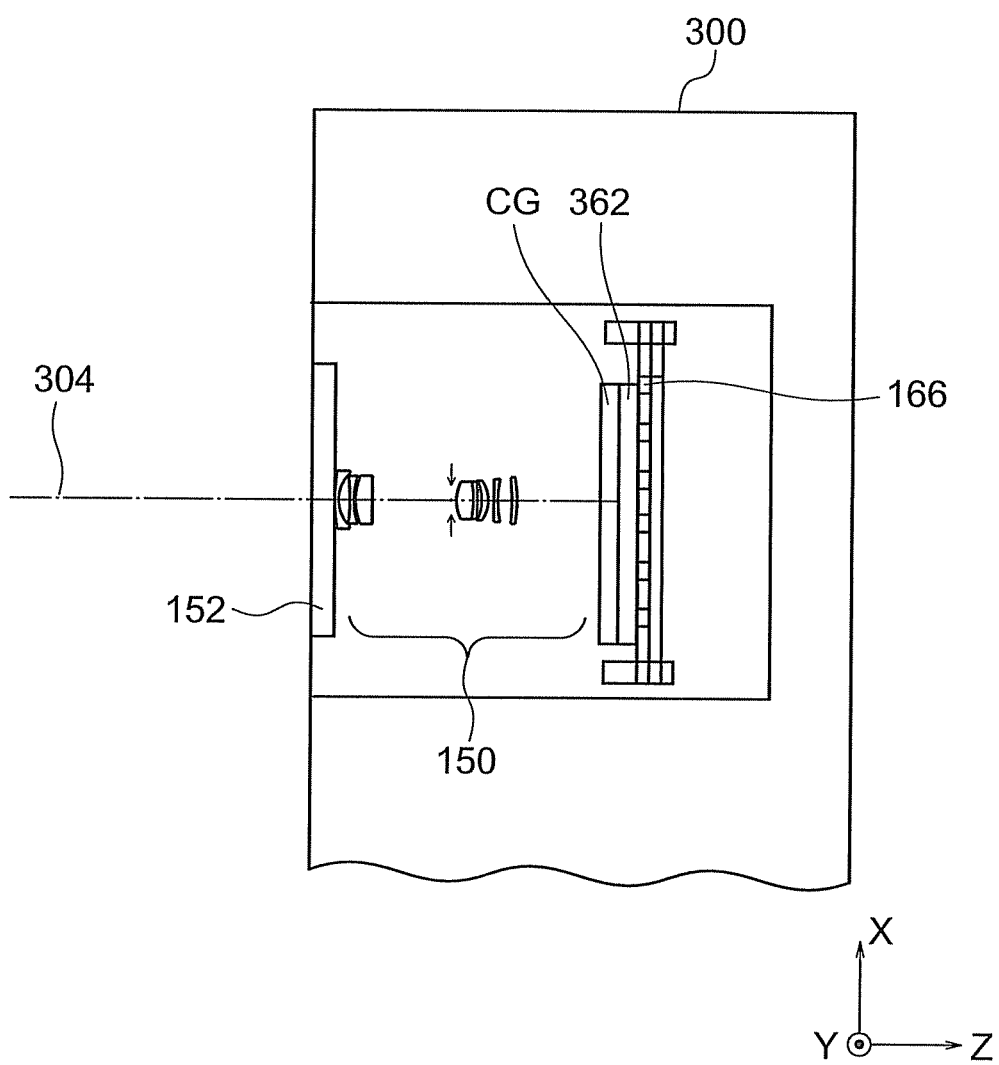
FIG. 29 is a cross sectional view of the taking optical system of the personal computer.
Figure 30:
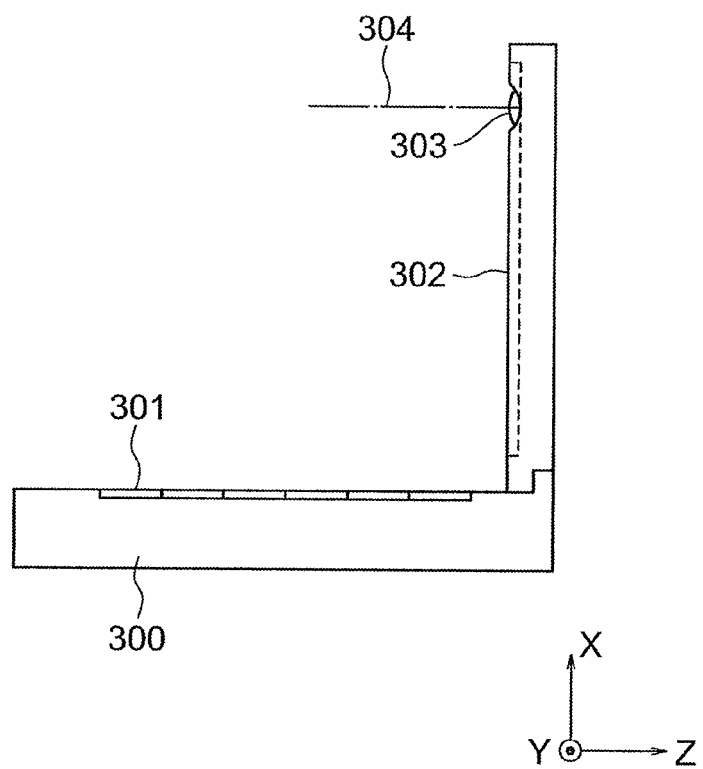
FIG. 30 is a side view of the personal computer.

FIGS. 28 to 30 show a personal computer as an example of an information processing apparatus in which a zoom lens according to one of the above-described embodiments is provided as an objective optical system. FIG. 28 is a front perspective view of the personal computer 300 in a state in which the cover is open. FIG. 29 is a cross sectional view of a taking optical system 303 of the personal computer 300. FIG. 30 is a side view of the personal computer 300 in the state shown in FIG. 28. As shown in FIGS. 28 to 30, the personal computer 300 is equipped with a keyboard 301, an information processing unit, a storage unit, a monitor 302, and the taking optical system 303.

The keyboard 301 is used by an operator to enter information from outside. The information processing unit and the storage unit are not shown. The monitor 302 displays information for the operator to see. The taking optical system 303 is used to pickup an image of the operator and/or his/her background. The monitor 302 may be a liquid crystal display device or a CRT display. The liquid crystal display device may be a transmissive liquid crystal display device that is illuminated by backlight (not shown) from the back or a reflective liquid crystal display device that displays an image by reflecting light coming from the front. Although, in the illustrated case, the taking optical system 303 provided in the personal computer 300 is arranged at an upper position on the right side of the monitor 302, the position of the taking optical system 303 is not limited to this. It may be arranged at any position around the monitor 302 or the keyboard 301.

The taking optical system 303 includes two zoom lenses having the same construction arranged side by side along the horizontal direction.

The taking optical system 303 includes an objective optical system 150 constituted, for example, by the zoom lens according to the first embodiment arranged on the taking optical path 304 and an electronic image pickup element chip 362 for receiving an image. They are built into the personal computer 300.

A cover glass 152 for protecting the objective optical system 150 is provided on the front end of the barrel.

An image of an object received by the electronic image pickup element chip 362 is input to the processing unit of the personal computer 300 via a terminal 166. Eventually, the object image is displayed on the monitor 302 as an electronic image. FIG. 28 shows an exemplary image 305 shot by the operator. The image 305 can be displayed on a personal computer at a remote place at the other end of communication through the processing unit. The Internet or telephone may be used to transmit images to a remote place.

Figure 31A:
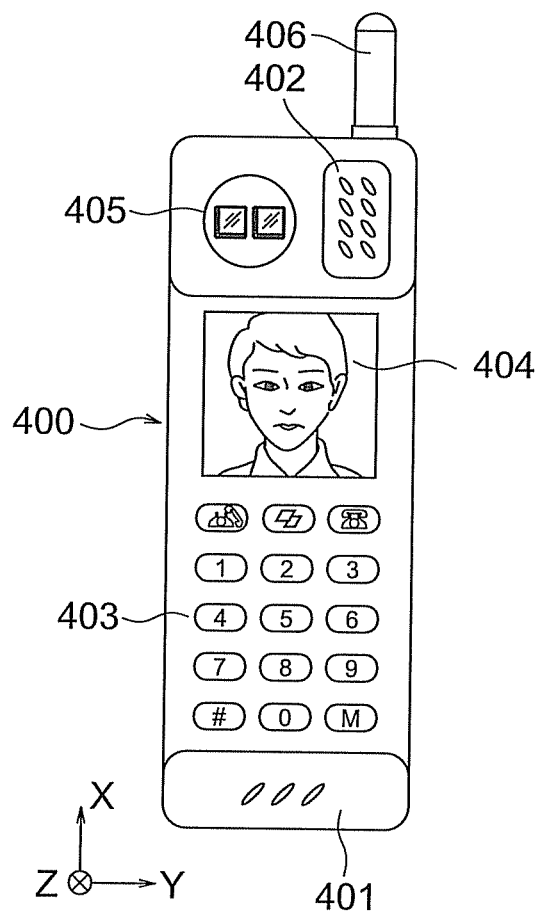
FIGS. 31A, 31B, and 31C show a cellular phone as an example of an information processing apparatus in which a zoom lens according to the present invention is provided as a taking optical system, where
Figure 31B:
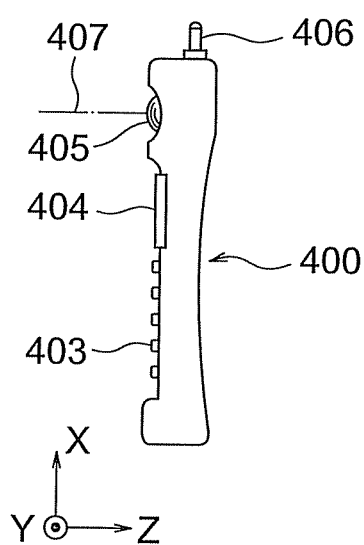
Figure 31C:
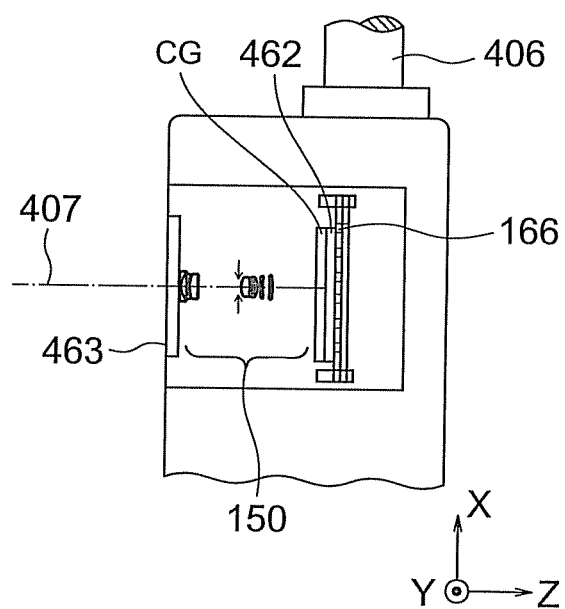

FIGS. 31A, 31B, and 31C show a telephone, or specifically a portable cellular phone as an example of an information processing apparatus in which an imaging optical system according to the present invention is provided as a taking optical system. FIG. 31A is a front view of the cellular phone 400, FIG. 31B is a side view of the cellular phone 400, and FIG. 31C is a cross sectional view of the taking optical system 405. As shown in FIGS. 31A to 31C, the cellular phone 400 is equipped with a microphone unit 401, a speaker unit 402, an input dial 403, a monitor 404, the taking optical system 405, an antenna 406, and a processing unit.

The taking optical system 405 includes two zoom lenses having the same construction arranged side by side along the horizontal direction.

The microphone unit 401 is used to input operator's voice as information. The speaker unit 402 is used to output voice of a person at the other end. The input dial 403 is used by an operator to enter information. The monitor 404 is used to display images of the operator himself/herself and/or the person at the other end and information such as telephone numbers. The antenna 406 is used to transmit and receive radio waves for communication. The processing unit (not shown) is used to process image information, communicated information, and input signals etc.

The monitor 404 is a liquid crystal display device. The arrangement of components is not limited to that shown in FIGS. 31A, 31B, and 31C. The taking optical system 405 includes an objective optical system 150 arranged on the taking optical path 407 and an electronic image pickup element chip 462 for receiving an image of an object. As the objective optical system 150, the zoom lens according to the first embodiment is used. These components are built into the cellular phone 400

A cover glass 463 for protecting the objective optical system 150 is provided on the front end of the barrel.

An image of an object received by the electronic image pickup element chip 462 is input to the processing unit (not shown) via a terminal 166. Eventually, the object image is displayed on the monitor 404 as an electronic image and/or a monitor at the other end of communication. The processing unit has a signal processing function. When an image is to be transmitted to the terminal at the other end of communication, the information of the object image received by the electronic image pickup element chip 462 is converted by this function into a signal that can be transmitted.

Various modifications can be made to the present invention without departing from the essence of the invention.

As describe in the foregoing, the present invention can suitably be applied to an image pickup apparatus equipped with a plurality of zoom optical systems to reduce variation in the angle of view and image quality among modules, thereby producing a natural stereoscopic effect in the fused image.

What is claimed is:
1. An image pickup apparatus comprising:
   a taking optical system; and
   an image pickup element, wherein
   the taking optical system comprises at least two zoom optical systems having the same focal length range,
   the distance between the optical axes of any two zoom optical systems among the plurality of zoom optical systems is substantially constant over a range from an incidence surface to an image pickup surface of the image pickup element, and the plurality of zoom optical systems are arranged in such a way as to form images of an object respectively in different regions on the image pickup surface of the same image pickup element.

2. An image pickup apparatus according to claim 1, wherein at least one lens group in each of the plurality of zoom optical systems is integrally held by a common member among the zoom optical systems.

3. An image pickup apparatus according to claim 1, wherein the plurality of zoom optical systems have the same lens configuration.

4. An image pickup apparatus according to claim 1, wherein each of the plurality of zoom optical systems satisfies the following conditional expression (1):

$$0.75 < ENPw/fw < 1.5 \quad (1),$$

where ENPw is the distance from the first surface of the zoom optical system to the entrance pupil thereof at the wide angle end, and fw is the focal length of the zoom optical system at the wide angle end 5. An image pickup apparatus according to claim 1, wherein the zoom optical systems satisfy the following conditional expression (2):

$$0.1 < N^{(1/2)} \times Dmin/\Phi im < 1.0 \quad (2),$$

where N is the number of zoom optical systems (the number of modules), Dmin is the distance between the optical axes of the zoom optical systems that have the shortest distance between their optical axes, and Φim is the diameter of an image circle of the image pickup element.

6. An image pickup apparatus according to claim 1, wherein in each of the plurality of zoom optical systems, a first lens having a negative refractive power located closest to the object side in the first lens group satisfies the following conditional expression (3):

$$-50 < (R1r + R1f)/(R1r - R1f) < 0.8 \quad (3),$$

where R1f is the radius of curvature of the object side surface of the first lens having a negative refractive power and R1r is the radius of curvature of the image side surface of the first lens having a negative refractive power.

7. An image pickup apparatus according to claim 1, wherein the focusing lens groups in the respective of zoom optical systems are held by separate members.

8. An image pickup apparatus according to claim 1, wherein each of the plurality of zoom optical systems satisfies the following conditional expressions (4) and (5):

$$-6.0 < TLw/EXPw < 1.0 \quad (4), \text{ and}$$

$$-5.0 < TLt/EXPt < 1.5 \quad (5),$$

where TLw is the overall length of the zoom optical system at the wide angle end, EXPw is distance from the image pickup element to the exit pupil of the zoom optical system at the wide angle end, TLt is the overall length of the zoom optical system at the telephoto end, EXPt is the distance from the image pickup element to the exit pupil of the zoom optical system at the telephoto end.

9. An image pickup apparatus according to claim 1, wherein if a plane containing all the points equidistant from the optical axes of any two of the plurality of zoom optical systems and the outer contours of the zoom optical systems can interfere with each other, the interfering portions of the outer contours of the zoom optical systems are cut at positions on their respective optical axis sides of the aforementioned plane.

10. An image pickup apparatus according to claim 1, wherein each of the plurality of zoom optical systems has a field stop arranged on the object side or image side of the first lens group and having a shape substantially similar to the shape of the image pickup area of each zoom optical system or a field stop having a substantially similar shape arranged in the vicinity of the image pickup surface of the image pickup element.

11. An image pickup apparatus according to claim 1, wherein a partition structure is provided in at least a part of the space between the plurality of zoom optical systems.

12. An image pickup apparatus according to claim 1, wherein the image pickup apparatus comprises a common drive unit that drives at least a part of each of the plurality of zoom optical systems.

* * * * *